United States Patent [19]
Scott

[11] Patent Number: 5,058,021
[45] Date of Patent: Oct. 15, 1991

[54] DISTRIBUTORLESS IGNITION SYSTEM WITH DWELL CONTROL

[75] Inventor: Kimberly Scott, Toledo, Ohio

[73] Assignee: Prestolite Electric Incorporated, Toledo, Ohio

[21] Appl. No.: 484,049

[22] Filed: Feb. 22, 1990

[51] Int. Cl.$^5$ .......................... F02P 5/00; F02P 9/00; G06F 15/48; G06G 7/70

[52] U.S. Cl. .......................... 364/431.04; 364/431.08; 123/406; 123/609; 123/644

[58] Field of Search ...................... 364/431.01, 431.03, 364/431.04, 431.08; 123/416-418, 609, 611, 643, 644, 406

[56] References Cited

U.S. PATENT DOCUMENTS

| | | | |
|---|---|---|---|
| 4,298,941 | 11/1981 | Furuhashi | 123/609 X |
| 4,502,454 | 3/1985 | Hamai et al. | 123/643 X |
| 4,519,038 | 5/1985 | Matsui et al. | 364/431.03 |
| 4,676,212 | 6/1987 | Kashimura et al. | 123/416 X |
| 4,750,467 | 6/1988 | Neuhalfen | 123/644 |
| 4,787,354 | 11/1988 | Wilens et al. | 123/609 X |
| 4,790,279 | 12/1988 | Tobinaga et al. | 123/418 X |
| 4,893,244 | 1/1990 | Tang et al. | 364/431.03 |
| 4,933,861 | 6/1990 | Allen et al. | 364/431.03 Xg |

Primary Examiner—Parshotam S. Lall
Assistant Examiner—E. J. Pipala
Attorney, Agent, or Firm—McAndrews, Held & Malloy, Ltd.

[57] ABSTRACT

A distributorless ignition system is shown having a timing controller that is responsive to one cylinder of the engine reaching top dead center for predicting the times at which one or more subsequent cylinders in the firing order should enter dwell and fire based upon the current engine speed, current battery voltage and the time interval between one cylinder reaching top dead center and the preceding cylinder reaching top dead center. At low operating speeds the controller plans for the firing of a cylinder utilizing triple precision calculations. At midrange speeds and high speeds, however, the controller utilizes double precision calculatons. At very high speeds, the controller of the present invention plans the firing of two or more cylinders at the same time forcing the cylinders into overlapping dwell. Knock is reduced while optimizing the amount of power obtained from each cylinder by utilizing various knock algorithms depending upon the current speed of the engine when the potential knock is detected.

27 Claims, 51 Drawing Sheets

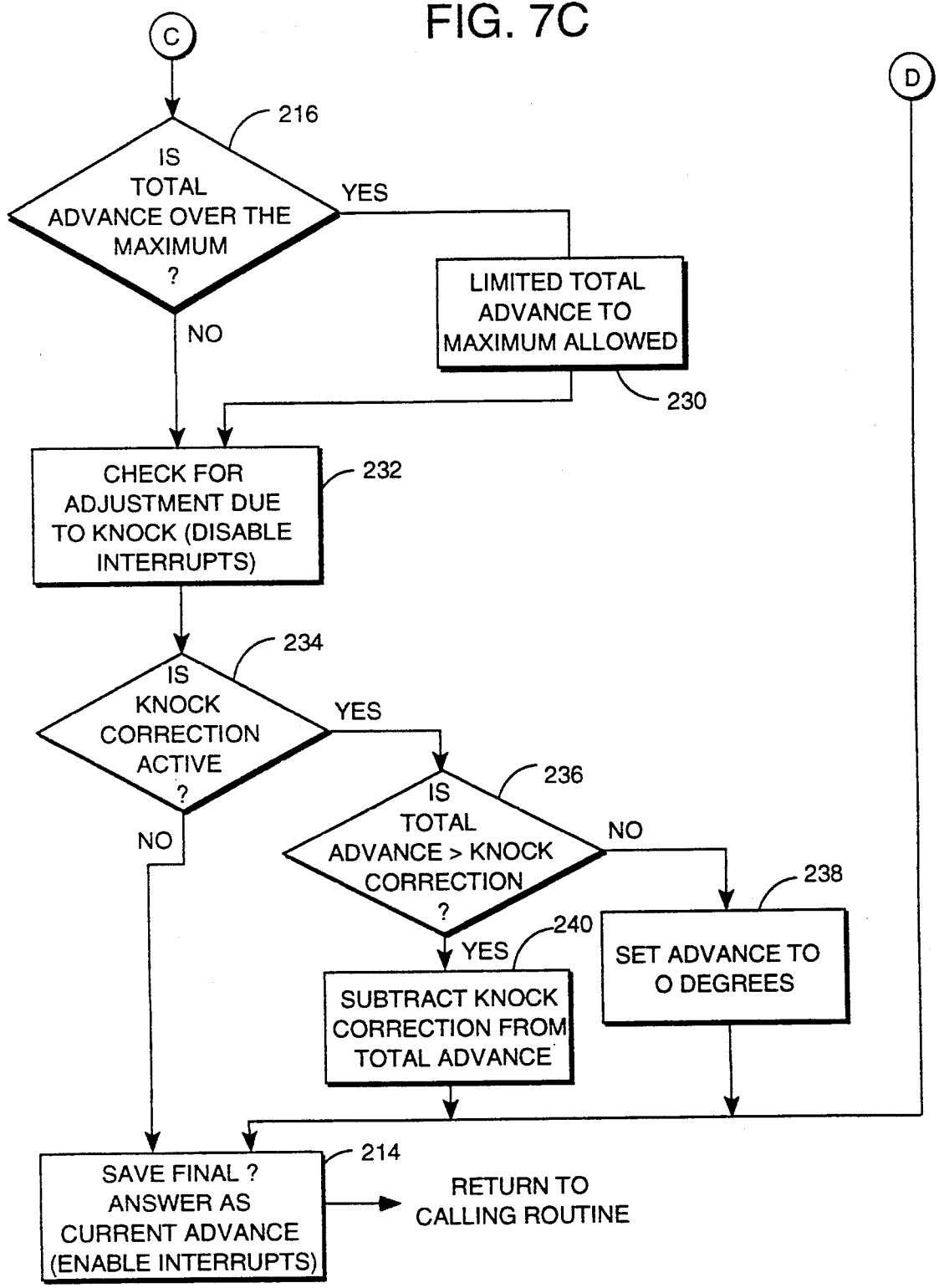

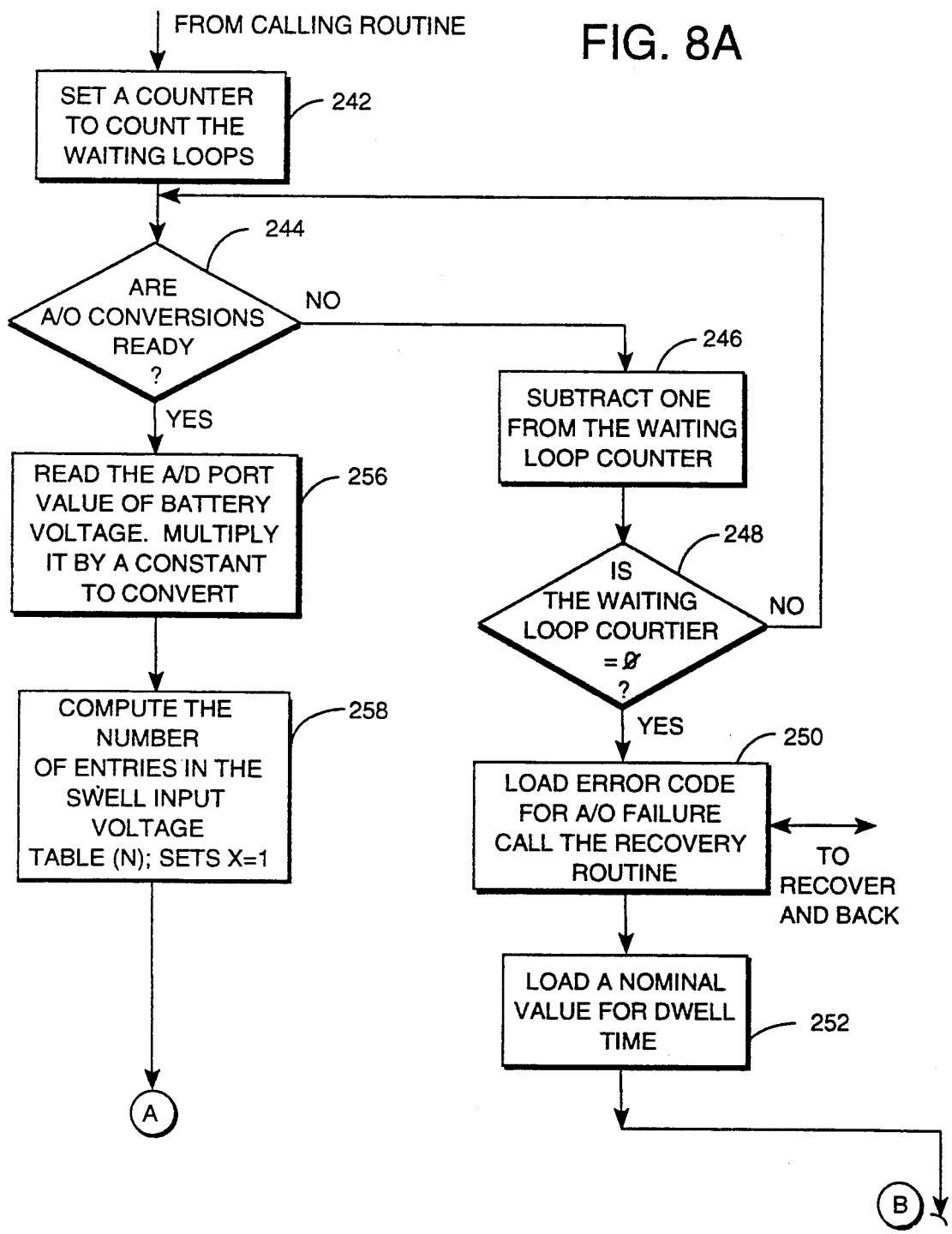

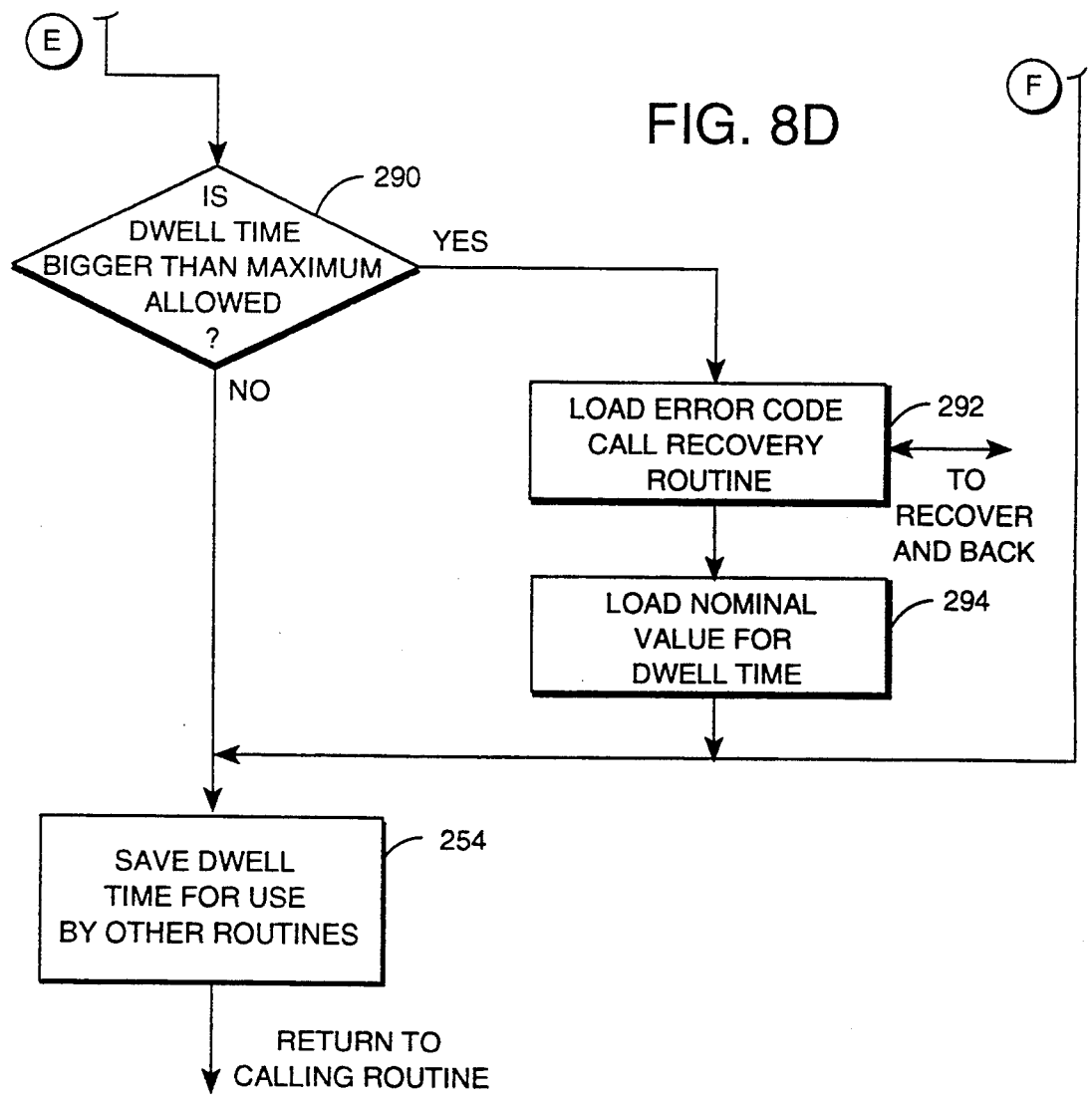

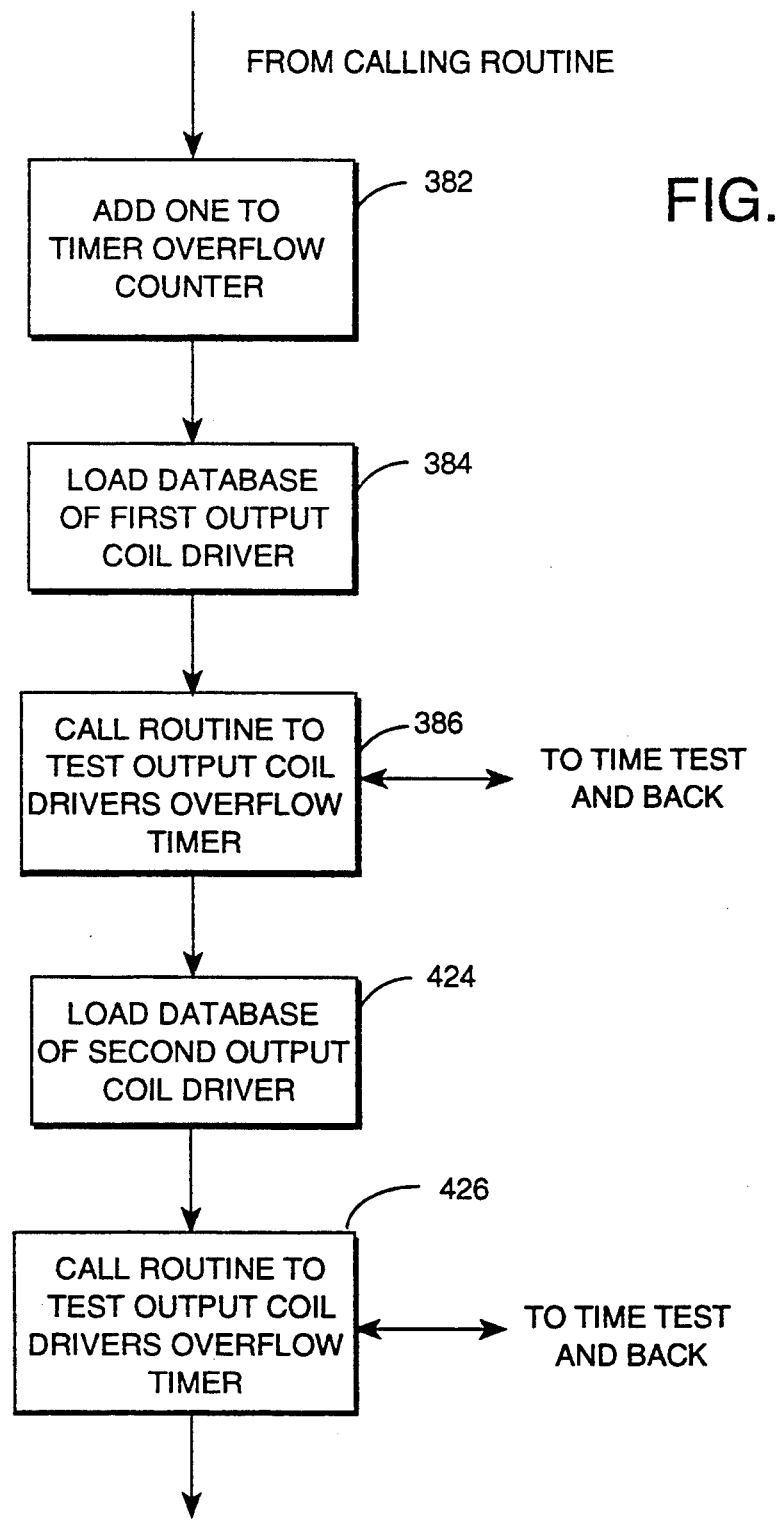

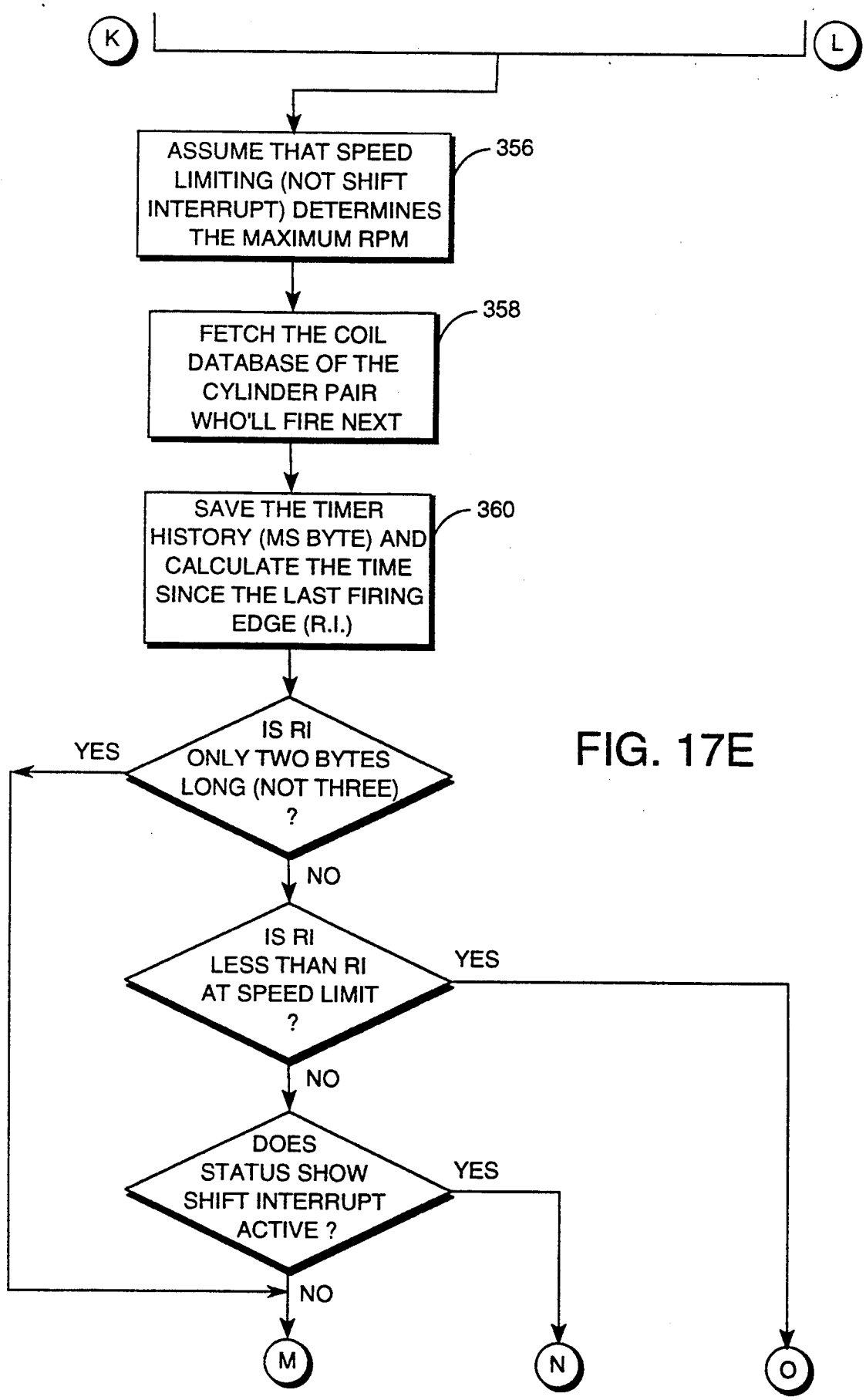

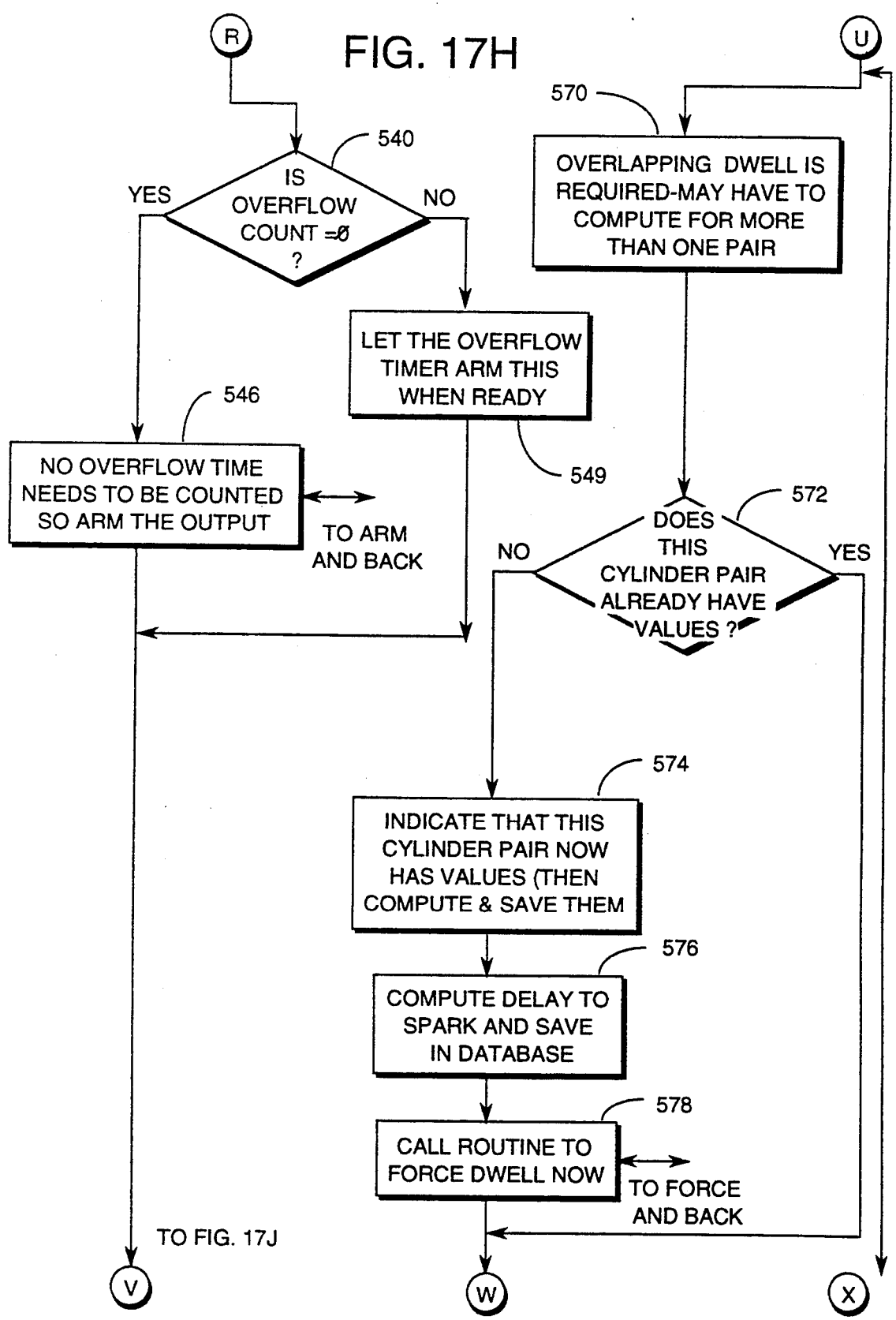

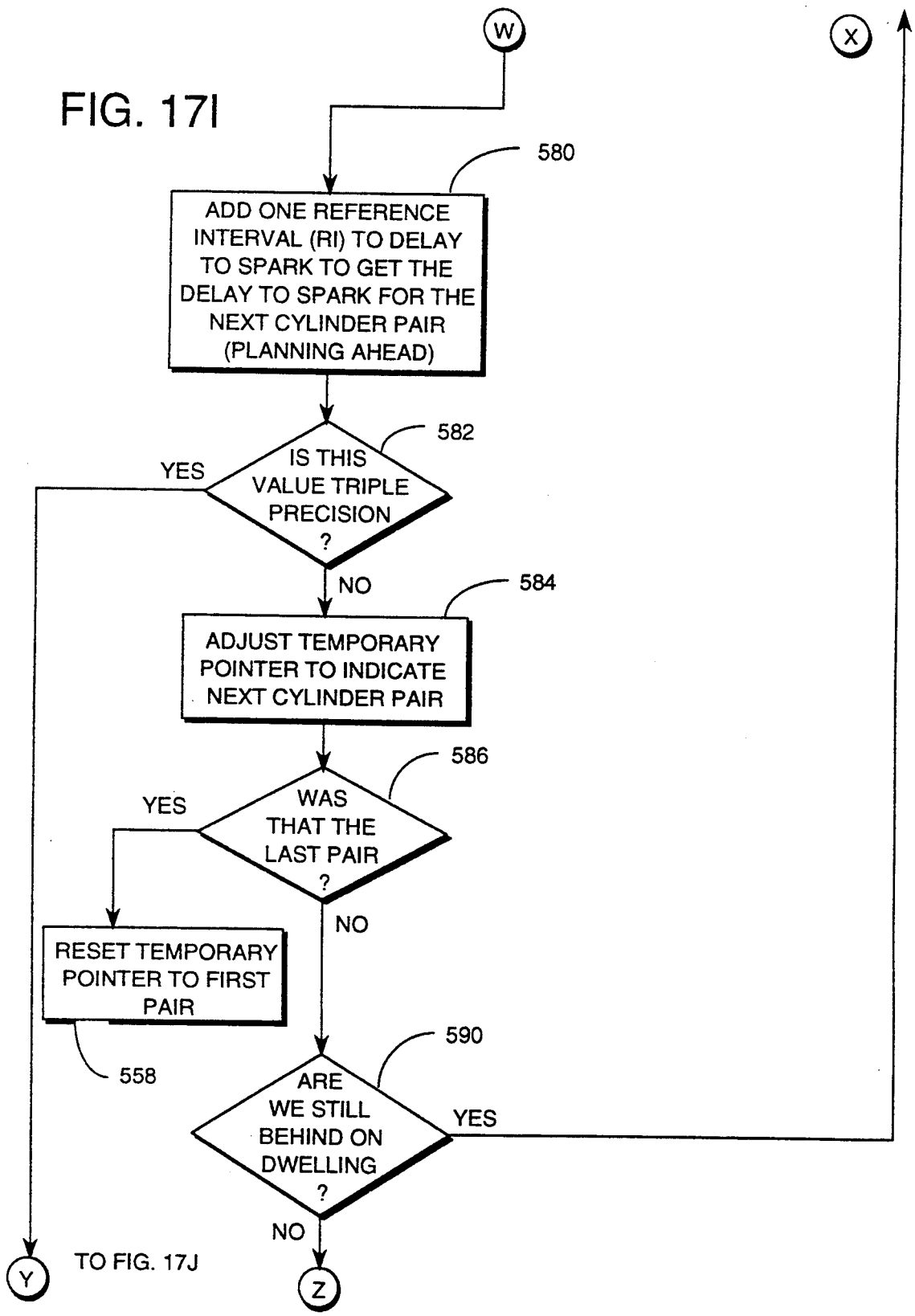

DISTRIBUTORLESS IGNITION SYSTEM WITH DWELL CONTROL

The present invention relates to a distributorless ignition system and more particularly to a timing controller for such a system that is responsive to one cylinder of the engine reaching top dead center for predicting the times at which one or more subsequent cylinders in the firing order should enter dwell and fire based upon current engine speed, current battery voltage and the time interval between the one cylinder reaching top dead center and the preceding cylinder reaching top dead center.

BACKGROUND OF THE INVENTION

Distributorless ignition systems are known for use in automobiles. However, those systems are generally not appropriate for marine crafts without modifications thereto that are necessary to accommodate the different demands on the engine for marine applications versus automotive applications. More particularly, a distributorless ignition system for use in a marine craft must accommodate high speeds on a much more regular basis than typically encountered by an automobile since the engines in marine crafts usually spend more time at their top speeds than do automobiles. Further, known distributorless ignitions systems have not adequately dealt with engine knock. Knock is an undesirable engine phenomena that can cause permanent damage to the engine.

SUMMARY OF THE INVENTION

In accordance with the present invention, the disadvantages of prior distributorless ignition systems have been overcome. The distributorless ignition system of the present invention includes a timing controller that is specifically designed for a marine craft to meet the typical demands placed on an engine used therein. Further, the system of the present invention reduces knock while optimizing the amount of power obtained from each cylinder by utilizing various knock algorithms depending upon the current speed of the engine when potential knock is detected.

More particularly, the system of the present invention includes a number of cylinders, each cylinder being coupled to an ignition coil. A coil driver circuit is coupled to each of the ignition coils for initiating, in response to a first control signal from the timing controller for each cylinder in the firing order, a dwell period to pull current through the cylinder's coil creating a field. The coil driver circuit is responsive to a second control signal from the timing controller to collapse the field in order to generate a spark firing the cylinder.

The timing controller includes a sensor that is responsive to each of the cylinders reaching top dead center to provide a signal indicative thereof. In response to a first cylinder reaching top dead center, the controller predicts the time at which one or more cylinders, subsequent in the firing order to the first cylinder, should fire and sets up those subsequent cylinders to fire at the determined time. The firing times are predicted based upon the engine speed, battery voltage and the reference time interval between the first cylinder reaching top dead center and the preceding cylinder reaching top dead center. During accelerations, predicted delay to dwell time values and delay to spark time values may be longer than needed since these values are calculated based on the reference interval and the reference intervals become smaller as the speed of the engine increases. In order to accommodate engine acceleration, the timing controller of the present invention, after sensing that a particular cylinder has reached top dead center, determines whether that particular cylinder has fired yet or whether it is in or approaching dwell. If the cylinder is in or approaching dwell, the controller determines that the predicted time values were too long and forces the cylinder to fire prior to the predicted firing time.

When the engine is operating at low speeds, the controller plans for the firing of a cylinder utilizing triple precision calculations. At mid-range speeds and high speeds, however, the controller utilizes double precision calculations to plan for the firing of the cylinder. At very high speeds, the controller of the present invention plans the firing times of two or more cylinders at the same time, forcing the cylinders into dwell so that overlapping dwell periods result.

In accordance with the present invention advance is determined from a table, each entry of which has an advance value associated with an engine speed value and a slope value that represents the slope of a line drawn between one engine speed value and the next highest engine speed value in the table. Advance for a given engine speed is determined based upon the sum of the advance value associated with the next lowest engine speed value stored in the table and the product of the associated slope value times the difference between the current engine speed and the stored engine speed value. Dwell is similarly determined from one or more tables the entries of which correlate battery voltage values with slope and intercept values that describe a line drawn between an associated battery voltage and the next highest battery voltage in the table. The dwell time is determined based upon the sum of the product of the table entry battery voltage that is equal to or next smaller than the sensed battery voltage of the system's power supply times the slope associated with the table entry battery voltage and the intercept value that is associated with the table entry battery voltage.

In order to reduce knock, a knock sensor is mounted in the engine block to vibrate therewith and to provide a signal to the controller that represents potential engine knock. The controller is responsive to the knock signal from the sensor for reducing the advance by a predetermined amount, the knock step value. Because each of the cylinders are affected by a single knock adjustment, the number of knock adjustments made to the advance value is limited to one adjustment per firing cycle of the cylinders so that all of the cylinders fire at least once before another knock adjustment is permitted. Various knock adjustments are made depending upon whether the speed of the engine is below a first predetermined value, between the first predetermined value and a second predetermined value or above the second predetermined value. If the engine speed is greater than the first predetermined value but less than the second predetermined value, in response to successive knock signals for which an adjustment may be made, the knock adjustment is successively larger and, more particularly, equal to a multiple of the knock step value. If the engine speed is greater than the second predetermined value, a fixed knock adjustment is made in response to each knock signal for which an adjustment may be made. The fixed knock adjustment value is based upon the value of the last knock adjustment made for an engine speed that is less than the second predetermined value. If the speed of the engine is less than the first predetermined value, a lock engine speed value is determined, the lock engine speed value being the engine speed at which the knock signal is first provided. If the engine speed is within a fixed range of the lock speed value the advance is reduced by successively greater multiples of the knock step value in response to successive knock signals for which an adjustment may be made. If, however, a knock signal occurs at a speed that is outside of the range of the lock speed, the lock speed is reset so that subsequent knock adjustments are based upon a new lock speed value. The knock adjustments made in accordance with the present invention reduce knock by reducing the advance so that the engine has less time to preignite the fuel. However, the adjustments to the advance are made in very small steps so that the amount of power obtained from each cylinder is optimized while protecting the engine from permanent damage.

These and other objects, advantages and novel features of the present invention, as well as details of an illustrated embodiment thereof, will be more fully understood from the following description and the drawing.

BRIEF DESCRIPTION OF THE DRAWING

FIGS. 7A-7C form a flow chart illustrating the ADVANCE software routine utilized by the timing controller shown in FIG. 1;

FIGS. 8A-8D form a flow chart illustrating the DWELL software routine utilized by the controller shown in FIG. 1;

FIGS. 15A-15B form a flow chart illustrating the TIMER software routine utilized by the timing controller shown in FIG. 1;

FIGS. 17A-17K form a flow chart illustrating the HALL 1 software subroutine depicted in FIG. 12;

DESCRIPTION OF THE PREFERRED EMBODIMENT

The marine craft distributorless ignition system of the present invention includes a timing controller 10 that is responsive to various sensor inputs to control the times at which each of the cylinders 11-18 of an engine 20 enters a dwell period in which an associated coil driver circuit 21-24 pulls current through a respective coil 31-34 to create a field and the times at which the respective coil drivers 21-24 cut off current from the coils 31-34 so that the field created collapses generating a spark that fires a cylinder.

Figure 1:
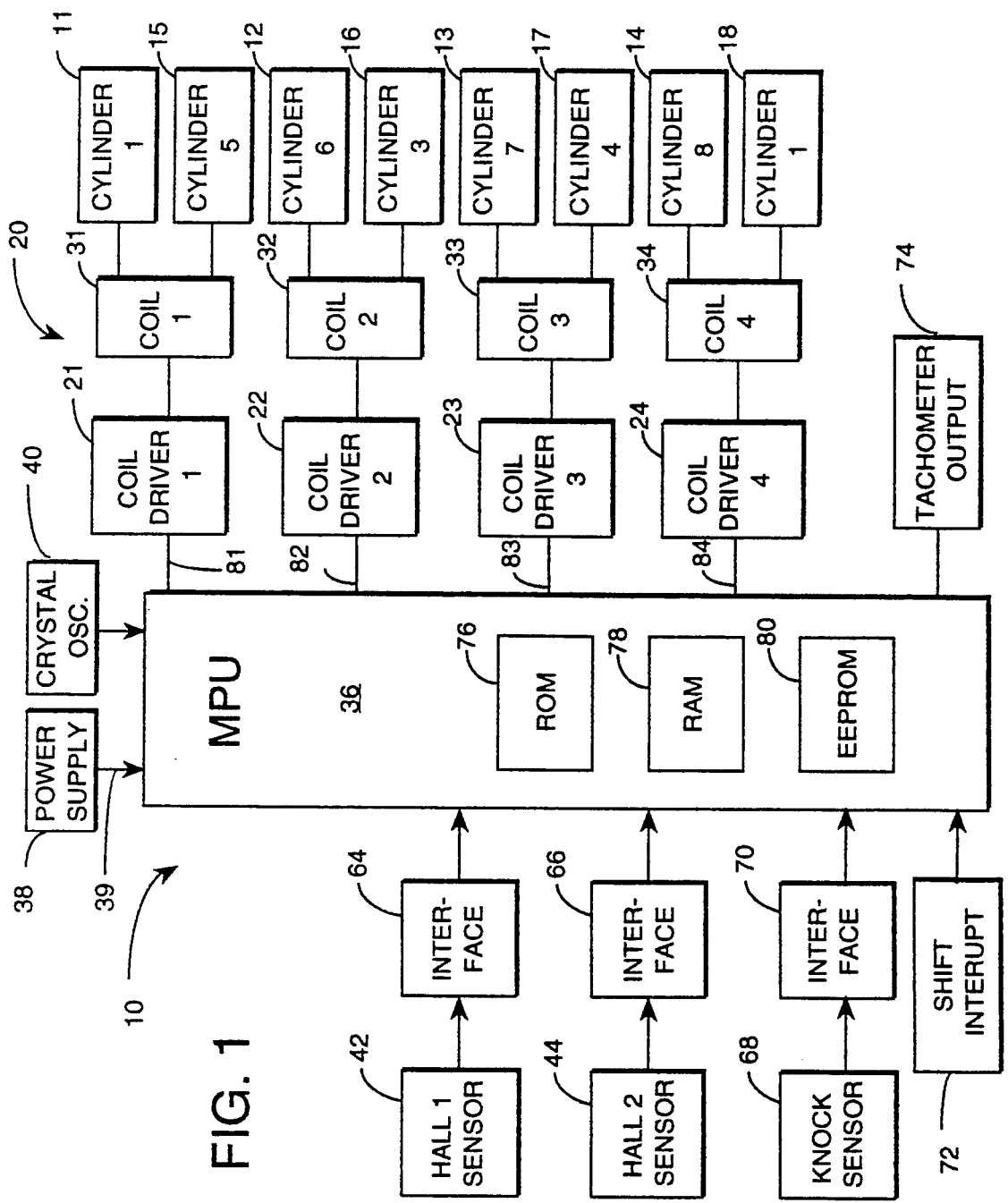
FIG. 1 is a block diagram illustrating the distributorless ignition system of the present invention.

Each of the coils 31-34 is a dual ended coil that fires a pair of cylinders. More particularly, coil 31 is used to fire the first and fifth cylinders 11, 15 in the firing order; coil 32 is used to fire the second and sixth cylinders 12, 16 in the firing order; coil 3 is used to fire the third and seventh cylinders 13, 17 in the firing order; and coil 34 is used to fire the fourth and eighth cylinders 14, 18 in the firing order so that when one cylinder of a pair is approaching top dead center, the other cylinder of the pair is in exhaust Each of the dual ended coils 31-34 is such that during firing, a high energy spark is generated in the cylinder that is approaching top dead center and a low energy spark is generated in the other cylinder of the pair that is in exhaust. It is noted that although an eight cylinder engine is depicted in FIG. 1, the controller of the present invention is equally applicable to engines having four cylinders or six cylinders. Further, the system is designed such that the same software may be utilized regardless of the number of cylinders in the engine as discussed below.

The timing controller 10 includes a microprocessor unit 36 that is coupled to a power supply 38 that includes a battery, the voltage of which on line 39 is monitored by the microprocessor 36 in order to vary the dwell times of the cylinders 11-18 therewith as discussed below. The microprocessor 36 is also coupled to a crystal oscillator that controls the basic timing of the microprocessor's operations.

The microprocessor 36 is responsive to a pair of Hall effect sensors, Hall 1 sensor 42 and Hall 2 sensor 44, to determine when each of the cylinders 11-18 reaches top dead center. The microprocessor 36 uses this information to determine the reference time interval between one cylinder reaching top dead center and a preceding cylinder reaching top dead center so as to predict the times at which a subsequent cylinder in the firing order should enter dwell and fire. The micro-processor 36 controls the coil drivers 21-24 to initiate dwell and fire the respective cylinders in accordance with the predicted values unless the determined reference interval is so small that dwell must be forced or if the engine is accelerating so that a cylinder reaches top dead center while the cylinder is in dwell or approaching dwell. In the former case the microprocessor 36 forces the cylinder to fire.

Figure 2:
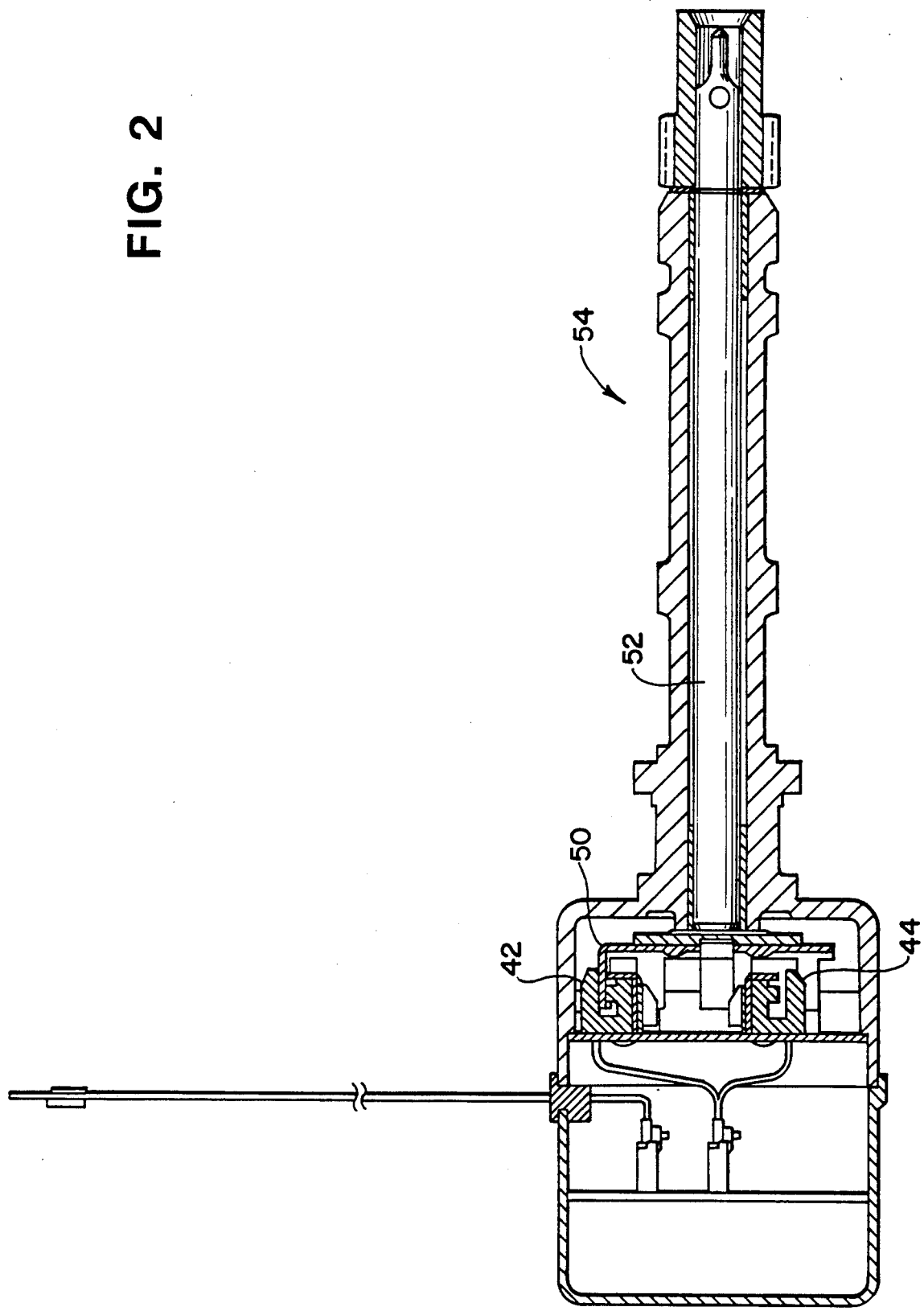
FIG. 2 is a cross section of an oil pump drive shaft assembly illustrating the Hall effect sensors shown in FIG. 1.

The Hall effect sensors 42 and 44 as illustrated in greater detail in FIG. 2 are responsive to the teeth on a respective outer track 46 and an inner track 48 of an interrupter wheel 50. The Hall effect interrupter wheel 50 is mounted on the oil pump drive shaft 52 of the oil pump drive assembly 54 so that the interrupter wheel 50 rotates in either a clockwise or counter clockwise direction with the shaft 52. The oil pump drive assembly 54 mounts upright in the engine block in place of the distributor. As shown in greater detail in FIGS. 3 and 4, the interrupter wheel 50 on the outer track 46 includes eight teeth 51-58 each associated with a cylinder 11-18 such that when the wheel turns, a tooth 51-58 will pass through the Hall 1 sensor 42 when the associated cylinder reaches top dead center, the Hall 1 sensor 42 providing a signal indicative of a cylinder reaching top dead center to the microprocessor 36 through an interface 64. The interrupter wheel 50 includes two teeth 61 and 62 on the inner track 48. The teeth 61 and 62 are positioned and aligned with the teeth 51-58 on the outer track 46 such that when the wheel 50 turns, a tooth 62, 61 will pass through the Hall 2 sensor when the first cylinder 11 in the firing order, or the fifth cylinder, is approaching top dead center. When this occurs, the Hall 2 sensor 44 provides a signal indicating that the first cylinder (fifth cylinder) is approaching top dead center to the microprocessor 36 through an interface 66 in order to synchronize the controller 10 with the engine 20. It is noted that for a six cylinder engine a Hall effect interrupter wheel having six teeth on the outer track is utilized. For a four cylinder engine an interrupter wheel with eight teeth on the outer track is utilized; however, every other Hall 1 interrupt is effectively ignored as discussed below.

The microprocessor 36 is also responsive to the output from a knock sensor 68 that is coupled thereto through an interface 70 so as to reduce the calculated advance when potential engine knock is detected in order to prevent permanent damage to the engine. The knock sensor 68 mounts in the engine block and vibrates therewith. The sensor includes a filter that generates a square wave signal which represents potential engine knock, this knock signal being coupled to the microprocessor 36 through an interface 70. A shift sensor 72 is also provided to generate a shift interrupt coupled to the microprocessor 36 to indicate that the engine is shifting between forward and reverse. The microprocessor is responsive to the shift interrupt to bring the engine speed down to idle when shifting between forward and reverse in order to keep from grinding the gears as discussed below. In addition to controlling the timing of the engine, the controller 10 is responsive to the Hall 1 sensor for providing a tachometer output at block 74.

The microprocessor 36 is responsive to the various inputs from the sensors 42, 44, 68, 72 as well as from the power supply 38 and crystal oscillator 40 to control the timing of the engine in accordance with software stored in a ROM 76. The ROM 76 also stores a vector table that contains addresses which determine the software subroutines that the microprocessor 36 is to execute when a particular condition is encountered as discussed below with respect to FIGS. 5A-5C. The microprocessor 36 further includes a RAM 78. On power up, in accordance with a MAIN subroutine as discussed below, the microprocessor 36 sets up a data base for each coil driver 21-24 in the RAM by loading initial data base values stored in the ROM 76 into the RAM 78. Each data base includes information which characterizes its associated coil driver so that only a single generic routine need be called to manipulate each of the coil driver outputs on respective lines 81-84. An EEPROM 80 is provided to store various variables including those that identify the type of engine employed i.e. whether the engine has four, six or eight cylinders so that the software stored in the ROM 76 may be used with either a four, six or eight cylinder engine.

Figure 5A:
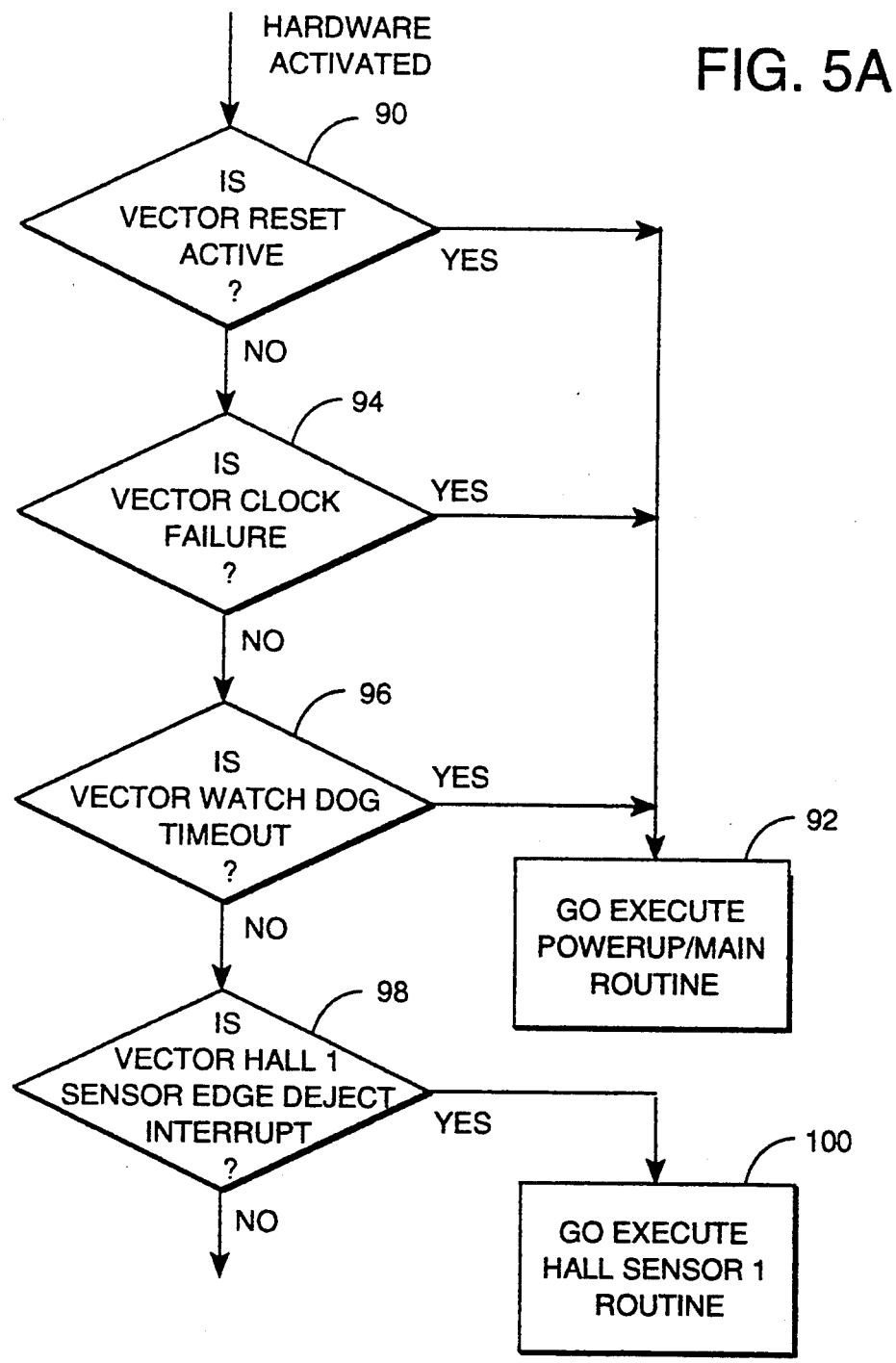
FIGS. 5A-5C form a flow chart illustrating the vector table utilized by the timing controller shown in FIG. 1.
Figure 5B:
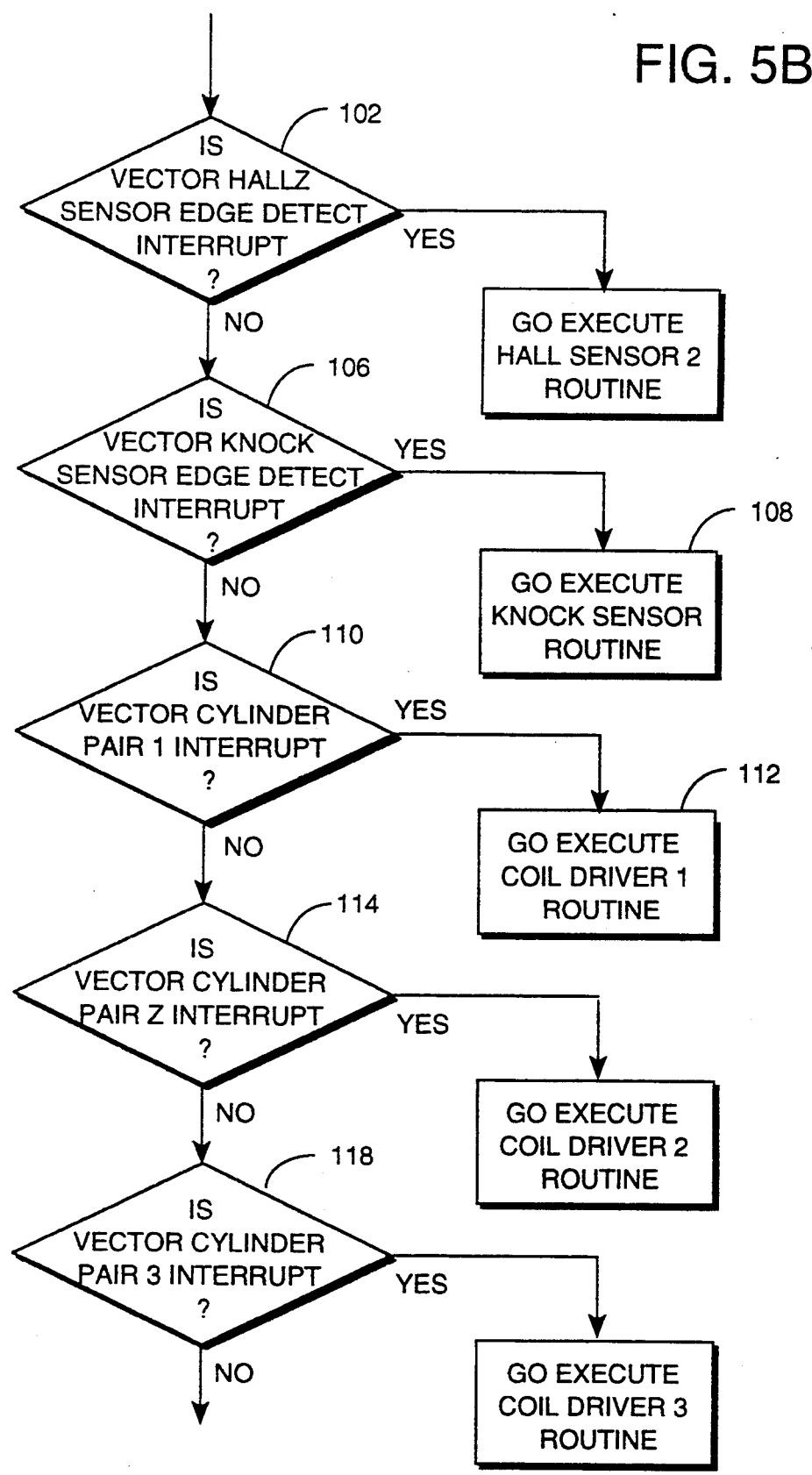
Figure 5C:
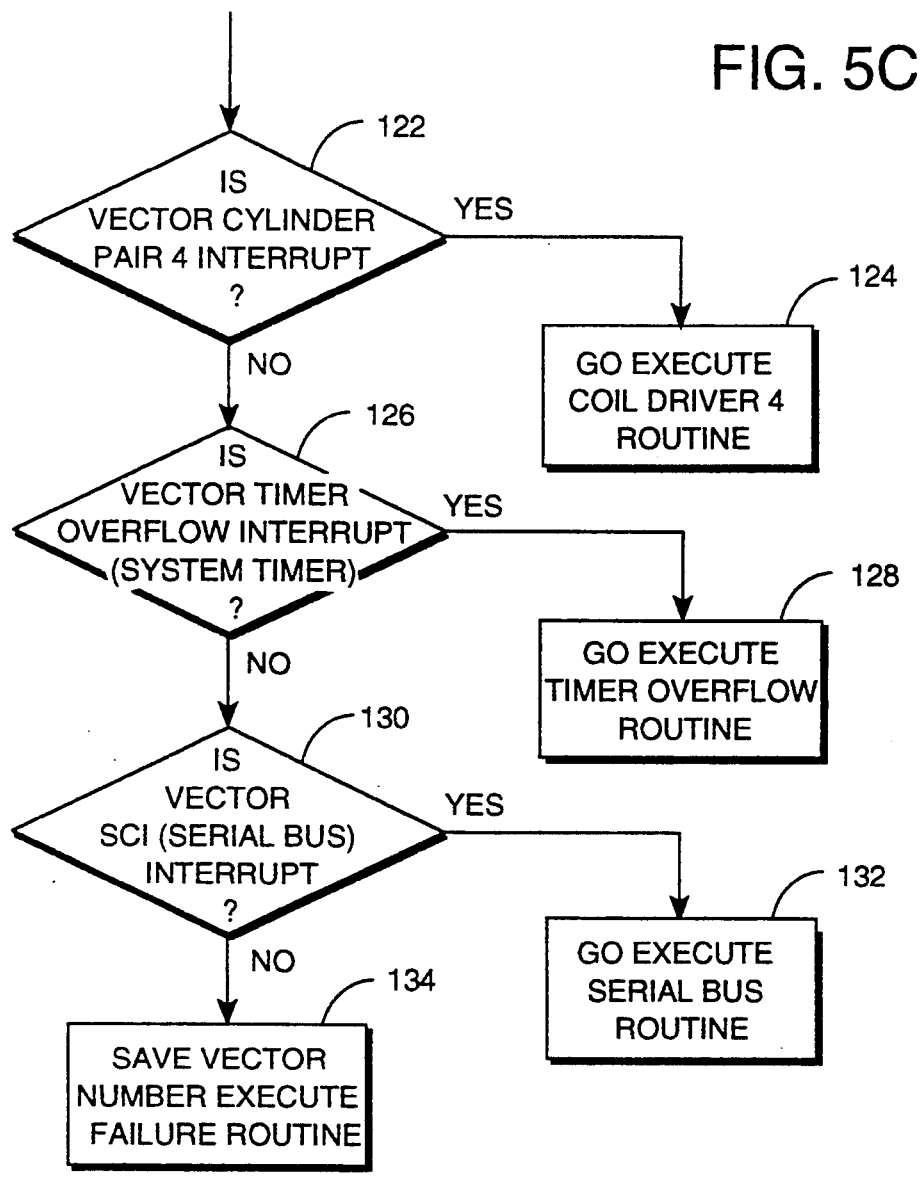
Figure 6:
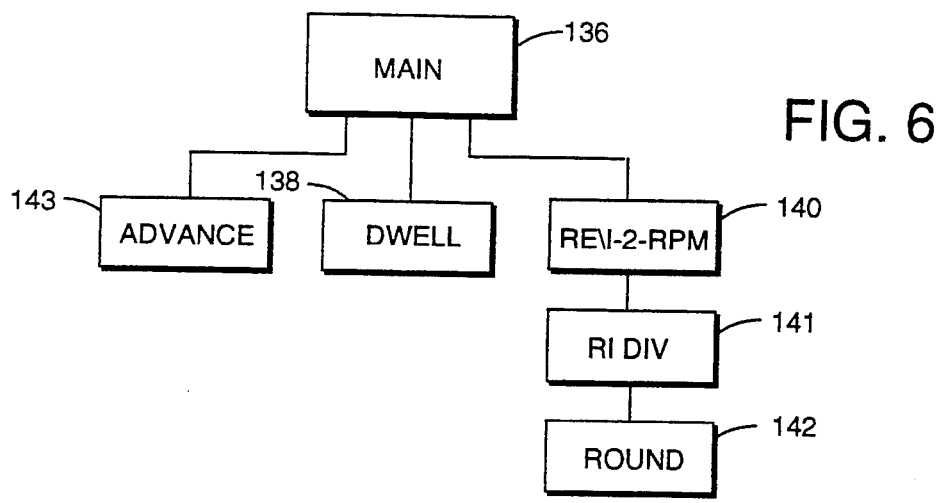
FIG. 6 is a structure chart illustrating the MAIN subroutine of the timing controller shown in FIG. 1.

When power is first supplied to the system the microprocessor 36 looks to the vector table stored in the ROM 76 to find the starting code address as depicted in FIGS. 5A-5C. The vector table also provides the addresses to determine the software that should be executed by the microprocessor 36 in response to various interrupts. More particularly, when the system hardware is activated upon power up, at a block 90 the microprocessor determines whether a vector reset is active. The vector reset will be active when the microprocessor 36 receives sufficient voltage to turn on. In response to a determination that the vector reset is active at block 90, the microprocessor at block 92 goes to the main routine to perform various diagnostics and initialize the system for the particular type of engine. Because the main routine performs various diagnostics, the microprocessor 36 will go to this routine at block 92 if at block 94 a clock failure is detected or if at block 96 the microprocessor 36 determines that a watchdog timer has timed out.

Figure 27A:
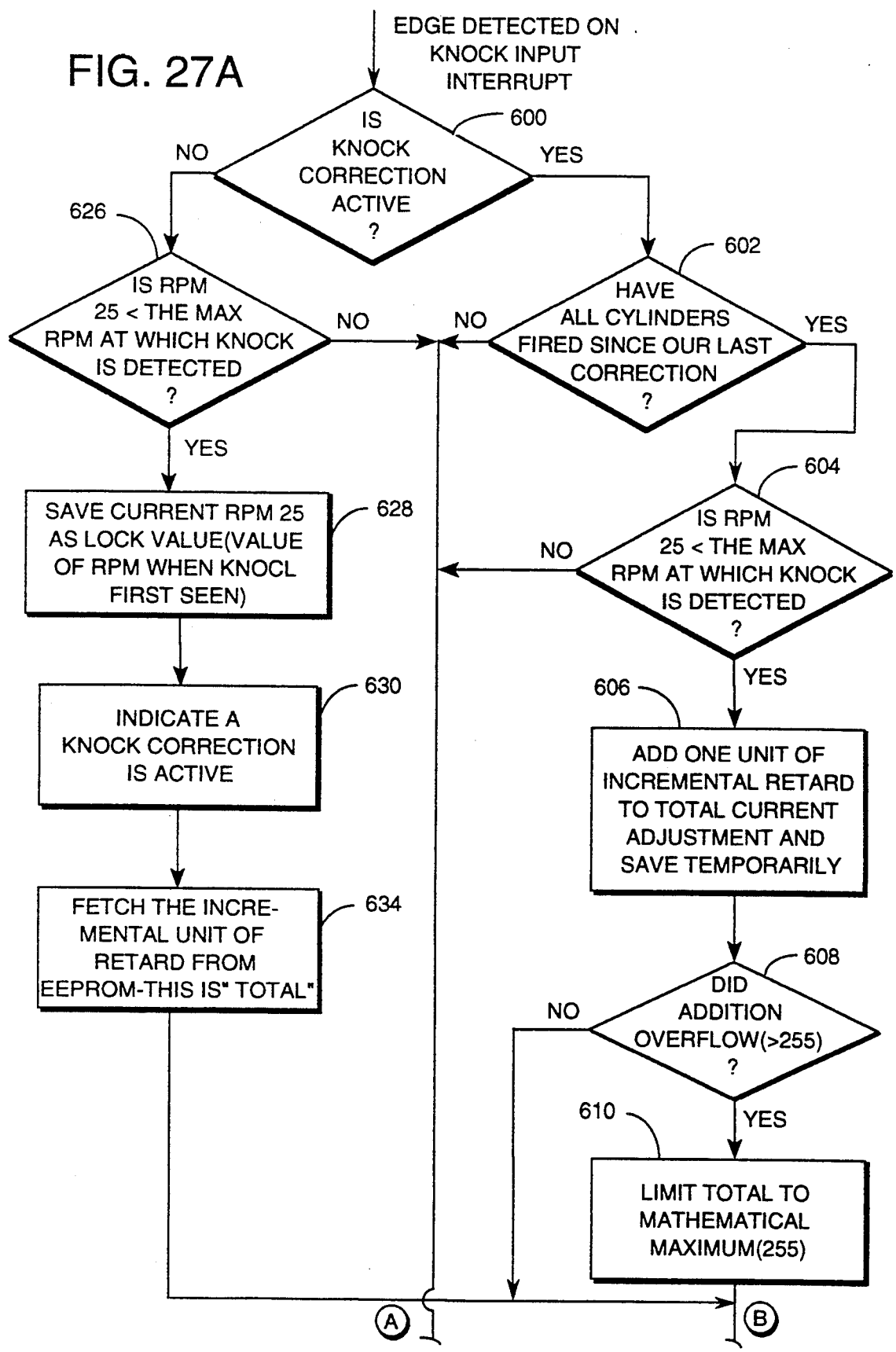
FIGS. 27A-27B form a flow chart illustrating KNOCK software subroutine utilized by the timing controller shown in FIG. 1.
Figure 27B:
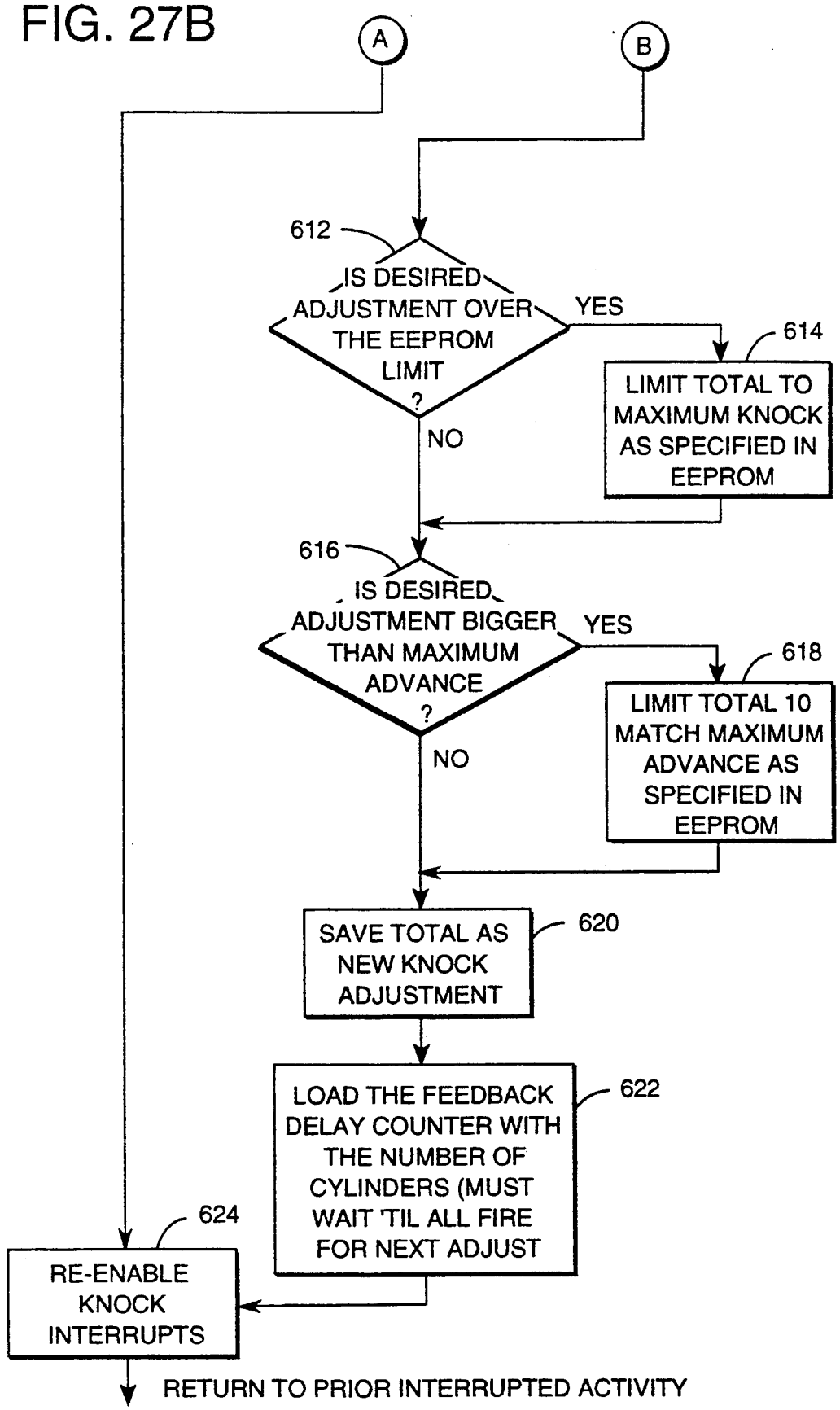

The vector table is also utilized by the microprocessor to respond to various interrupts as follows. If the microprocessor 36 receives a Hall 1 sensor edge detect interrupt from the Hall 1 sensor 42 as determined at block 98, the microprocessor 36 executes the HALL 1 routine depicted in FIGS. 12 and 17. If at block 102 the microprocessor 36 determines that a Hall 2 sensor edge detect interrupt has been received from the Hall 2 sensor 44, the microprocessor 36 executes the HALL 2 subroutine as shown in FIG. 13 at block 104. In response to a knock sensor interrupt received from the knock sensor 68 as determined by the microprocessor 36 at block 106, the microprocessor at block 108 executes the knock routine as shown in FIG. 27. In response from an interrupt associate with cylinder pairs 1, 2, 3 or 4 as determined at blocks 110, 114, 118 and 122, the microprocessor 36 executes a respective coil driver routine at blocks 112, 116, 120 or 124. Since each of the coil driver routines are the same for each cylinder pair, only one coil driver routine is shown and depicted in FIG. 20. In response to a timer overflow interrupt that is generated when the system timer overflows as determined at block 126, the microprocessor 36 at block 128 executes the timer overflow routine depicted in FIG. 14. In response to a serial bus interrupt as determined by the microprocessor 36 at block 130, the microprocessor at block 132 executes a serial bus routine, not shown. In the event that the microprocessor 36 enters the vector table but is not directed to another subroutine, at block 134, the vector number is saved and the microprocessor 36 executes a failure routine.

Upon power up, when the microprocessor 36 is directed to the main subroutine 136, in accordance therewith the microprocessor performs various diagnostics and initializes the system for the particular type of engine, four, six or eight cylinder, as determined from variables stored in the EEPROM. The MAIN subroutine 136 also causes a coil driver data base to be set up for each of the coil drivers, the initial values of each data base being loaded into the RAM 78 from the ROM 76. After initializing the system, the MAIN subroutine 136 enables the Hall 2 interrupt so that the controller 10 can be synchronized to the engine 20 once the first cylinder pair is found. When the first cylinder pair has been found by the MAIN subroutine 136, the MAIN subroutine 136 enters a main loop in which the dwell time is determined at block 138 in response to the battery voltage of the power supply 38 as sensed on line 39. After computing the dwell time various diagnostics are performed. Thereafter, if a new time interval between one cylinder reaching top dead center and the next cylinder reaching top dead center has been measured during the HALL 1 subroutine depicted in FIGS. 12 and 17, the MAIN routine 136 executes an RI-2-RPM subroutine at block 140 in order to convert the newly measured time interval into revolutions per minute. In order to perform the interval to RPM conversion, the subroutine at block 140 utilizes a pair of subroutines RIDIV at block 141 and ROUND at block 142. Each time a new time interval is measured and the time interval converted to RPM, the MAIN routine 136 executes an ADVANCE routine at block 143. The microprocessor 36 stays in the main loop of the MAIN routine 136 unless an interrupt is received as discussed above with respect to the vector table depicted in FIGS. 5A-5C or unless a diagnostic failure occurs.

Figure 3:
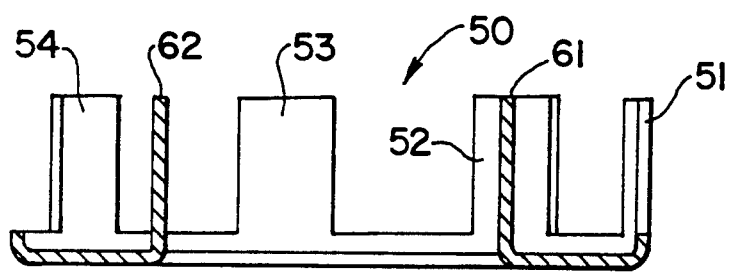
FIG. 3 is a cross section of a Hall effect interrupter wheel shown in FIG. 2.
Figure 4:
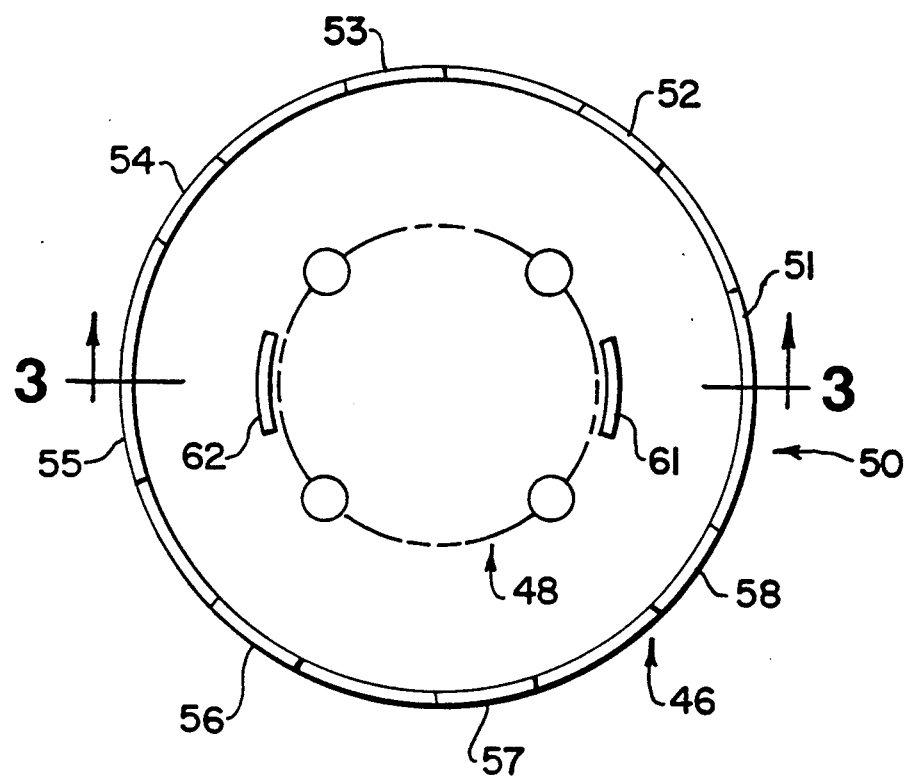
FIG. 4 is a top view of the Hall effect interrupter wheel shown in FIG. 2.
Figure 13A:
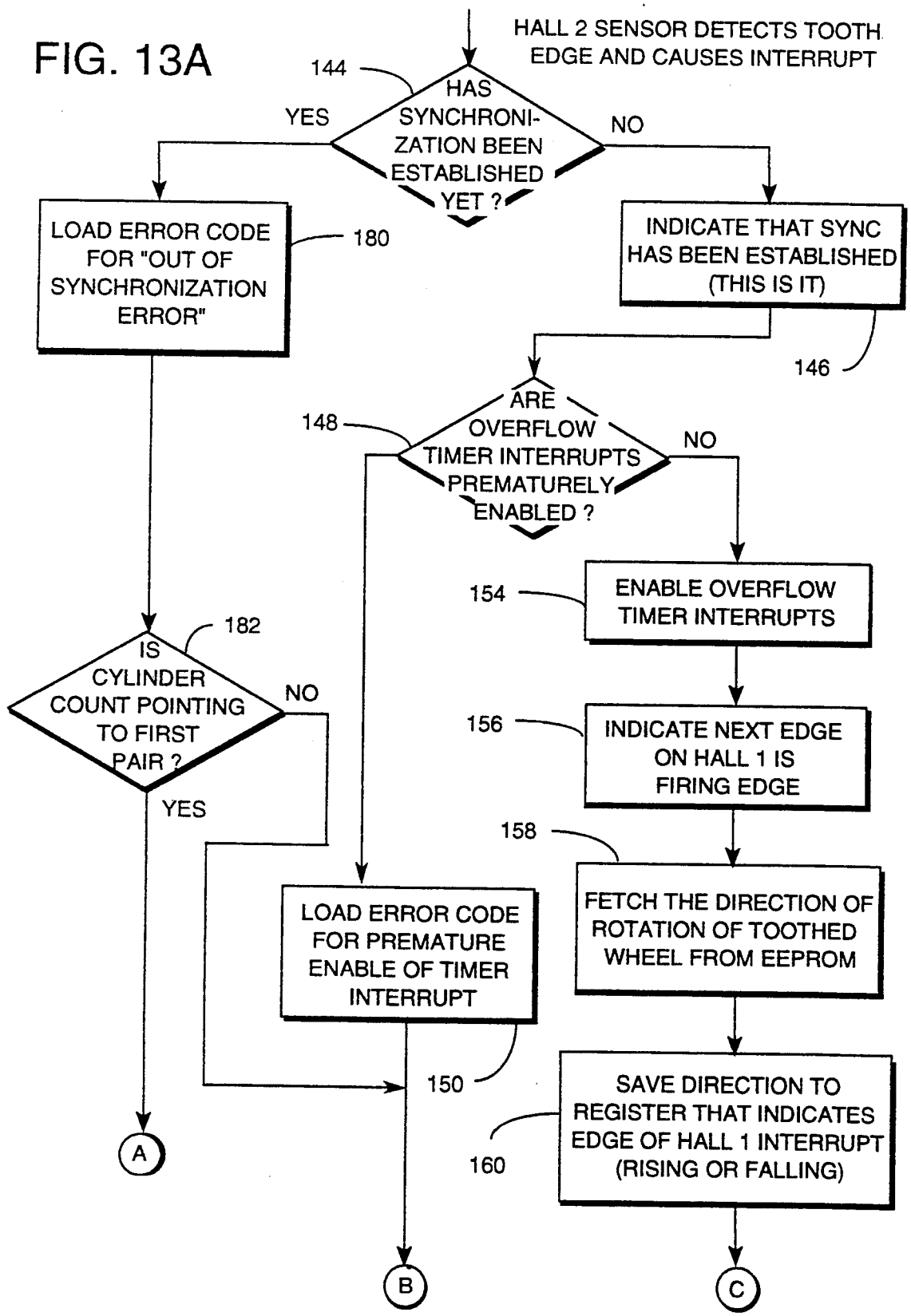
FIGS. 13A-13C is a flow chart illustrating the HALL 2 software subroutine utilized by the controller shown in FIG. 1.
Figure 14:
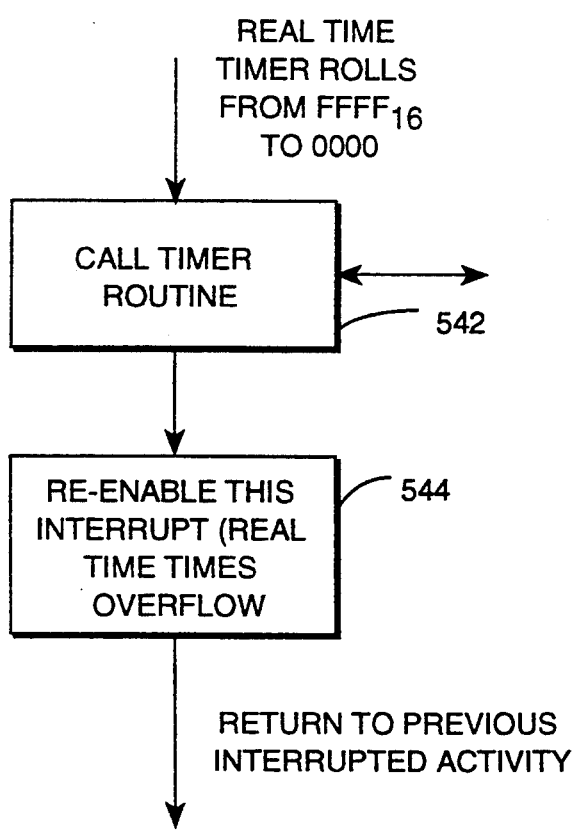
FIG. 14 is a flow chart illustrating a TIMER OVERFLOW subroutine utilized by the timing controller shown in FIG. 1.

As shown in FIG. 13A, after the MAIN routine 136 enables the Hall 2 interrupt and a Hall 2 interrupt is received by the microprocessor 36 from the sensor 44, the vector table at block 104 causes the microprocessor 36 to execute the HALL 2 subroutine depicted in FIG. 13A. Upon entering the HALL 2 subroutine, the microprocessor 36 determines at block 144 whether synchronization has been established or not. If this is the first time that the microprocessor 36 is executing the HALL 2 subroutine after powering up, synchronization will not have been established prior to this time and the microprocessor 36 proceeds to block 146. At block 146 the microprocessor 36 sets a flag to indicate that synchronization has been established. Thereafter, at block 148 the microprocessor determines whether the overflow timer interrupts have been prematurely enabled. If so, at block 150 the microprocessor 36 loads an error code for premature enablement of the timer interrupts and proceeds to block 152 to call the failure subroutine. If at block 148, the microprocessor 36 determines that the overflow timer interrupts have not been prematurely enabled, at block 154 the microprocessor 36 enables the overflow timer interrupts. Thereafter, at block 156 the microprocessor 36 indicates that the next Hall 1 interrupt represents a cylinder that should fire. Block 156 is utilized so that a four cylinder engine may operate with an eight tooth interrupter wheel as depicted in FIGS. 2-4. As discussed below with reference to the HALL 1 subroutine, for a four cylinder engine every other Hall interrupt is ignored. At block 158, the microprocessor determines the direction of rotation of the interrupter wheel 50 from variables stored in the EEPROM 80. Thereafter, at block 160 the microprocessor saves the direction value to a register that indicates whether a Hall 1 interrupt is associated with a leading or trailing edge of a tooth on the interrupter wheel 50. At block 170, the microprocessor 36 determines whether Hall 1 and knock interrupts from the respective sensors 42 and 68 have been prematurely enabled. If so, the microprocessor 36 loads the error codes for these events at block 172 and at block 152 calls the failure routine. If these interrupts were not prematurely enabled, the microprocessor 36 continues to block 174 to enable the knock and Hall 1 interrupts. At block 174 the microprocessor also clears the wait counters and sets a fire counter equal to the number of cylinders in the engine. At block 176 the microprocessor 36 sets a pointer that indicates that the current cylinder is the first cylinder pair and continues to block 178 to reenable the interrupts for Hall 2. Thereafter, the microprocessor 36 returns to its previous activity that was interrupted by receipt of the Hall 2 interrupt from the sensor 44.

Returning to block 144, after the system has been synchronized by the first Hall 2 interrupt received as determined by the microprocessor 36 at block 144, in response to each subsequent Hall 2 interrupt, the microprocessor proceeds to block 180. At block 180, the microprocessor 36 loads an error code for an out of synchronization error. The microprocessor loads the error code prior to determining whether the system is actually out of synchronization but does not execute the failure routine until it is determined whether this error exists. This is a programming technique that is utilized throughout. For example, if the system is out of synchronization, the microprocessor 36 will determine at block 182 that the cylinder count is not pointing to the first pair and the microprocessor 36 will go to block 152 to execute the failure routine. If the cylinder count is pointing to the first pair indicating that the system is indeed synchronized, from block 182, the microprocessor 36 goes to block 184 to determine whether the dwell time is too big. If the dwell time is too big, at block 186 the microprocessor loads an error code and calls a recovery routine. Thereafter, at block 188 the microprocessor loads a nominal value for dwell. The microprocessor continues to block 189 to check the EEPROM values to determine whether they are reasonable or not. If this test does not pass as determined by the microprocessor at block 190, the microprocessor at block 192 determines whether the error is recoverable and if not executes the failure routine at block 152. If the error is recoverable the microprocessor at block 194 calls the recovery routine and continues to block 196. At block 196 the microprocessor 36 loads an error code indicting a mismatch between the number of cylinders and the maximum firing pair. Thereafter at block 198 the microprocessor 36 computes the maximum firing pair and compares the computed value with a store value. If the two values do not match as determined by the microprocessor 36 at block 200, the microprocessor executes the failure routine at block 152. If, however, they do match, the microprocessor 36 continues to block 178 to re-enable the interrupts for Hall 2.

Figure 7A:
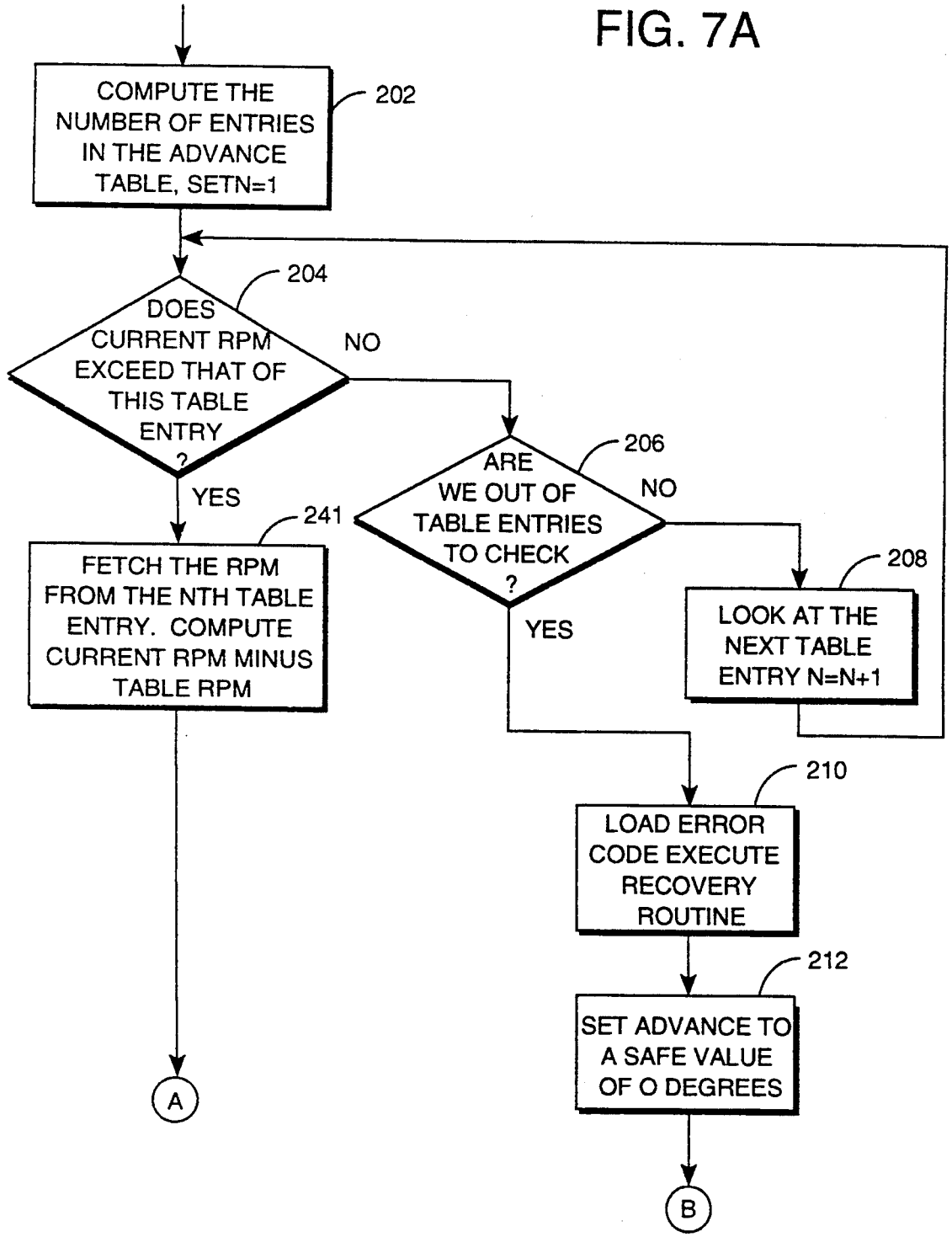
Figure 7B:
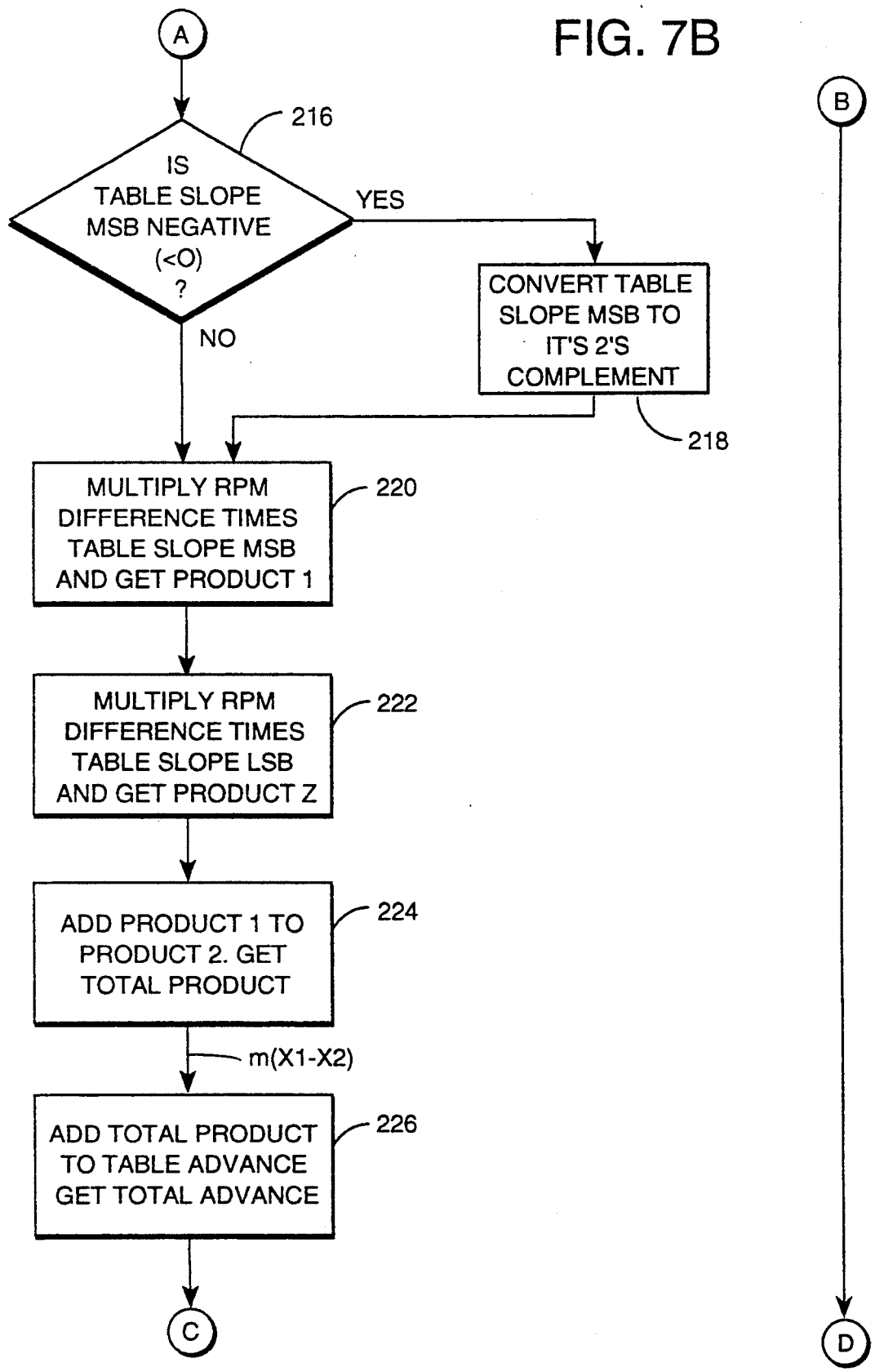
Figure 8B:
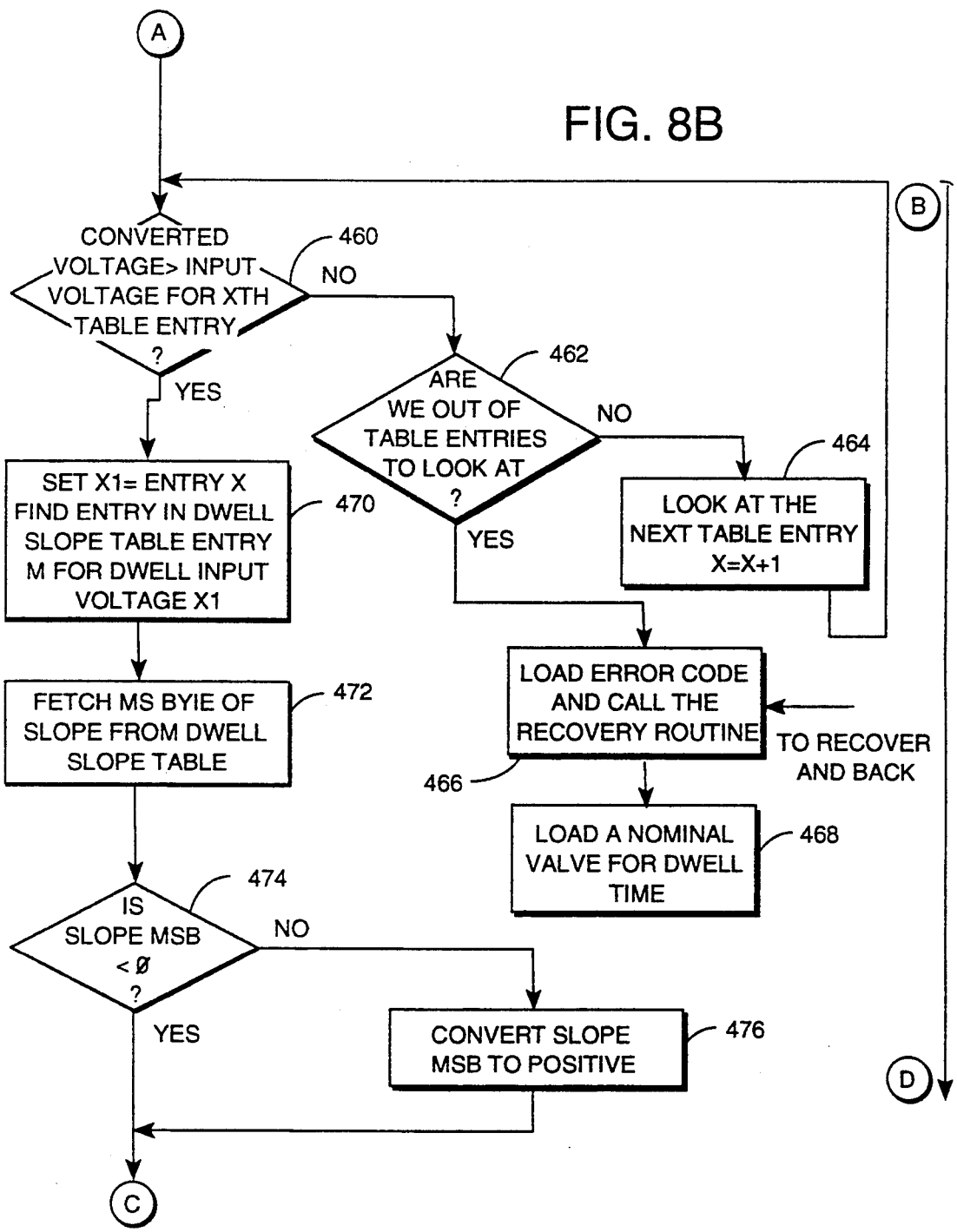
Figure 8C:
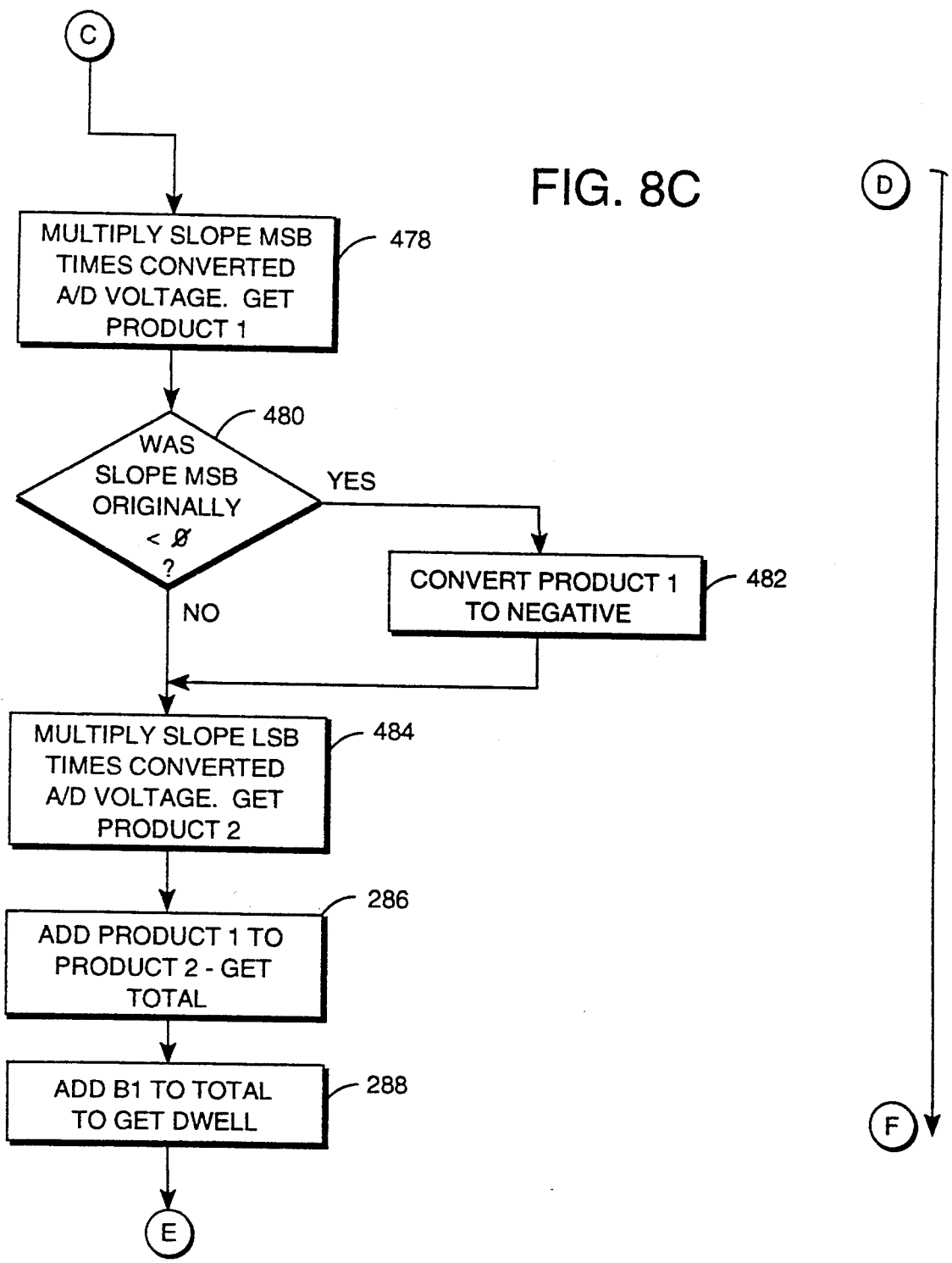

As discussed above, each time a new reference interval is calculated and the reference interval is converted to RPM, the MAIN routine 136 calls the ADVANCE routine depicted in FIGS. 7A–7C to calculate advance. A certain amount of time is required to burn fuel. In order to provide maximum power, such that the fuel is ignited at the height of the compression stroke when the cylinder reaches top dead center, the spark must be fired sooner so as to permit all of the fuel to burn. This advancement of the firing of the spark is referred to as "advance" which is expressed in engine degrees. There are 720 engine degrees for a complete cycling for all cylinders so that in an eight cylinder engine there are 720/8 or 90 engine degrees between cylinders. In accordance with the present invention advance is computed utilizing a table with advance representing a Y value and RPM representing an X value. The table is made up of entries wherein each entry has an associated X value, Y value, and a slope value, the X and Y values indicating a precise amount of ADVANCE for a specific RPM. The slope value associated with each X, Y entry represents the slope of a line drawn between the associated RPM value and the next highest RPM value in the table. This table therefore represents an "advance curve". The table entries are ordered from largest RPM down to zero RPM as required by the ADVANCE software routine.

As shown in FIG. 7A upon entering the ADVANCE routine the microprocessor 36 at block 202 computes the number of entries in the ADVANCE table and sets a pointer, N=1. At block 204 the microprocessor 36 determines whether the current speed of the engine exceeds that of the Nth table entry and if not, the microprocessor 36 determines at block 206 whether all table entries have been checked. If not all of the table entries have been checked, the microprocessor at block 208 increments N to N=N+1 and returns to block 204 so that the next table entry may be checked. If it is determined at block 206 that all of the table entries have been checked and that the current RPM does not exceed any of the table entries, at block 210 an error code is loaded and the recovery routine is executed. Thereafter, at block 212 the microprocessor 36 sets the advance to zero degrees and continues to block 214 shown in FIG. 7C to save this advance value as the current advance.

When the table entry is found that is equal to or next lower than the current speed of the engine, the microprocessor proceeds to block 241 to fetch the RPM value for the Nth table entry and computes the difference between the current RPM value and the next lowest table entry RPM value. If the table slope associated with the table entry RPM value is negative as determined at block 216, the microprocessor 218 converts the table slope entries most significant byte to its twos compliment before proceeding to block 220. At block 220, the microprocessor 36 multiplies the difference calculated at block 214 times the table slope's most significant byte so as to obtain a first product. At block 222, the microprocessor multiplies the difference value calculated at block 214 by the table slope's least significant byte to obtain a second product. Thereafter at block 224 the microprocessor 3 adds the first and second products obtained at blocks 220 and 222 to obtain a total product that represents the slope associated with the Nth table entry times the difference between the current speed and the Nth table entry speed. At block 226, the total product calculated at block 224 is added to the advance value for the Nth table entry to obtain the total advance. The microprocessor 36 then determines at block 228 whether the total advance value exceeds a maximum value and if so, at block 230 the microprocessor 36 limits the total advance to a maximum value that is allowed.

At block 232 the microprocessor 36 checks for adjustments due to knock. If the microprocessor 36 determines that a knock correction is active at block 234, the microprocessor proceeds to block 236 to determine whether the total advance value is greater than the knock correction. If the total advance is greater than the knock correction then the advance may be adjusted to reduce knock at block 240. More particularly, at block 240 the knock correction is subtracted from the total advance value and this value is saved at block 214 as the current advance. If the total advance is less than the active knock correction, the correction cannot be made and at block 238 the advance is set to zero degrees. From block 238 the microprocessor 36 continues to block 214 to save the calculated value as the current advance. Thereafter, the microprocessor returns to the MAIN subroutine 136.

Dwell is calculated from table entries in a manner similar to the calculations made for advance as discussed above. Dwell represents the period of time during which current is allowed to flow through a coil 31–34 in order to set up a field so that when the current is suddenly cut off, the field collapses generating the necessary energy to force a spark across the gap in a spark plug to fire the cylinder associated with the coil. Dwell time is varied by the timing controller 10 in accordance with the voltage of the battery powering the system. More particularly, the microprocessor 36 utilizes the current battery voltage and entries in a dwell table that represent the table voltage X1 that is less than or equal to the current battery voltage, a table slope corresponding to X1 and a table intercept value B1 corresponding to the table entry voltage X1. The dwell subroutine calculates the desired dwell as equal to m(X1)+B1.

More particularly, upon entering the dwell subroutine depicted in FIGS. 8A–8D at block 242, the microprocessor 36 sets a counter to count the waiting loops. Thereafter, at block 244 the microprocessor determines whether the analog to digital conversions of the battery voltage are ready. If not, the microprocessor 36 proceeds to block 246 and subtracts one from a waiting loop counter. If the A to D conversions are not ready prior to the waiting loop counter being decremented to zero as determined at block 248, the microprocessor 36 loads an error code for analog to digital conversion failure and calls a recovery routine. After executing the recovery routine the microprocessor 36 loads a nominal value for the dwell time at block 252 and proceeds to block 254 shown in FIG. 8D to save this dwell time. If an A to D conversion is ready prior to the expiration of the waiting loop counter, the microprocessor 36 continues to block 256 and reads the A/D port value representing the battery voltage. At block 256 the microprocessor 36 multiplies the read battery voltage by a constant to convert it to the proper range. Thereafter, at block 258 the microprocessor 36 computes the number of entries in the dwell table and sets a pointer X equal to 1. At block 460, the microprocessor 36 determines whether a converted battery voltage value is equal to or greater than the table entry X where the table entries are ordered from highest to lowest battery voltage. If the battery voltage is less than the table entry X, the microprocessor 36 at block 462 determines whether all table entries have been checked and if not, at block 464 the microprocessor increments X by 1 and returns to block 460 so that the next table entry voltage may be checked. If all of the table entries have been checked and not one is found that is less than the battery voltage, at block 466 the microprocessor 36 loads an error code and calls the recovery routine. After executing the recovery routine the microprocessor 36 at block 468 loads a nominal value for the dwell time and proceeds to block 254 to save this nominal value as the dwell time that is used by other subroutines.

Upon determining that the current battery voltage exceeds a table entry X at block 460, the microprocessor 36 at block 470 finds the entry in the dwell slope table corresponding to the table entry voltage X. Thereafter, at block 472 the microprocessor 36 fetches the most significant byte of slope, m, from the dwell slope table and at block 474 determines whether the slope most significant byte is less than zero. If not, the microprocessor 36 at block 476 converts the slope most significant byte to a positive value and continues to block 478. At block 478, the microprocessor 36 multiplies the slope most significant byte times the converted, current battery voltage obtained at block 256 to obtain a first product value. Thereafter, as determined at block 480 if the most significant byte of the slope was originally less than zero, the microprocessor 36 proceeds to block 482 to convert the first product to a negative value. At block 484 the microprocessor 36 then multiplies the least significant byte of the slope times the converted, current battery voltage to obtain a second product and at block 286 adds the first and second products together. At block 288 the intercept value B1 associated with the table entry voltage X1 is added to the sum obtained at block 286 to obtain the desired dwell value. Thereafter, at block 290 the microprocessor 36 determines whether the calculated dwell time is larger than the maximum allowed and if so, goes to the microprocessor at block 292 loads an error code and calls the recovery routine. Thereafter, the microprocessor 36 loads a nominal value for the dwell time and proceeds to block 254. If the dwell time value calculated at block 288 is not larger than the maximum allowed that value is saved as the dwell time at block 484 for use by other subroutines.

Figure 12:
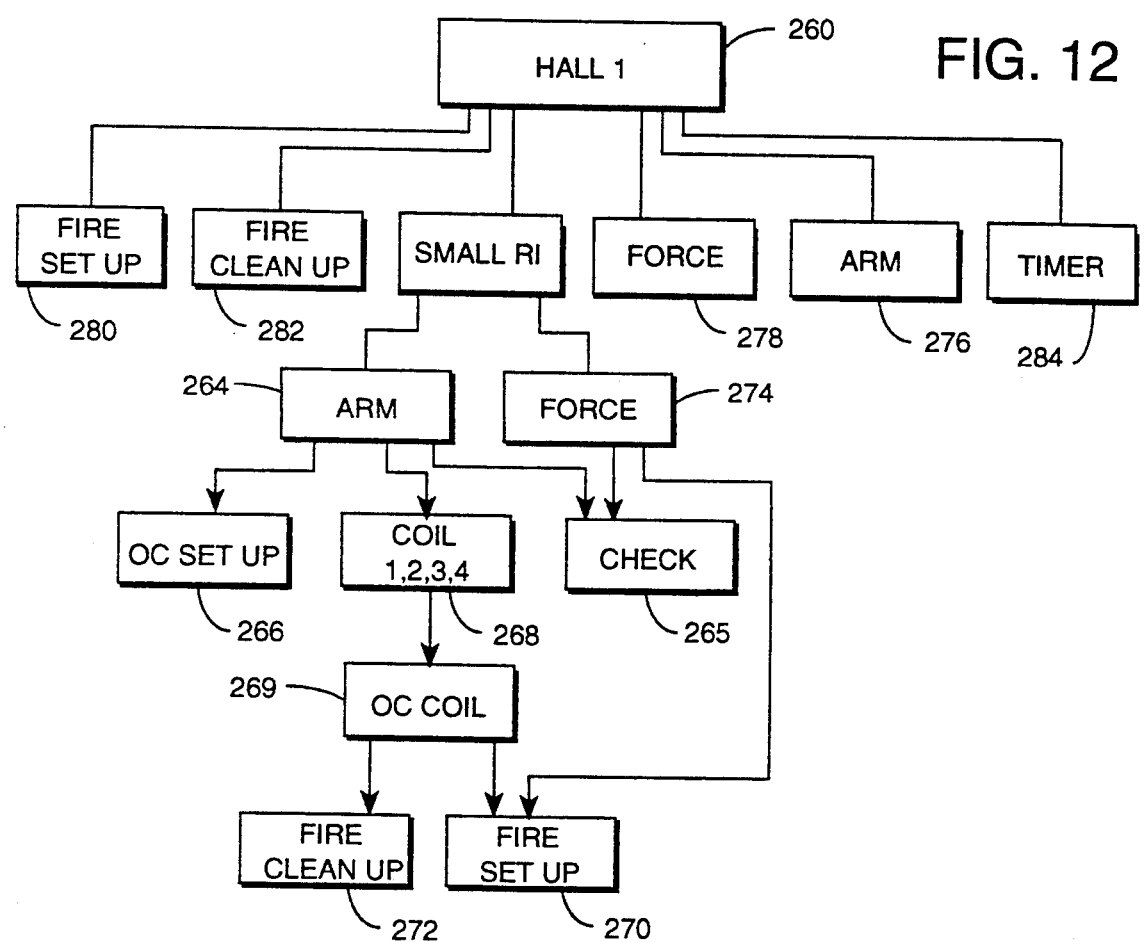
FIG. 12 is a structure chart illustrating the HALL 1 subroutine utilized by the timing controller shown in FIG. 1.
Figure 13B:
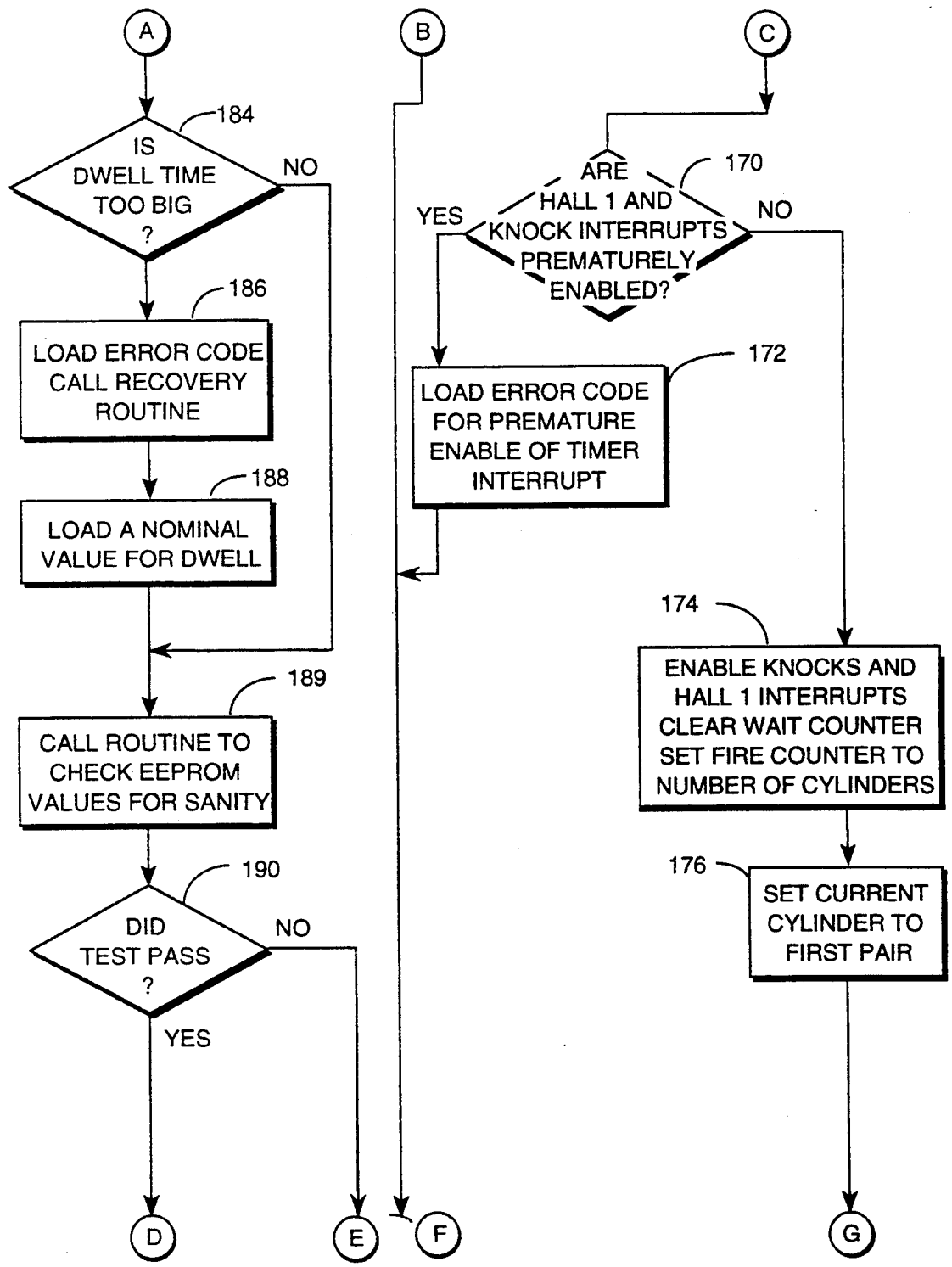
Figure 13C:
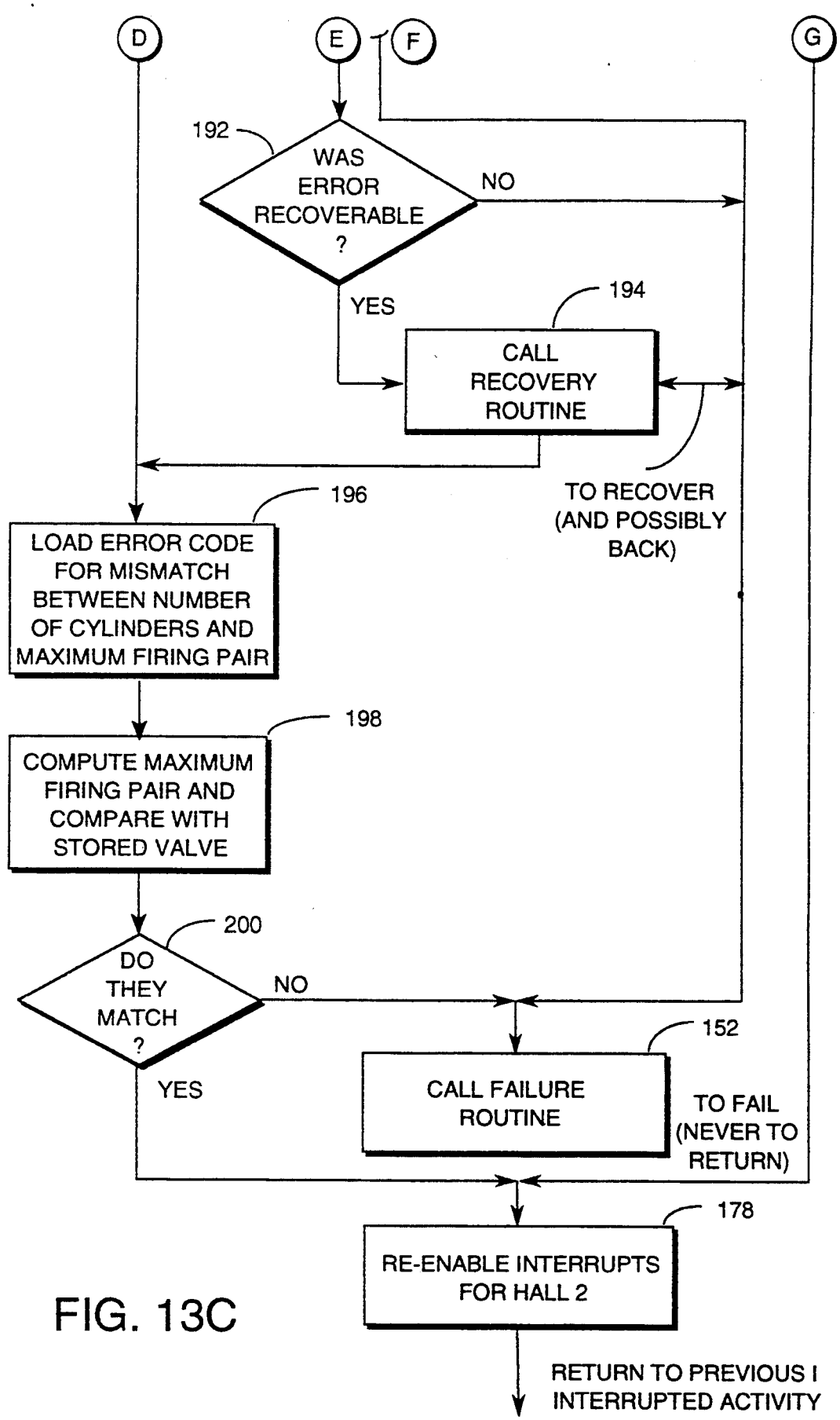

FIG. 12 depicts a structure chart for the HALL 1 subroutine depicted in greater detail in the flow charts shown in FIGS. 17A-17K. The HALL 1 subroutine 260 is executed by the microprocessor 36 upon each receipt of a Hall 1 interrupt from the sensor 42. As discussed above, a Hall 1 interrupt causes the microprocessor 36 to look to the vector table stored in the ROM 76 which in turn causes the microprocessor 36 to start executing the HALL 1 subroutine. During the execution of the HALL subroutine, the microprocessor 36 measures the reference interval representing the time since the previous cylinder hit top dead center and the microprocessor 36 uses this calculated reference interval to predict when the next subsequent cylinder in the firing order will reach top dead center. More particularly, the microprocessor 36 computes the delay to the firing of the spark for the subsequent cylinder, the delay to spark (DTS), being calculated from the reference interval and the advance value calculated by the ADVANCE subroutine discussed above. During the HALL 1 subroutine, a delay to the start of dwell (DTD) is also calculated based upon the delay to start value and the dwell time calculated in the DWELL subroutine discussed above.

If the engine is running at a constant, midrange speed, the HALL 1 subroutine 260 calls a subroutine SMALL RI that computes the spark time and sets the spark time equal to the delay to spark value plus the current time. The SMALL RI routine also computes the time at which dwell is to start and sets this time equal to the delay to dwell value, DTD, plus the current time. If the reference interval is not too small for a normal dwell period, the SMALL RI subroutine 262 calls a subroutine ARM. The ARM subroutine 264 arms the cylinder to be fired next for a normal dwell period. The ARM subroutine 264 calls a subroutine OCSET UP 266 which loads an output compare timer for the coil driver associated with cylinder to be fixed with the delay to dwell, DTD, value. When the delay to dwell time has expired an interrupt is generated. The microprocessor 36 responds to the output compare interrupt for the particular cylinder to be fired next by executing the associated coil driver routine at block 112, 116, 120 or 124 as depicted in FIG. 12 at block 268. The coil driver routine 268 sets the appropriate coil driver output to a particular cylinder pair of which the cylinder to be fired next is a member and calls a subroutine OCCOIL 269. The OCCOIL subroutine 269 sets a flag to indicate that the coil associated with the cylinder to be fired is entering dwell and loads the delay to spark value in the output compare timer. Thereafter, the OCCOIL subroutine 269 calls a FIRE SET UP routine 270 that sets the coil driver output for the particular cylinder pair to go to zero when the real timer is equal to the value of the output compare timer. When the coil driver output goes to zero indicating that the delay to spark time has expired, the associated coil driver 21-24 shuts off current to its respective coil 31-34 to generate a high energy spark in the cylinder approaching top dead center and to generate a low energy spark in the other cylinder of the pair. After firing the cylinder with the high energy spark, the OCCOIL subroutine calls a FIRE CLEAN UP subroutine 272 in order to reset various flags and variables.

If the SMALL RI subroutine 262 determines that the reference interval is too small for a normal dwell period, the SMALL RI subroutine 262 calls a FORCE subroutine 274. The FORCE subroutine 274 calls a subroutine check 265 that checks the speed of the engine and determines whether a particular cylinder pair is allowed to operate. If so, the FORCE subroutine 274 forces the coil associated with the cylinder to be sent into dwell by calling the FIRE SET UP routine 270.

If the engine is running at a slow speed, the HALL 1 subroutine 260 does not use the double precision SMALL RI subroutine 262 but makes the calculations for the spark time and dwell start time utilizing triple precision calculations. Thereafter, the HALL subroutine calls the ARM subroutine at 276 to ARM the cylinder for normal dwell and firing as discussed with reference to blocks 264, 266, 268, 269, 270 and 272.

If the engine is running at a very high speed, such that the delay to spark value calculated by the HALL 1 subroutine 260 is less than the dwell time computed by the DWELL subroutine, the HALL 1 subroutine 260 calls the FORCE subroutine at block 278 to force two or more cylinders into overlapping dwell. At block 278, the microprocessor 36 essentially plans the timing of the firing of a number of cylinders at the same time.

When the engine is accelerating, a Hall 1 interrupt may be generated indicating that a particular cylinder has reached top dead center while that particular coil is in or approaching dwell. In the event of such an occurrence, the HALL 1 subroutine 260 immediately sets up the cylinder for a forced firing at block 280 and thereafter calls the FIRE CLEAN UP subroutine at block 282.

If a real timer overflow should occur simultaneously with a Hall 1 interrupt, the Hall 1 interrupt has priority. During the execution of the Hall 1 interrupt routine, the microprocessor 36 calls a timer routine at block 284 wherein the timer routine calls either the ARM subroutine or the FORCE subroutine to arm a cylinder for a normal dwell or force the dwell depending on the size of the start of dwell time calculated therein.

More particularly, as shown in the flow chart of FIGS. 17A-17K, in response to the Hall 1 interrupt from the sensor 42, the microprocessor 36 enters the HALL 1 subroutine at block 285 as directed by the vector table stored in the ROM 76. At block 285 the microprocessor 36 re-enables the Hall 1 interrupts. Thereafter, at block 287 the microprocessor 36 determines whether this is the first time through the HALL 1 subroutine after powering up. If it is, at block 289 the microprocessor 36 indicates that a history is now available and at block 291 fetches the timer value which is saved as history. The microprocessor 36 at block 293 determines whether a timer overflow occurred and if so, checks at block 295 to see whether the Hall 1 interrupt or the timer overflow came first. If the timer is not close to rolling over as determined at block 296, the microprocessor 36 at block 298 eliminates the timer overflow interrupt bit and calls the timer routine as discussed in detail below. At block 300 the microprocessor saves the overflow count of the timer as history. Thereafter at block 302 the microprocessor 36 adjusts the cylinder count and calls a routine to cycle the shift interrupt counters.

Figure 17A:
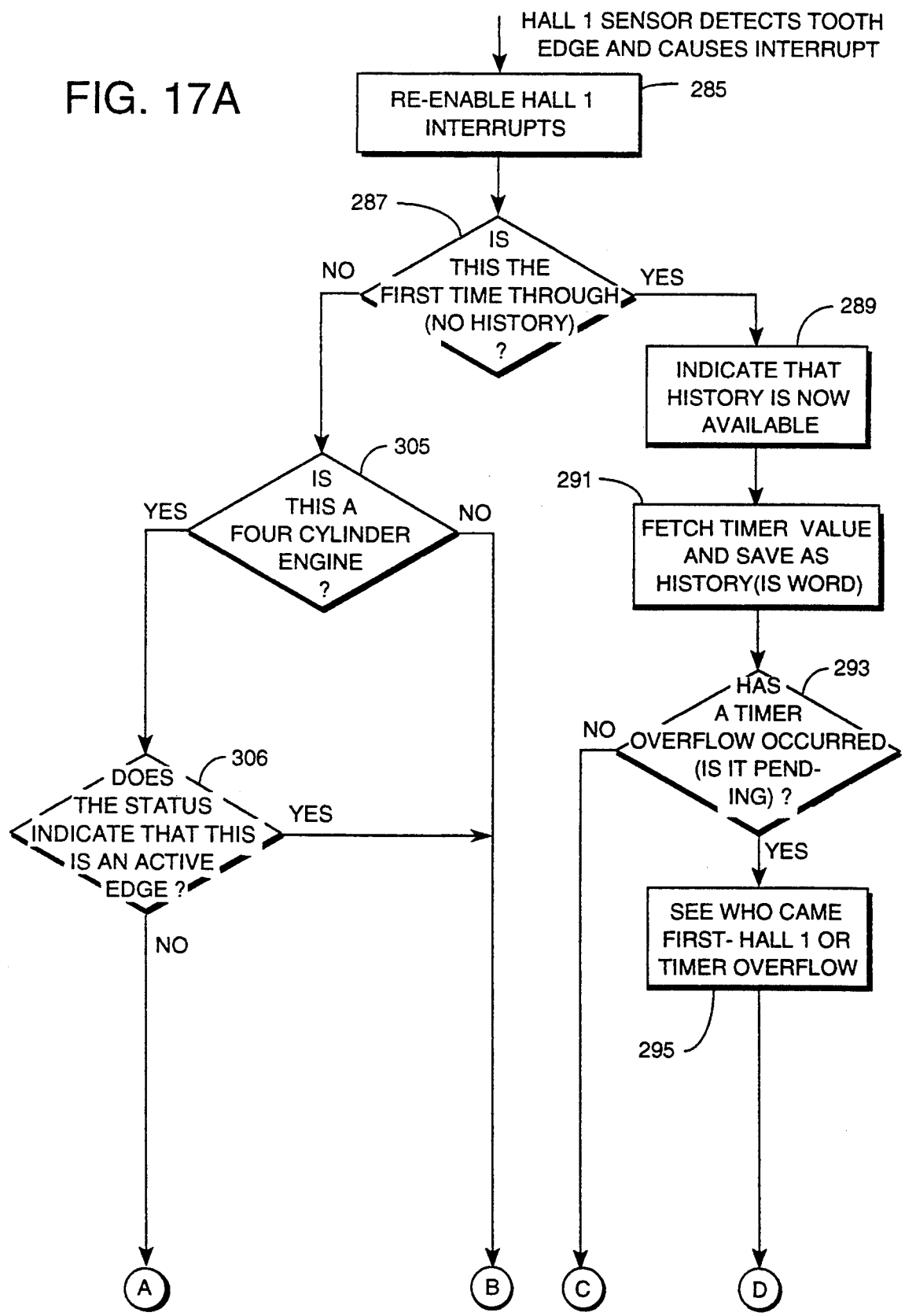
Figure 17B:
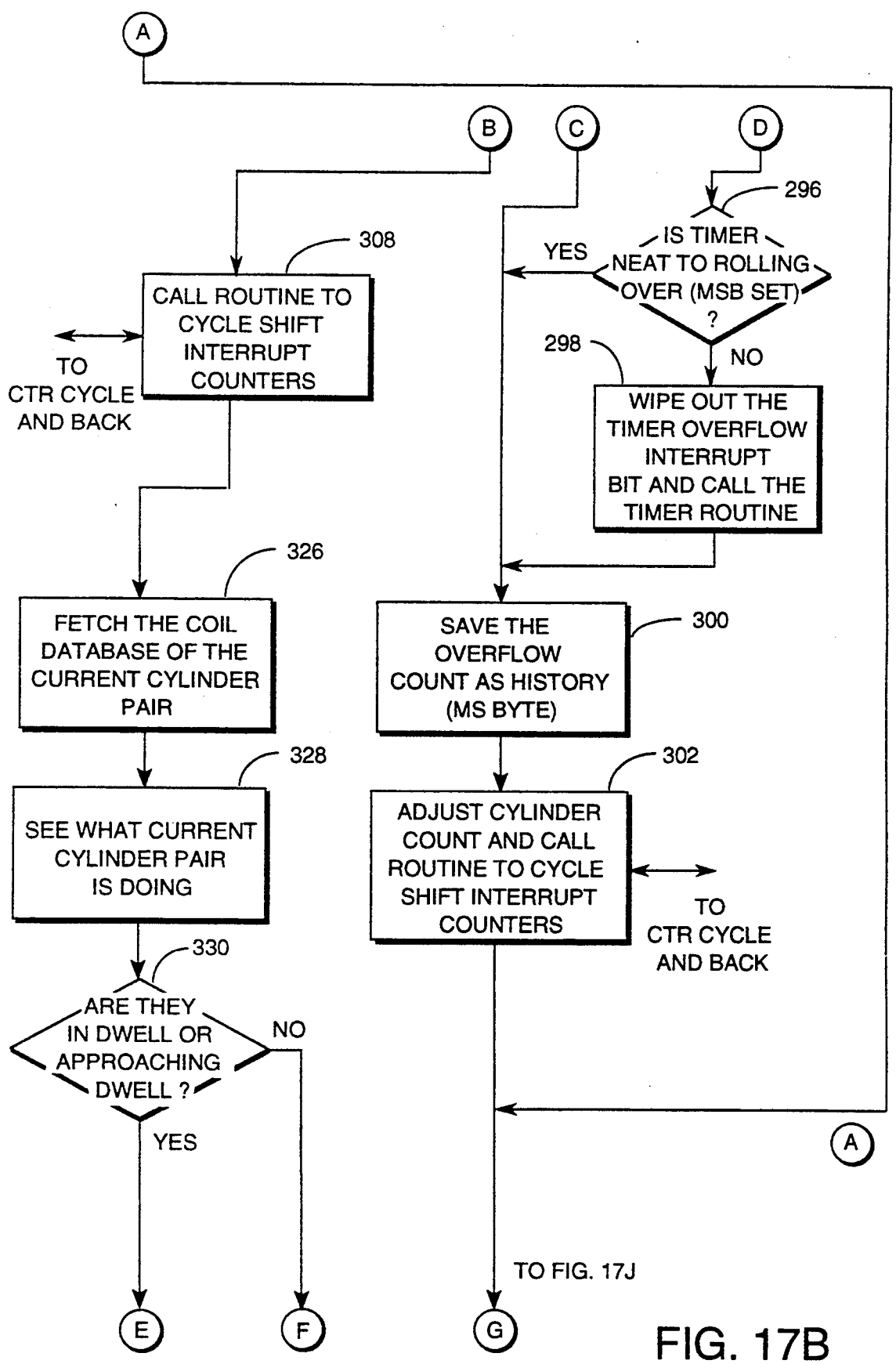
Figure 17C:
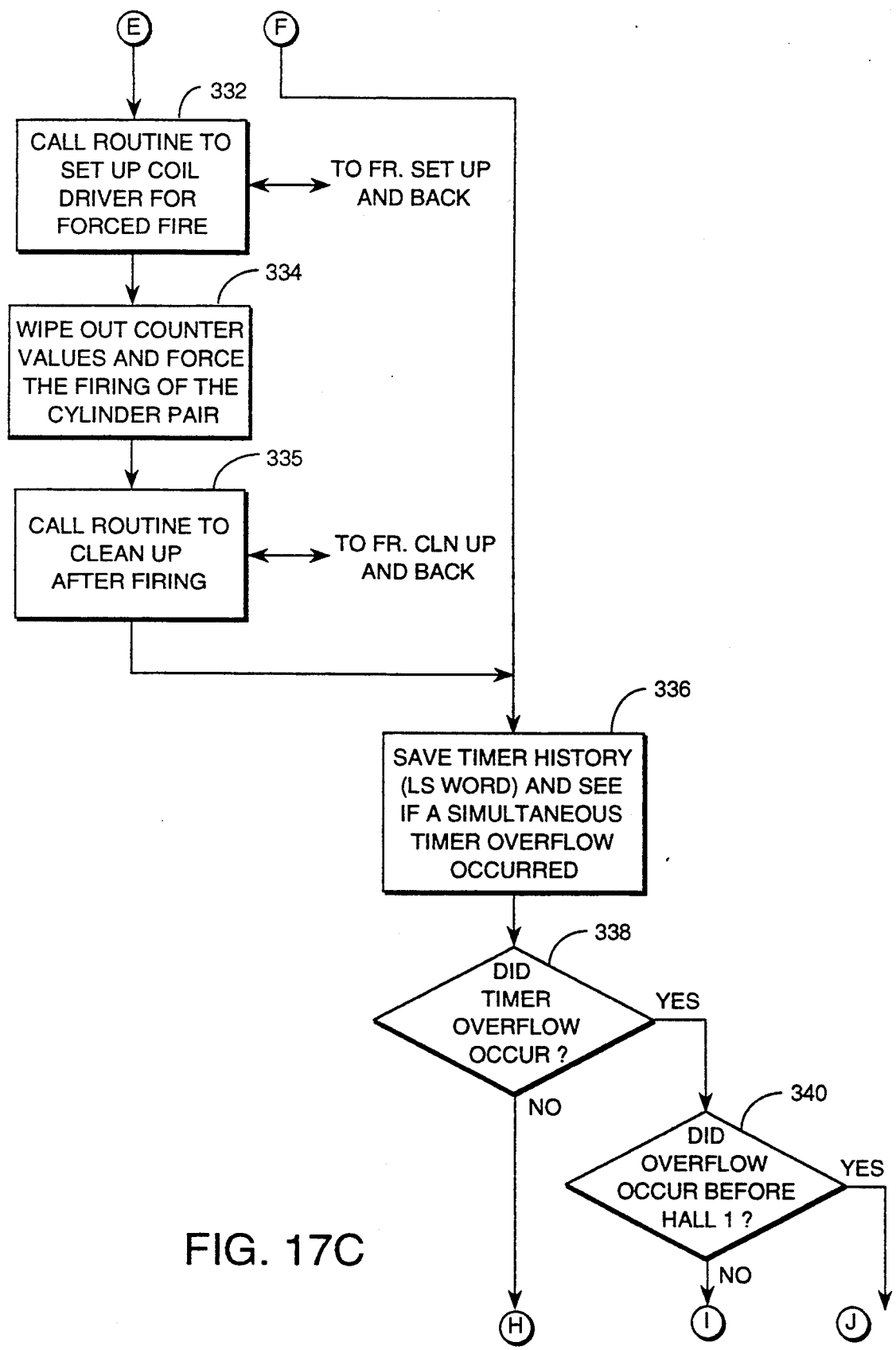
Figure 17D:
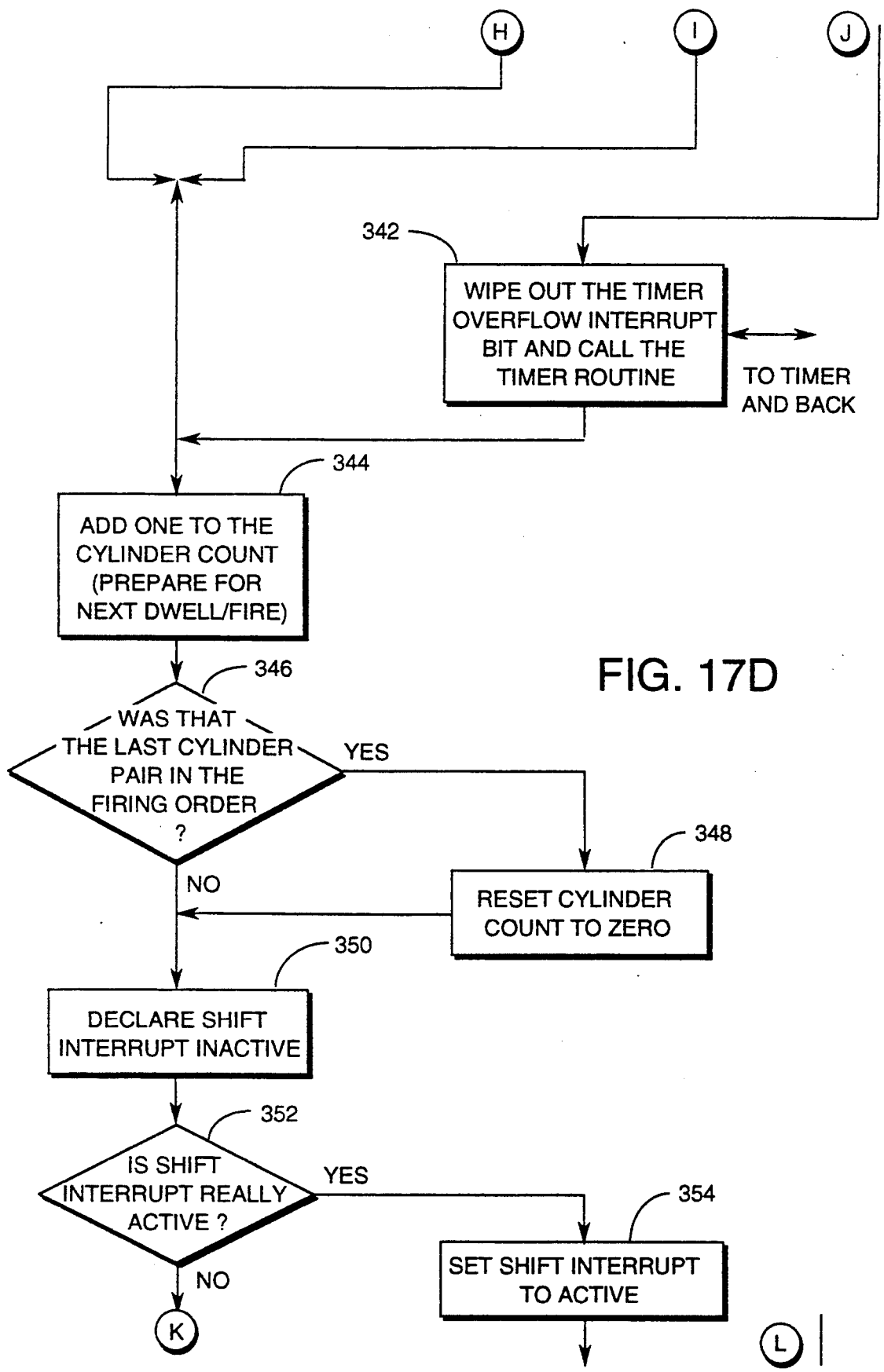
Figure 17F:
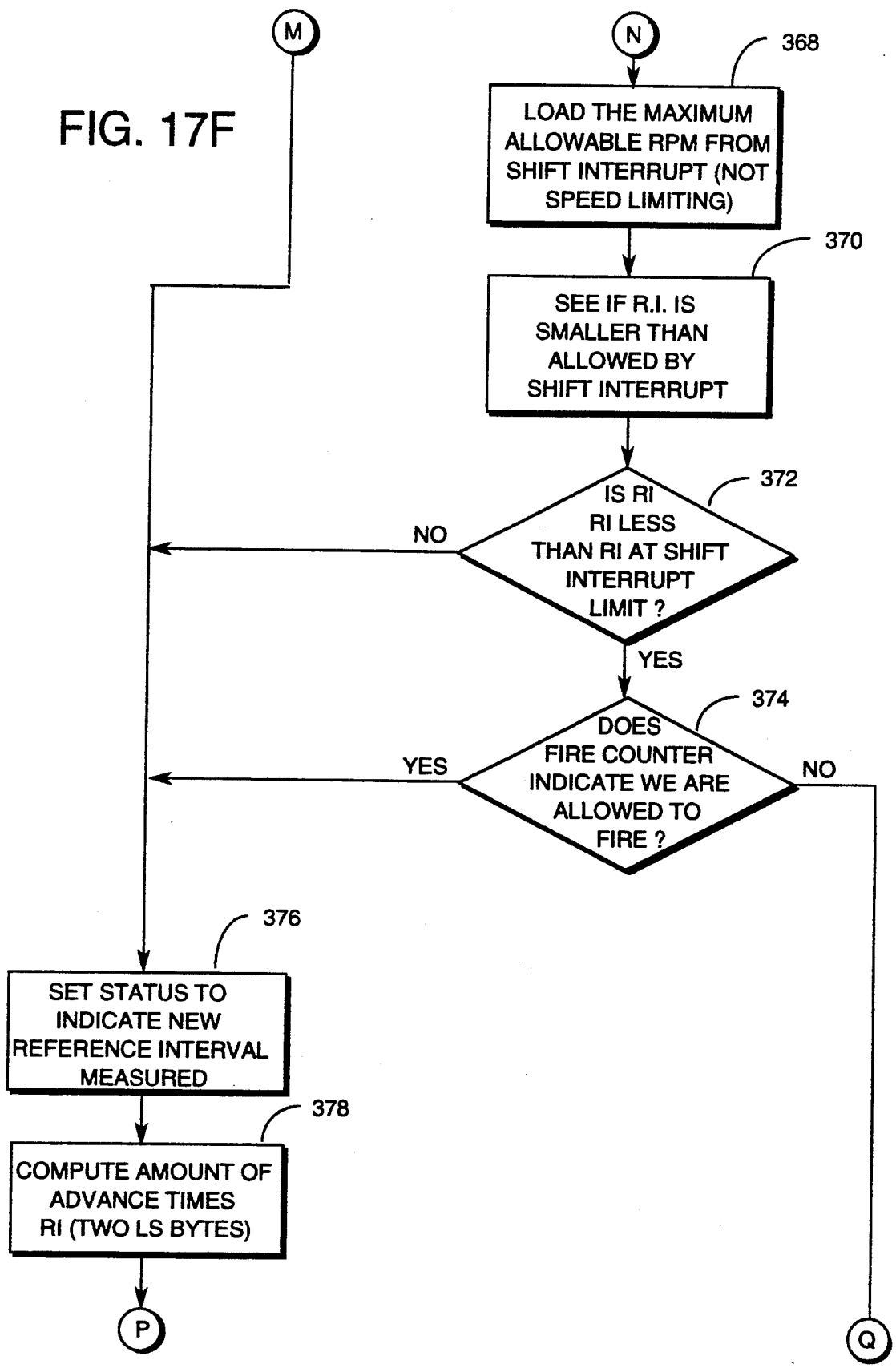
Figure 17G:
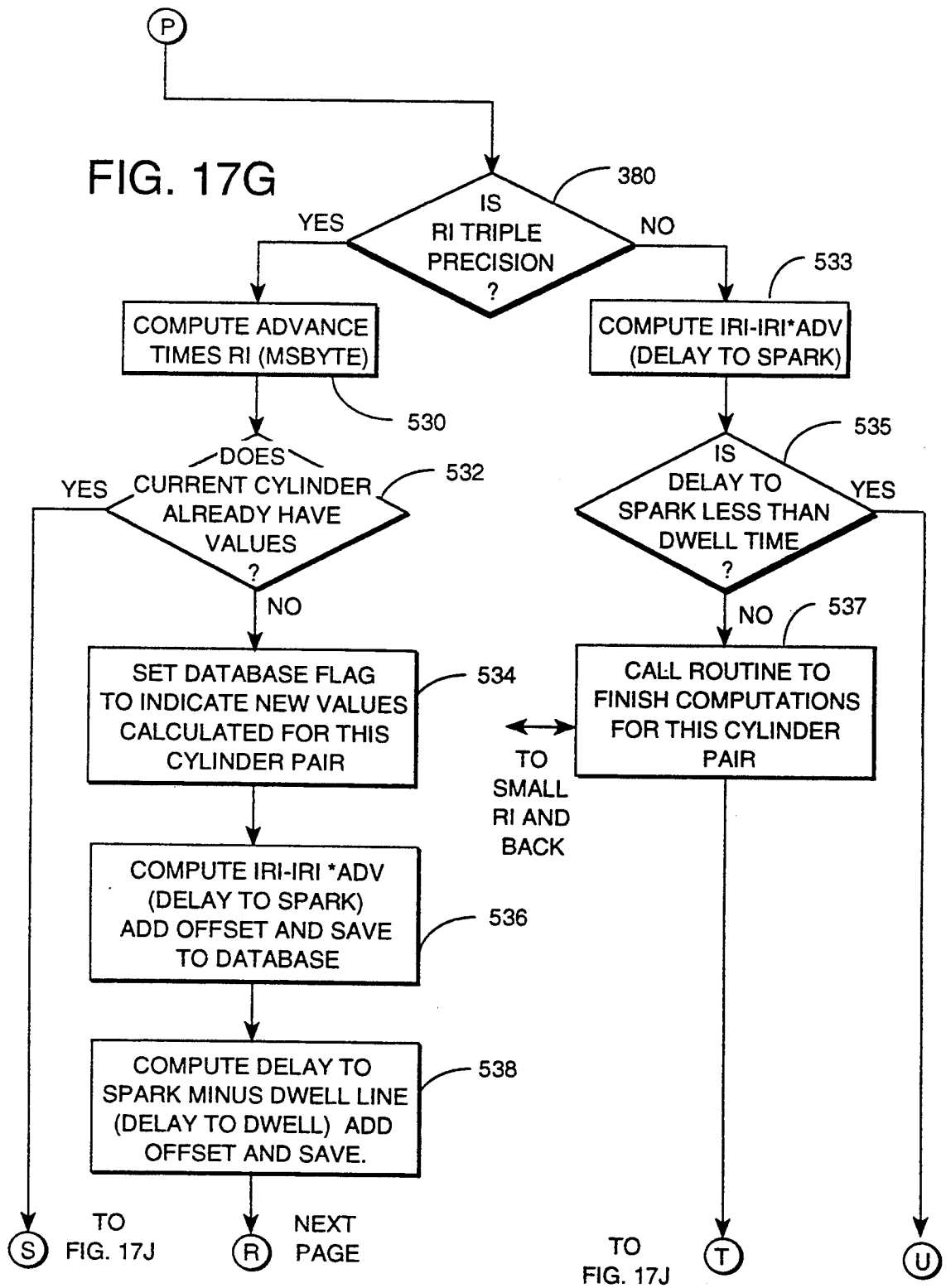
Figure 17J:
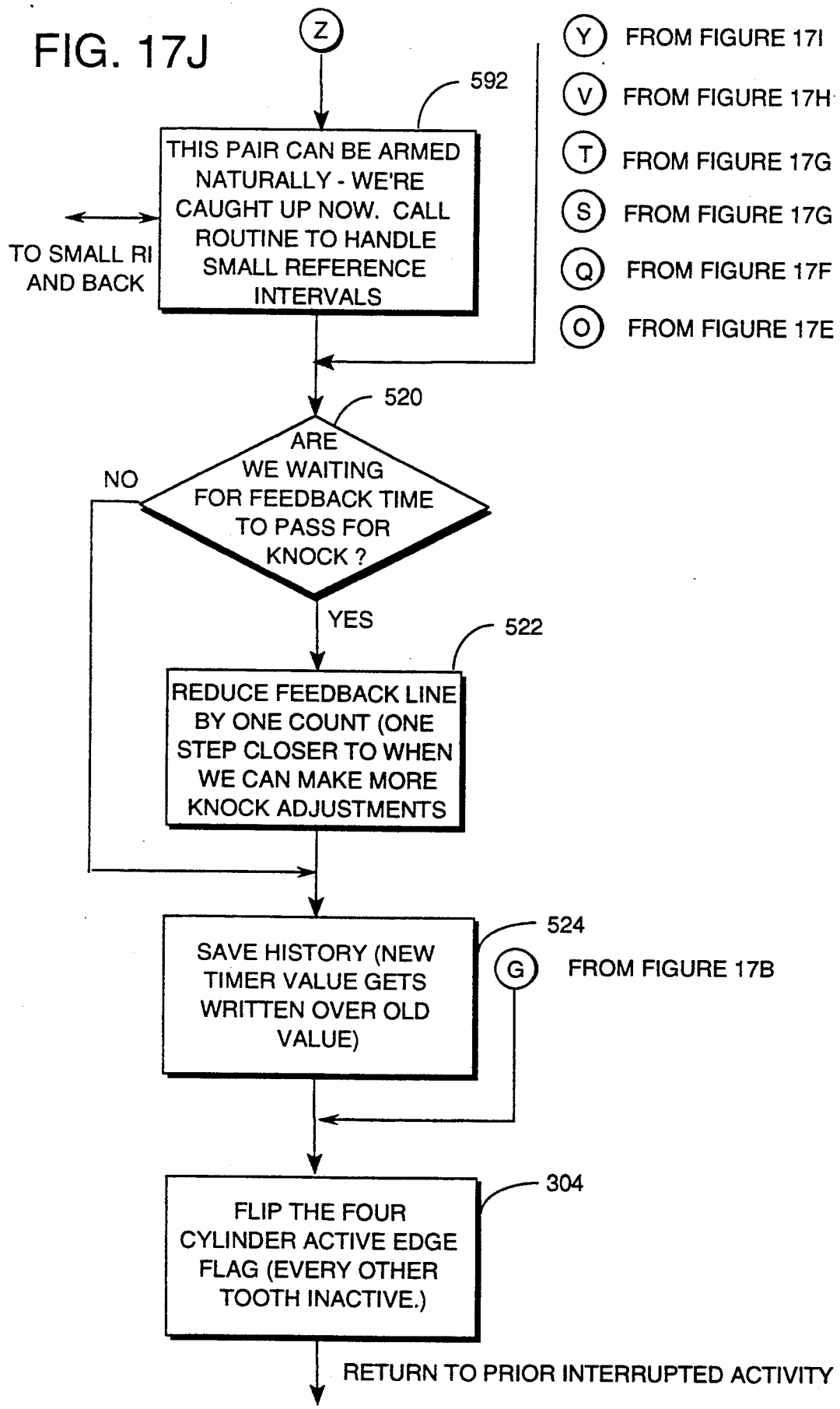
Figure 17K:
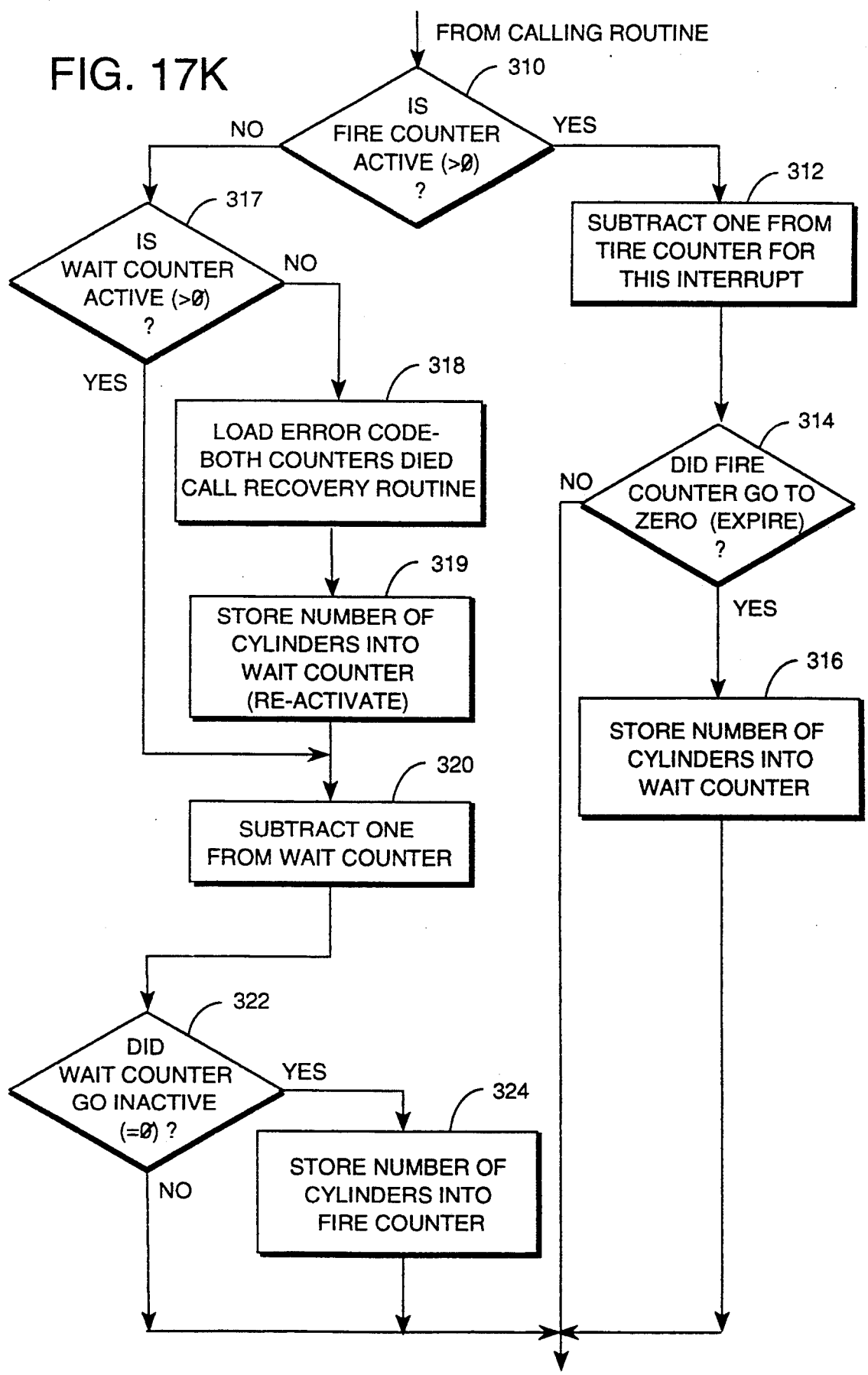

The routine to cycle the shift interrupt counters is depicted in FIG. 17K. This routine enables the engine speed to be brought down to idle when shifting between forward and reverse in order to keep from grinding the gears. Although this can be accomplished by cutting off sparks, such drastic action may let fuel accumulate causing a backfire when sparking resumes. Therefore, the preferred action when shifting is to drop every other spark. More particularly, it is desirable to fire all of the cylinders, then skip all of the cylinders, then fire all of the cylinders, etc. until the speed reduction is achieved. In order to drop sparks on alternate firing cycles a pair of counters, a wait counter and a fire counter, are employed. These counters alternately count down the number of active cylinders. When one counter reaches zero the other counter is loaded with the number of cylinders. The second counter then counts down until it reaches zero at which time the first counter is reloaded. The active counter is decremented by one in response to each Hall 1 interrupt. When the shift interrupt 72 is active, the cylinders 11-18 are armed only if the fire counter contains a non-zero number. This successfully limits the sparking to alternate firing cycles of the cylinders.

More particularly, as shown in FIG. 17K upon entering the cycle shift interrupt counters at block 310, the microprocessor 36 determines whether the fire counter is active, i.e. whether the fire counter is non-zero. If the fire counter is active, the microprocessor 36 at block 312 decrements the fire counter by one for this Hall 1 interrupt. Thereafter, at block 314 the microprocessor determines whether the fire counter was decremented to zero and if so, the microprocessor stores the number of cylinders into the wait counter at block 316 and thereafter returns to the calling routine which is the HALL 1 subroutine. If the microprocessor 36 determines at block 310 that the fire counter is not active the microprocessor at 317 determines whether the wait counter is active, i.e. non-zero. If the wait counter is not active and the fire counter is not active the microprocessor at block 318 loads an error code indicating that both of the counters have died. The microprocessor at block 318 also calls a recovery routine. Thereafter, at block 319 the microprocessor stores the number of cylinders into the wait counter to reactivate the counter. At block 320 the microprocessor subtracts one from the wait counter and at block 322 determines whether the wait counter was decremented to zero or not. If the wait counter was decremented to zero, the microprocessor 36 at block 324 stores the number of cylinders into the fire counter and returns to the HALL 1 subroutine.

After returning to the HALL 1 subroutine from cycling the shift interrupt counters at block 302 the microprocessor 36 proceeds to block 304 depicted in FIG. 17J where the microprocessor flips the four cylinder active edge flag. Since a four cylinder engine utilizes an interrupter wheel 50 having eight teeth, every other tooth must be ignored. Block 304 accomplishes this feature. After completing block 304, the microprocessor returns to its prior interrupted activity.

Returning to FIG. 17A, after the system has been initialized and the HALL 1 subroutine has been executed at least once so that a history exists, in response to subsequent Hall 1 interrupts received by the microprocessor 36 from the Hall 1 sensor 42, the microprocessor proceeds to block 305 from block 287. At block 305 the microprocessor 36 determines whether the engine has four cylinders or not. If the engine does have four cylinders, at block 306 the microprocessor determines whether the four cylinder active edge flag is set or not indicating that the interrupt represents a cylinder that should be firing or an interrupt that should be ignored. If the status indicates that the interrupt represents an active tooth edge for a four cylinder engine, the microprocessor 36 proceeds to block 308. If, however, the status indicates that the edge is not active, the microprocessor proceeds to block 304 in which the four cylinder active edge flag is flipped.

Figure 25:
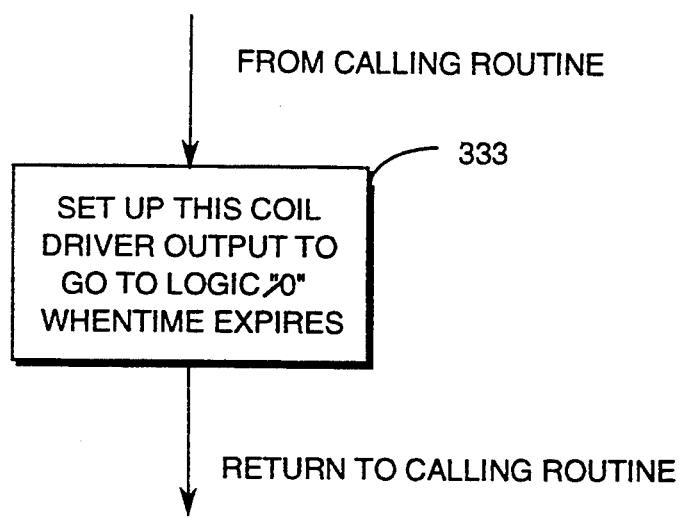
FIG. 25 is a FIRE SETUP software subroutine utilized by the timing controller shown in FIG. 1.

At block 308 the microprocessor 36 calls the routine to cycle the shift interrupt counters as discussed above with reference to FIG. 17K. After returning from the cycle shift interrupt counter routine, the microprocessor at block 326 obtains the coil data base of the current cylinder pair and at block 328 determines what the current cylinder pair is doing. If the microprocessor at block 330 determines that the current cylinder pair generating the Hall 1 interrupt is in dwell or approaching dwell, this means that the system is behind in firing since one member of the cylinder pair has already reached top dead center. This occurs when the engine is accelerating. In this event, the microprocessor 36 at block 332 calls the FIRE SET UP routine to set up the coil driver associated with the current cylinder pair for a forced fire. As shown in FIG. 25, upon entering the FIRE SET UP subroutine, the microprocessor at block 333 sets up the coil driver output associated with the current cylinder pair to go to logical zero when the time expires. Thereafter, the microprocessor 36 returns to the HALL 1 subroutine at block 334 and wipes out the counter values so that the coil driver output goes to logical zero. When the coil driver output on the appropriate line 81, 82, 83 or 84 goes to zero, the respective coil driver 21–24 responds by cutting off current to the respective coil 31–34. When current is cut off in the coil, the field created by the current flowing there through collapses generating a high energy and a low energy spark in the associated cylinder pair so as to force the firing of the cylinder pair. Thereafter, the microprocessor 36 continues to block 335 to call the FIRE CLEAN UP subroutine.

Figure 26:
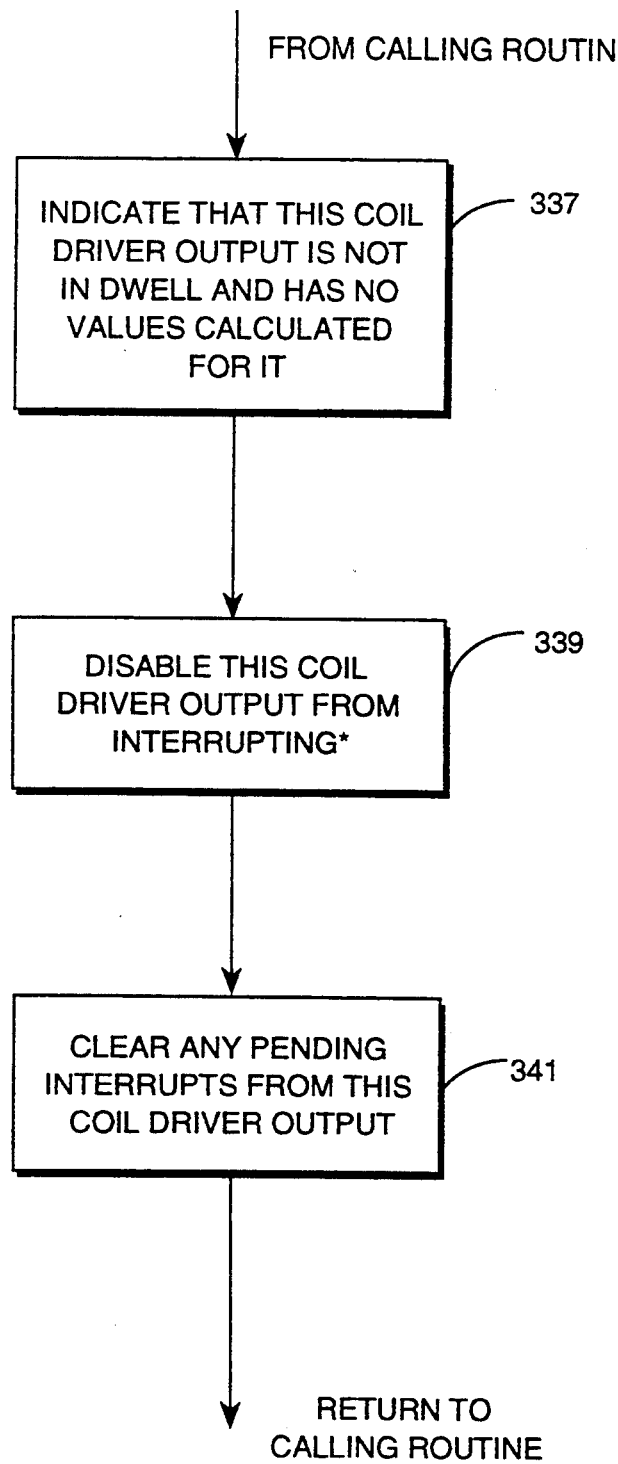
FIG. 26 is a flow chart illustrating a FIRE CLEANUP software subroutine utilized by the timing controller shown in FIG. 1.

As shown in FIG. 26 upon entering the FIRE CLEAN UP subroutine, the microprocessor at block 337 indicates the coil driver output is not in dwell and has no values calculated for it. Thereafter at block 339 the microprocessor 336 disables the coil driver output from interrupting so that the coil output timer will no longer cause an interrupt when the timer's value matches the value of the real time clock. At block 341 the microprocessor 36 clears any pending interrupts from the coil driver output and thereafter returns to the calling subroutine, HALL 1.

Upon returning to the HALL 1 subroutine, the microprocessor 36 at block 336 saves the least significant word of the timer history to determine if a simultaneous timer overflow occurred. If so, the microprocessor 36 determines at block 340 whether the overflow occurred before Hall 1. If the value latched into the free running timer of the system is large, then the microprocessor determines that the timer overflow occurred after the Hall 1 interrupt and can wait to be processed. If, however, the free running timer is latched with a very small value therein, then the overflow occurred before the Hall 1 interrupt and should be taken into account before computing the reference interval. More particularly, if the timer overflow interrupt occurred before the Hall 1 interrupt, the microprocessor 36 at block 342 wipes out the timer overflow interrupt byte and calls the timer routine.

Figure 15B:
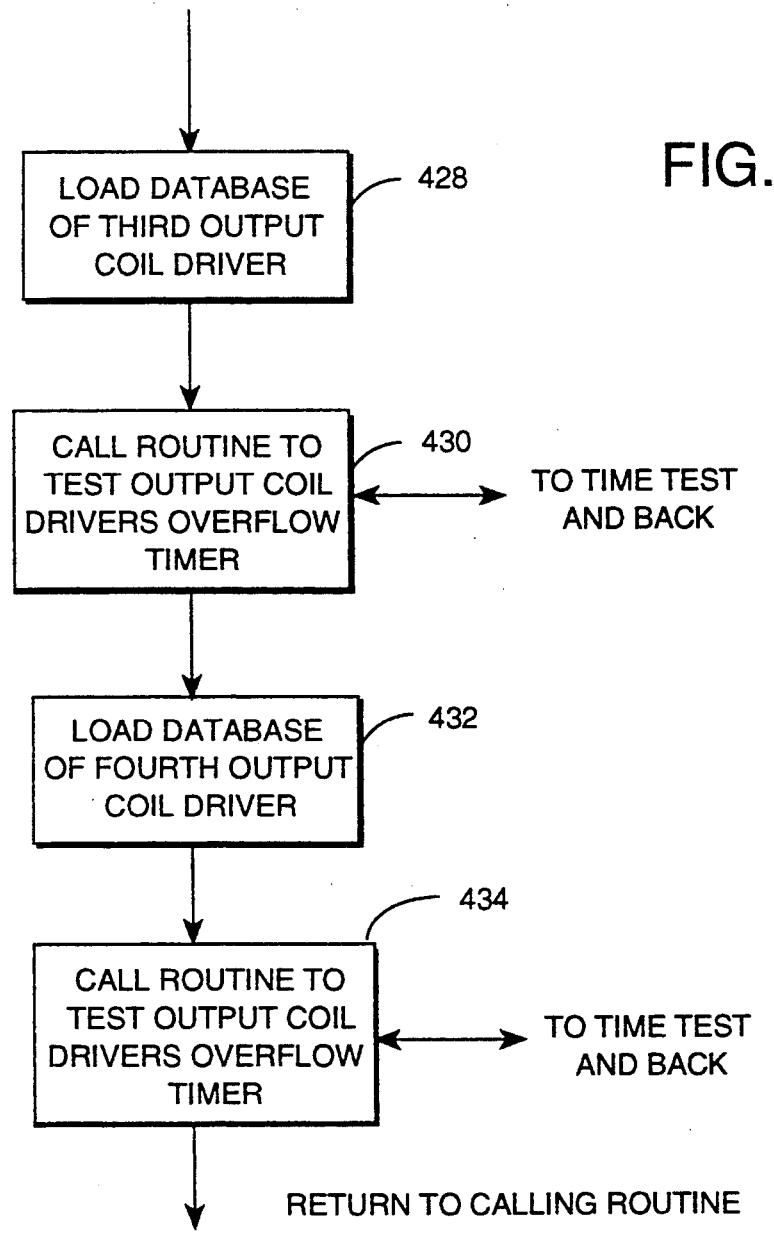
Figure 16:
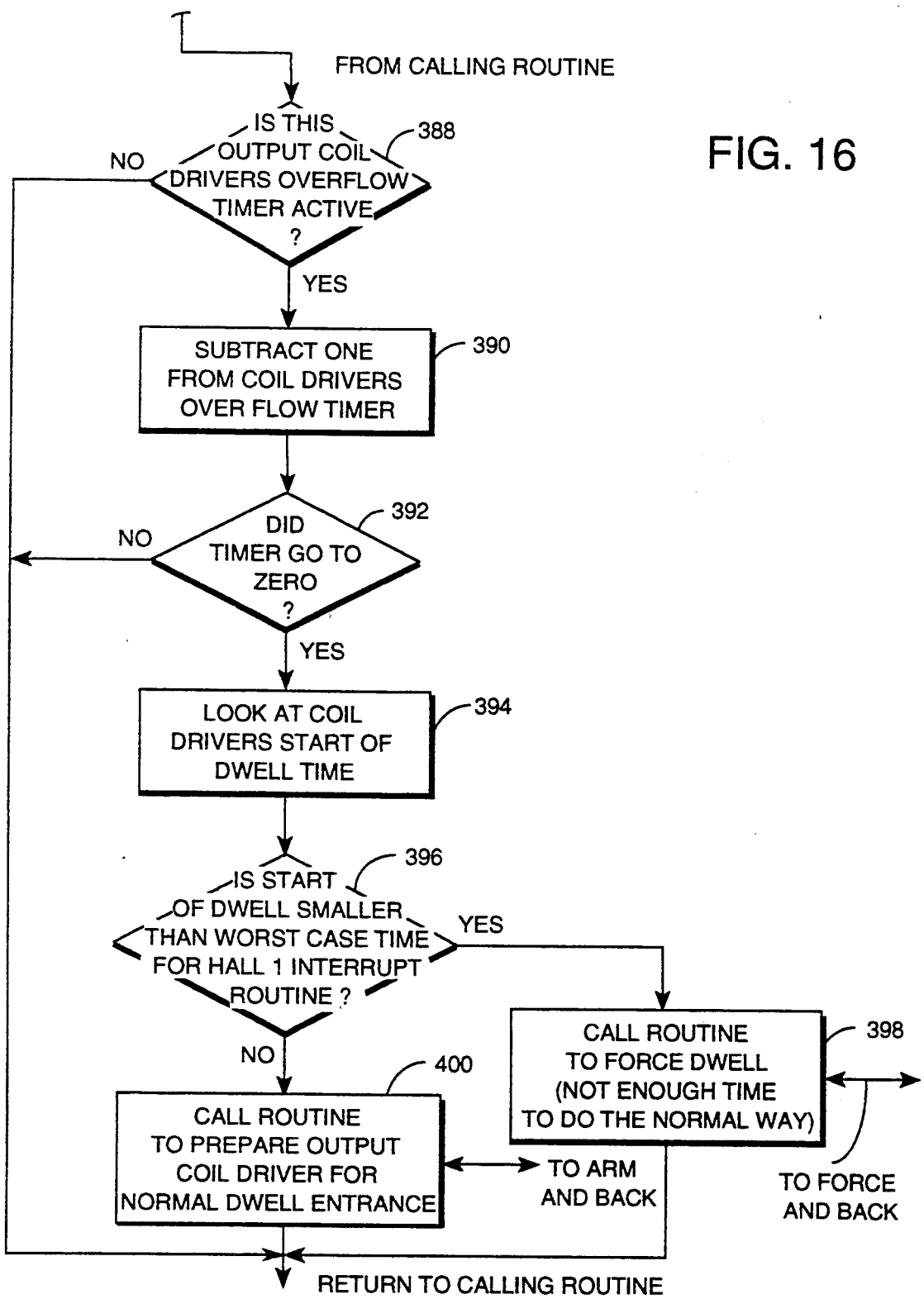
FIG. 16 is a flow chart illustrating the TIMER TEST software subroutine utilized by the timing controller shown in FIG. 1.

Upon entering the timer routine shown in FIG. 15A at block 382 the microprocessor 36 adds one to the timer overflow counter and thereafter at block 384 loads the data base for the first output coil driver 21 into a scratch pad area of the RAM 78. At block 386 the microprocessor 36 calls the TIME TEST subroutine to test the output coil driver's overflow timer. As shown in FIG. 16, upon entering the TIME TEST subroutine at block 388, the microprocessor determines whether this output coil driver's overflow timer is active or not. If the coil driver's overflow timer is not active, the microprocessor returns to the TIMER subroutine. However, if this coil driver's overflow timer is active, at block 390 the microprocessor 36 decrements the coil driver's overflow timer by one. If the timer does not go to zero as determined by the microprocessor at block 392, the microprocessor returns to the TIMER routine. However, if the coil driver's overflow timer does go to zero, at block 394, the microprocessor looks at the coil driver's start of dwell time. If the start of dwell time is smaller than the worse case time for a Hall 1 interrupt routine as determined by the microprocessor at block 396 indicating that there is not sufficient time to arm the coil for a normal dwell entrance, the microprocessor at block 398 calls the FORCE subroutine to force the dwell period of the cylinder.

Figure 22:
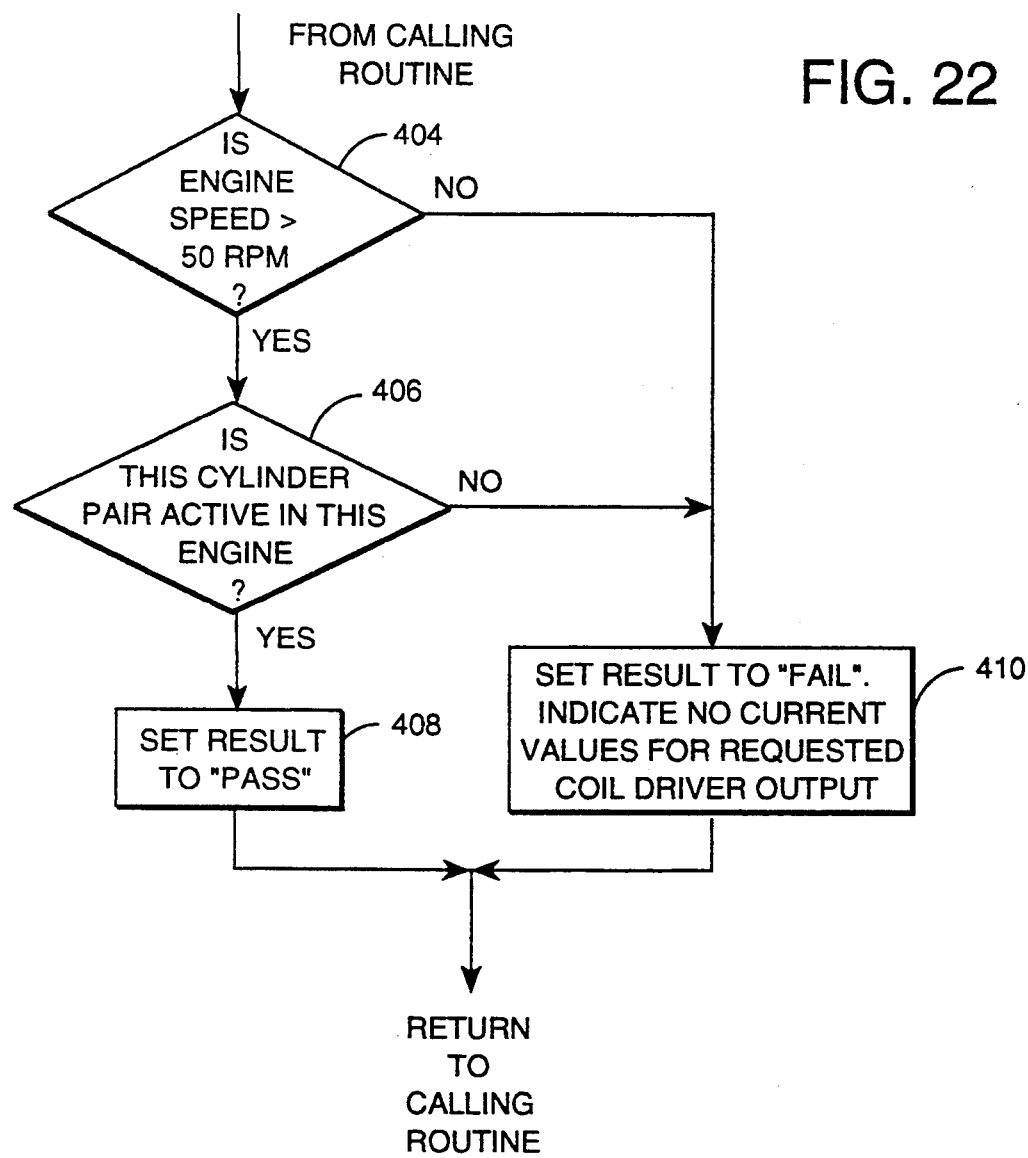
FIG. 22 is a flow chart illustrating a CHECK software subroutine utilized by the timing controller shown in FIG. 1.
Figure 24A:
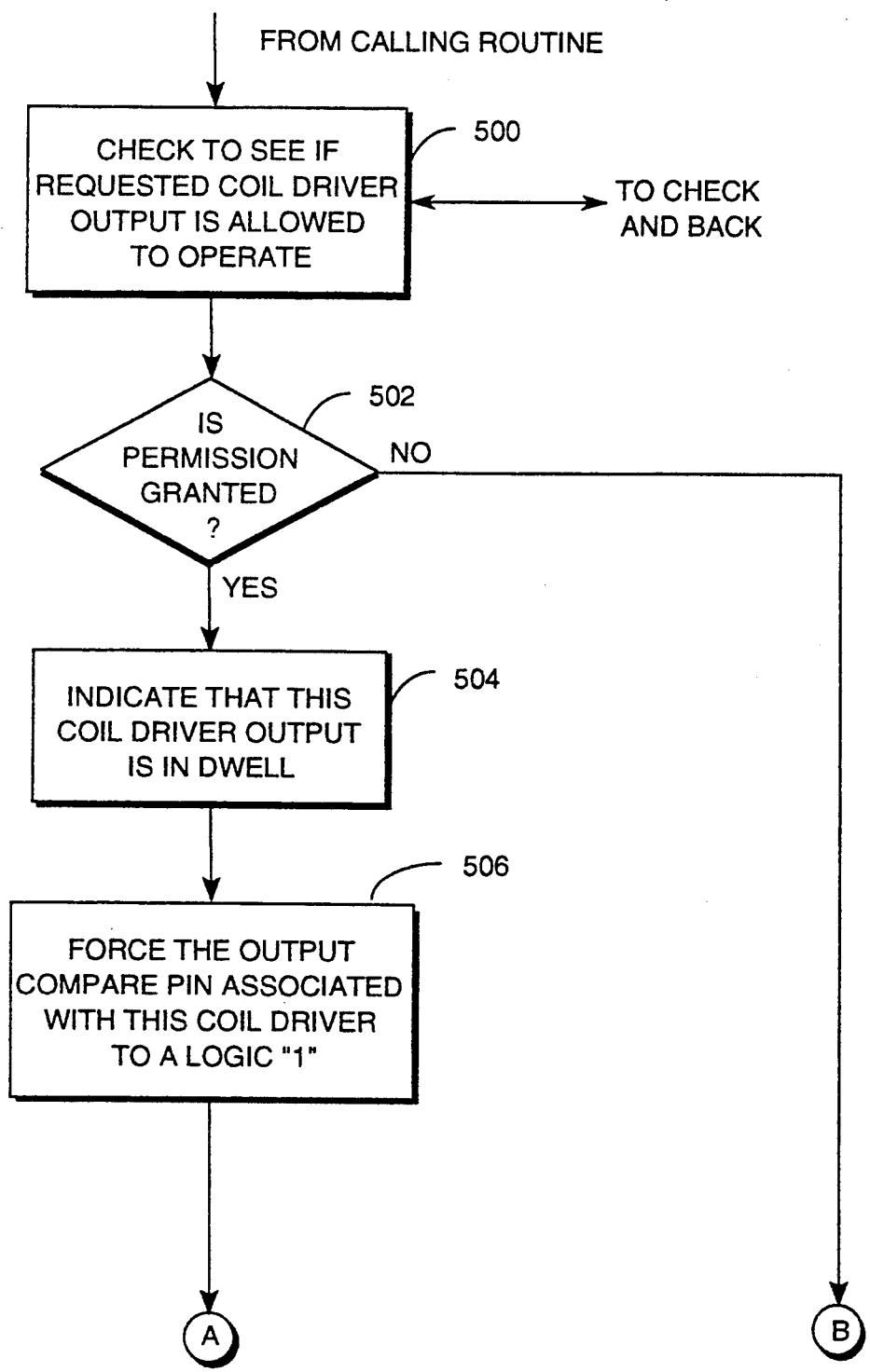
FIGS. 24A-24B form a flow chart illustrating a FORCE subroutine utilized by the controller shown in FIG. 1.

As shown in FIG. 24A, upon entering the FORCE subroutine at block 500, the microprocessor 36 checks to see whether the requested coil driver output is allowed to operate or not by calling a CHECK subroutine. The CHECK subroutine is shown in FIG. 22. At block 404 the microprocessor determines whether the speed of the engine is greater than 50 RPM and if not, the microprocessor at block 410 sets the result to "fail" so as to indicate that there are no current values for the requested coil driver output. The microprocessor thereafter returns to the CALLING routine which is in this case the FORCE subroutine. If, however, the engine speed is greater than 50 RPM, the microprocessor at block 406 determines whether this cylinder pair is active in this engine. If not, the micro proceeds to block 410. If, however, the speed of the engine is greater than 50 RPM and the current cylinder pair is active, at block 408 the microprocessor sets the results of the check test to "pass" and returns to the CALLING routine.

Upon re-entering the FORCE subroutine at block 500, the microprocessor at block 502 determines whether the coil driver is allowed to operate. If the check test failed, the microprocessor returns to the calling routine. However, if the check test passed, at block 504 the microprocessor 36 indicates that the current coil driver output is in dwell and at block 506 forces the output compare pin associated with the coil driver to logical one. In response to a logical one on the output line of the coil driver 21–24, the coil driver starts to pull current through the coil so that the dwell period is entered. Thereafter, at block 508 the microprocessor 36 loads the spark time from the coil data base into the output compare timer for this coil driver. At block 508 the microprocessor calls the FIRE SET UP routine discussed above with respect to FIG. 25 in order to set up the coil driver for firing such that the coil driver output will go to a logical zero when the output compare timer containing the spark time expires. At block 511 the microprocessor then enables the coil driver output interrupts.

Figure 20:
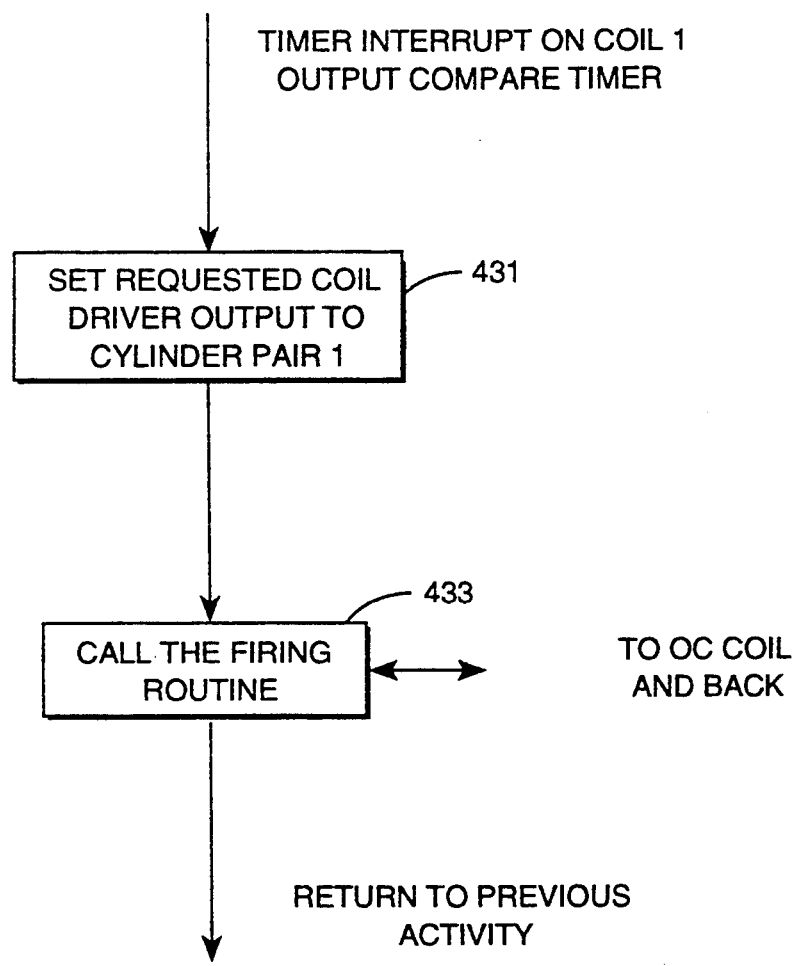
FIG. 20 is a flow chart illustrating the COIL No. 1 software subroutine utilized by the timing controller shown in FIG. 1.
Figure 21:
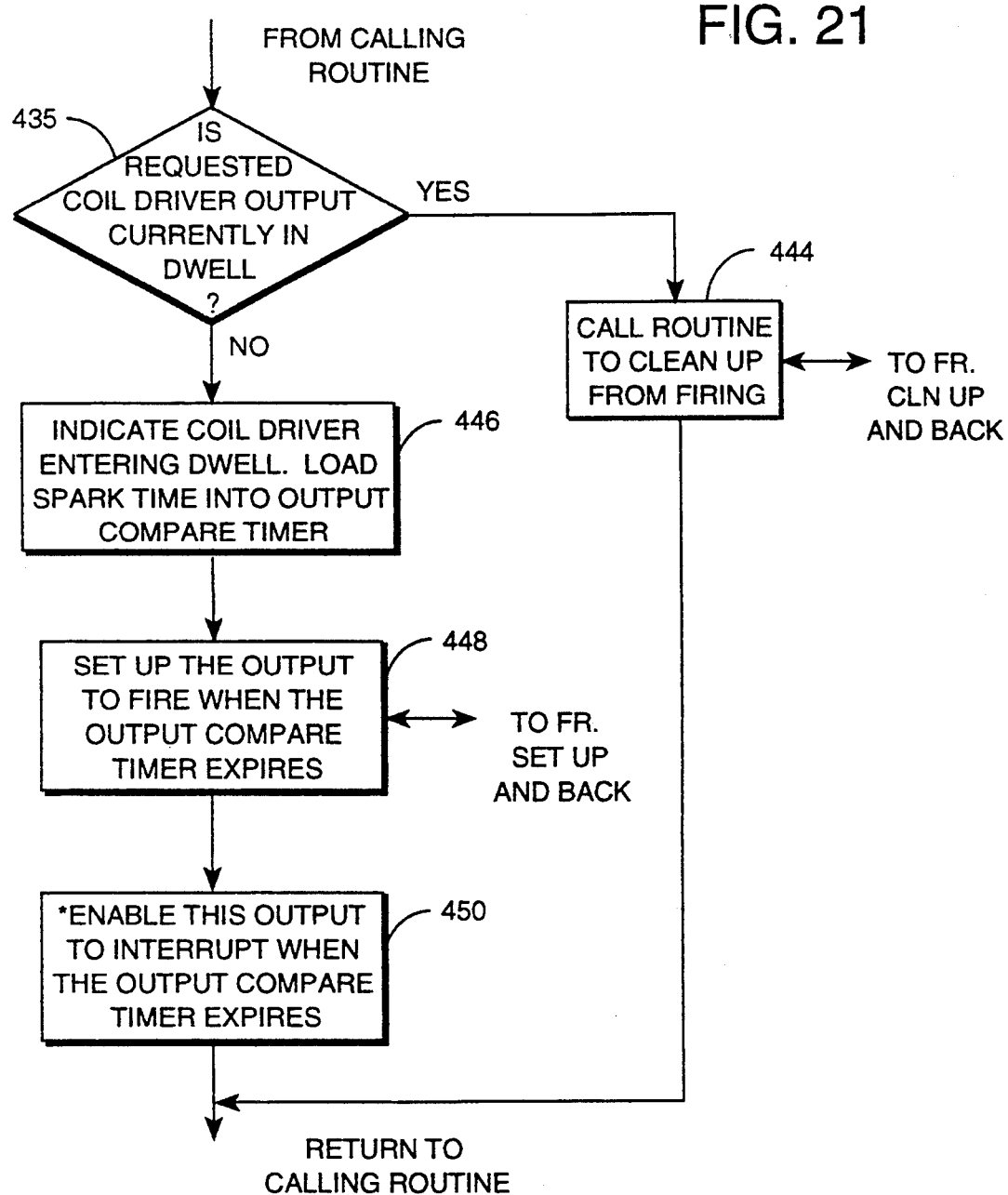
FIG. 21 is a flow chart illustrating the OCCOIL software subroutine utilized by the timing controller shown in FIG. 1.

When a timer interrupt occurs on a coil output compare timer such as on the coil 1 output compare timer, the microprocessor 36 is directed by the vector table stored in the ROM 76 to execute the coil output compare interrupt routine depicted for coil in FIG 20. Upon entering this routine at block 431 the microprocessor 36 sets the requested coil driver output to cylinder pair 1 and thereafter calls the FIRING routine at block 433. The FIRING routine is depicted in FIG. 21 and upon entering the routine the microprocessor at block 435 determines whether a requested coil driver output is currently in dwell. If so, this indicates that the cylinder has already fired so that at block 444 the microprocessor calls the FIRE CLEAN UP routine depicted in FIG. 26 as discussed above. If the requested coil driver output is not currently in dwell as determined at block 435 at block 446, the microprocessor 36 indicates that the coil driver is entering dwell and loads the spark time into the output compare timer. Thereafter, at block 448 the microprocessor sets up the output to fire when the output compare timer expires by calling the FIRE SET UP routine shown in FIG. 25.

Figure 18:
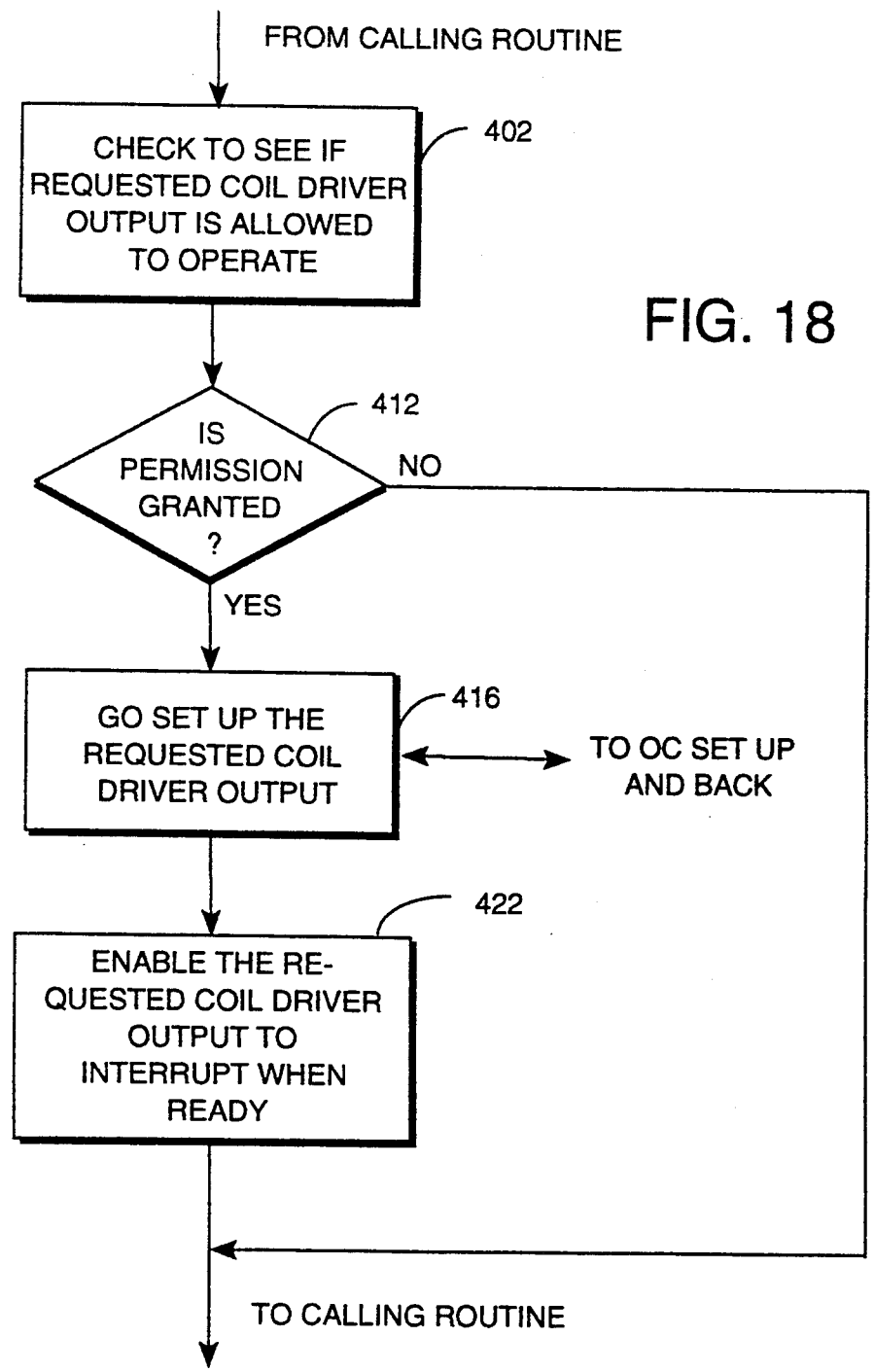
FIG. 18 is a flow chart illustrating an ARM software subroutine utilized by the timing controller shown in FIG. 1.
Figure 19:
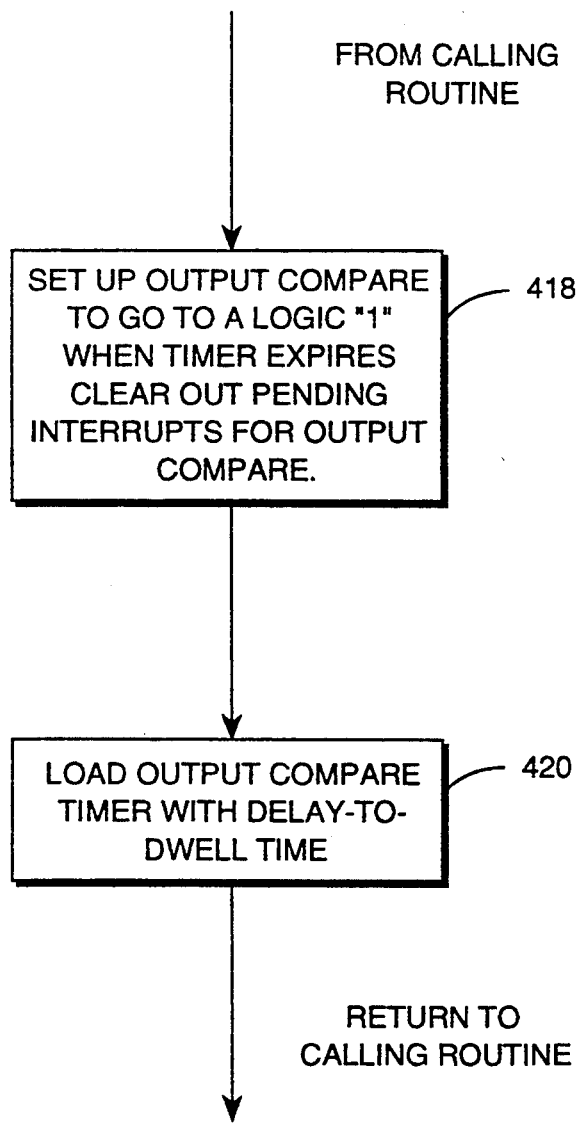
FIG. 19 is a flow chart illustrating the OCCOIL SET UP software routine utilized by the timing controller shown in FIG. 1.

With reference back to FIG. 16, if the microprocessor 36 determines that there is enough time to enter dwell in the normal manner, the microprocessor 36 at block 400 calls the ARM routine to prepare the output coil driver for a normal dwell entrance. Upon entering the ARM subroutine at block 402 as shown in FIG. 18, microprocessor 36 checks to see if the requested coil driver output is allowed to operate or not by calling the CHECK subroutine shown in FIG. 22 and discussed above. If the check test is past as determined by the microprocessor 36 at block 412, at block 416 the microprocessor calls the OC SET UP subroutine to set up the requested coil driver output, the OC SET UP routine being depicted in FIG. 19. Upon entering the OC SET UP routine at block 418 the output compare is set to go to logical one when the timer expires and the output compare timer is loaded at block 420 with the delay to dwell time. Upon returning to the ARM subroutine thereafter, the microprocessor at block 422 enables the requested coil driver output to interrupt when the delay to dwell time expires. When the delay to dwell time does expire, the interrupt causes the microprocessor to execute the COIL subroutine shown in FIG. 20 which in turn calls the OCCOIL subroutine shown in FIG. 21 to load the spark time into the output compare timer. When the spark time is reached the coil driver output on the respective line 81-84 goes to zero causing the coil driver to cut off current to the coil firing the current cylinder pair. Thereafter, the FIRE CLEAN UP routine is called. The microprocessor 36 then returns to the CALLING routine which in this case is the TIMER routine shown in FIG. 15.

Upon returning to the TIMER routine at block 386, the microprocessor at block 424 loads the database of the second output coil driver and at block 426 calls the routine to test the output coil driver's overflow timer 426 as discussed above. Thereafter, at block 428 the database of the third output coil driver is loaded and the AD-TIME TEST routine depicted in FIG. 16 again called at block 430. This procedure is again repeated at blocks 432 and 434 and upon completion, the microprocessor 36 returns to the HALL 1 subroutine at block 342.

If a timer overflow did not occur simultaneously with the Hall 1 interrupt, or if one did and the microprocessor has returned from the TIMER routine, at block 344 the microprocessor increments the cylinder count by one to plan for the dwell and firing of the next cylinder pair. At block 346 the microprocessor determines whether this is the last cylinder pair in the firing order and if so at block 348 the microprocessor resets the cylinder count to zero. At block 350 the microprocessor declares a shift interrupt inactive and at block 352 determines whether the shift interrupt really is active. If the shift interrupt is active the microprocessor at block 354 sets the shift interrupt active and proceeds to block 356. At block 356 the microprocessor assumes that speed limiting and not the shift interrupt determines the maximum RPM and at block 358 fetches the coil database of the cylinder pair that will fire next. At block 360 the microprocessor saves the most significant byte of the timer history and calculates the reference interval which is the time between the last two Hall 1 interrupts. At block 362 the microprocessor determines whether the reference interval is only two bytes long and if so proceeds to block 376. If the reference interval is not two bytes long, the microprocessor at block 364 determines whether the reference interval calculated at block 360 is less than the reference interval corresponding to the maximum engine speed beyond which the engine is not allowed to run. If so, the microprocessor proceeds to block 520 shown in FIG. 17J so that no more sparks will be generated until the engine slows to a safe level. More particularly, at block 520 the microprocessor determines whether the system is waiting for feedback time to pass for knock as discussed in greater detail below and if so, at block 522 the microprocessor reduces the feedback by one count. Thereafter at block 524, the microprocessor saves the history and proceeds to block 304.

If the microprocessor 36 determines at block 364 that the reference interval is greater than the reference interval at the maximum allowable speed, indicating that the engine is not trying to run over the maximum speed, the microprocessor at block 360 determines whether the shift interrupt is active. If the shift interrupt is active, the microprocessor proceeds to block 368 to load the maximum allowable speed for the shift interrupt into the scratch pad memory of the RAM 78. Thereafter, at block 370 the microprocessor 36 looks to see if the reference interval is smaller than allowed by a shift interrupt indicating that the engine is running too fast during shifting between forward and reverse. If the microprocessor 36 determines that the reference interval is less than the reference interval at the shift interrupt and further determines that the fire counters discussed above with reference to FIG. 17K indicate that the cylinder pair is not allowed to fire, i.e. the fire counter equals zero as determined at block 374, the microprocessor proceeds to block 520 without firing the next cylinder pair. If, however, the fire counter indicates that the next cylinder is allowed to fire as determined at block 374, the microprocessor proceeds to block 376.

At block 376 the microprocessor sets a flag to indicate that a new reference interval has been measured and at block 378 calculates the product of the ADVANCE subroutine shown in FIG. 7 times the reference interval calculated at block 360. Thereafter at block 380 the microprocessor 36 determines whether the reference interval is so large, the engine running at a slow speed, that triple precision calculations must be made. If so, the microprocessor proceeds to block 530. If, however, the reference interval is not so large as to require triple precision calculations, the microprocessor proceeds to block 533 to calculate the delay to spark time which is set equal to the reference interval calculated at block 360 minus the product calculated at block 378 so that the delay to spark is equal to the reference interval minus some percent of the reference interval for advance. After calculating the delay to spark time at block 533, the microprocessor at block 535 determines whether the delay to spark time is less than the dwell time so as to indicate the need for overlapping dwell. If the engine is running at a midrange speed such that overlapping dwell is not required, the microprocessor 36 proceeds to block 537 to call the SMALL RI subroutine in order to finish the computations for this next cylinder pair that is to fire.

Figure 23A:
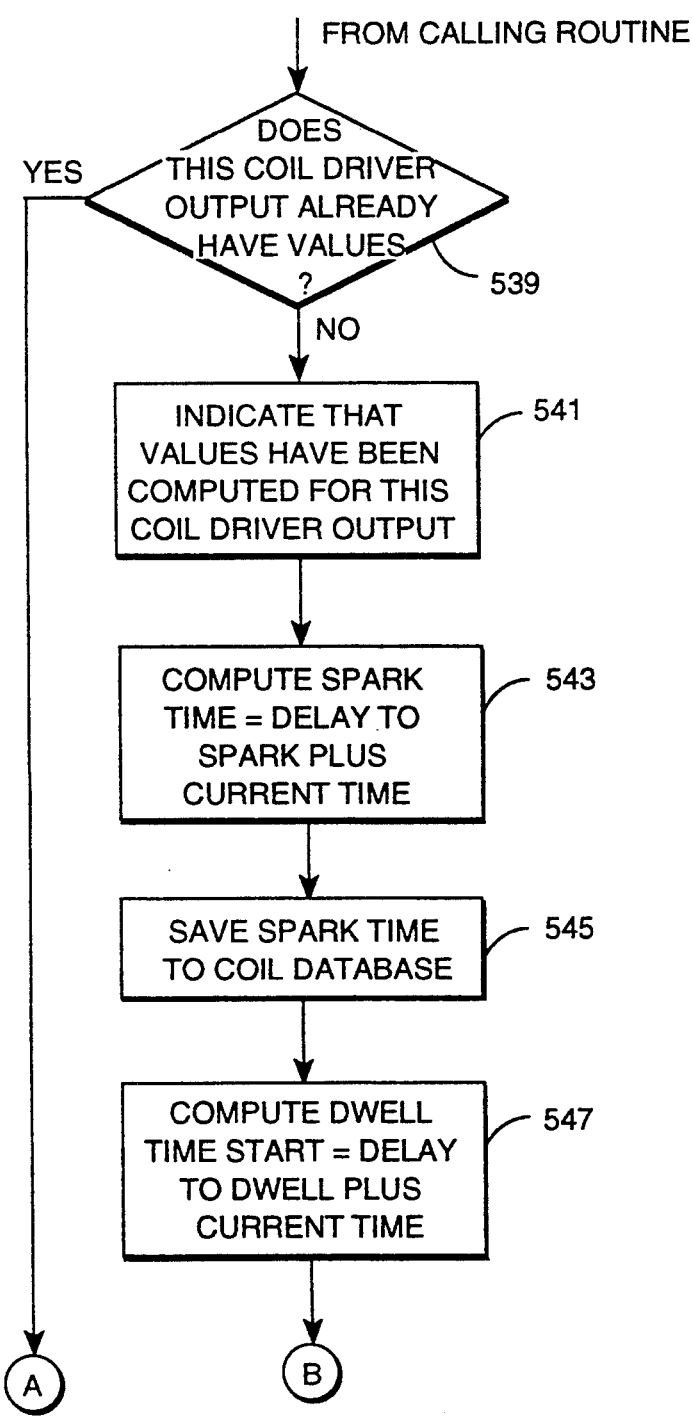
FIGS. 23A-23B form a flow chart illustrating a SMALL RI software subroutine utilized by the timing controller shown in FIG. 1.
Figure 24B:
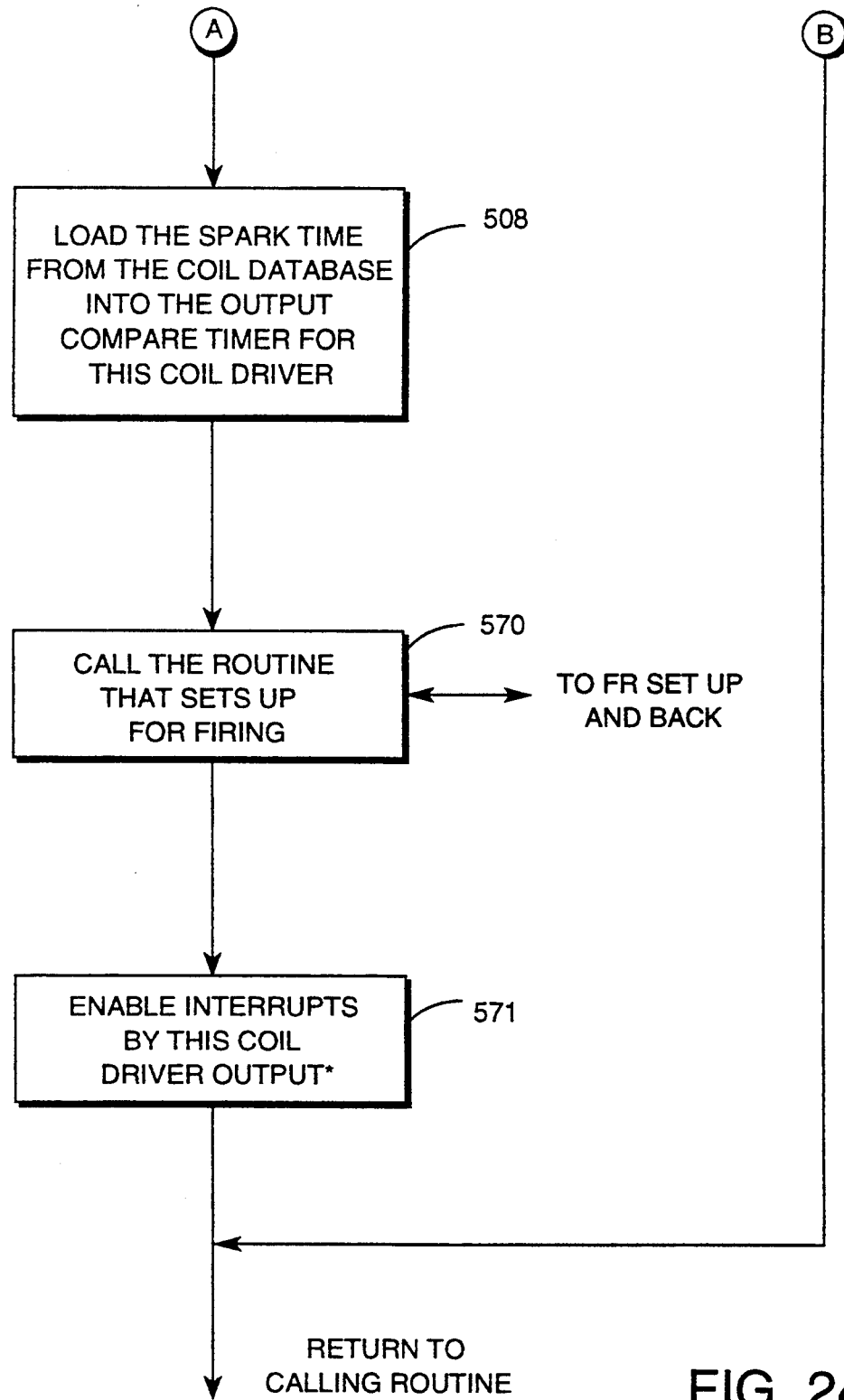

Upon entering the SMALL RI subroutine at block 539 as shown in FIG. 23A, the microprocessor 36 determines whether the coil driver output already has values and if so, the microprocessor returns to the CALLING routine which in this case is block 537 of the HALL 1 subroutine shown in FIG. 17G. If, however, the microprocessor 36 determines that the coil driver output does not already have values, at block 541 the microprocessor indicates that values have been computed and at block 543 computes the spark time. The microprocessor sets the spark time equal to the delay to spark time calculated at block 533 plus the current time of the real timer. Thereafter, at block 545 the microprocessor saves the spark time calculated at block 543 in the coil's database and at block 547 computes the dwell time start. The dwell time start is set equal to the delay to dwell plus the current time. At block 548 the microprocessor determines whether the reference interval is too small to allow a normal dwell. If the reference interval is too small, the FORCE subroutine shown in FIG. 24 is executed at block 550 to force the cylinder into dwell. If however, normal dwell is allowed, at block 560 the microprocessor 36 saves the dwell time start and calls the ARM subroutine shown in FIG. 18 to arm the appropriate output coil driver to enter dwell at the dwell start time, i.e. after the expiration of the delay to dwell. Thereafter, the microprocessor returns to the HALL 1 subroutine at block 537 from which the microprocessor proceeds to block 520 shown in FIG. 17J.

If the microprocessor 36 determines at block 535 that the delay to spark time calculated at block 533 is less than the dwell time indicating that the engine is running at very high speeds and that overlapping dwell is required, the microprocessor proceeds to block 570. At block 570 the microprocessor indicates that overlapping dwell is required so that the various computations may have to be made for more than one pair of cylinders. Next, the microprocessor 36 determines whether the cylinder pair already has values or not. As an example, assume that cylinder pair 1 does not have values calculated, the microprocessor then proceeds from block 572 to block 574 to indicate that cylinder pair now has values and at block 576 computes the delay to spark for the cylinder. Thereafter at block 578 the microprocessor calls the FORCE subroutine shown in FIG. 24 to force the cylinder pair into dwell. After forcing the cylinder pair into dwell, at block 578, the microprocessor proceeds to block 580 to add one reference interval to the delay to spark time to obtain the delay to spark time for cylinder pair 2. It is at block 580 that the microprocessor 36 plans ahead. Thereafter, the microprocessor proceeds to block 582 to determine whether triple precision calculations are required and if not, at block 584 the microprocessor adjusts a temporary pointer to indicate the next cylinder pair. At block 586 the microprocessor determines whether this next cylinder pair is the last pair and if so resets the temporary pointer to the first pair at block 588. From either blocks 586 or 588 the microprocessor 36 proceeds to block 590 to determine whether the system is still behind on dwelling and if so, the microprocessor proceeds from block 590 back to block 570. Essentially, the procedure is as follows. When one cylinder of the first cylinder pair hits top dead center, such that a Hall 1 interrupt is generated, at block 578 the microprocessor 36 discovers that cylinder pair 2 should already be dwelling and forces dwell on cylinder pair 2. Thereafter the microprocessor at block 580 plans the dwell for cylinder pair 3. When a cylinder of cylinder pair 2 hits top dead center generating a Hall 1 interrupt the microprocessor 36 plans the dwell for cylinder pair 4 and then when cylinder pair 3 hits top dead center the microprocessor plans the dwell on cylinder pair 1. This procedure continues until overlapping dwell is no longer required as determined at block 590.

Figure 23B:
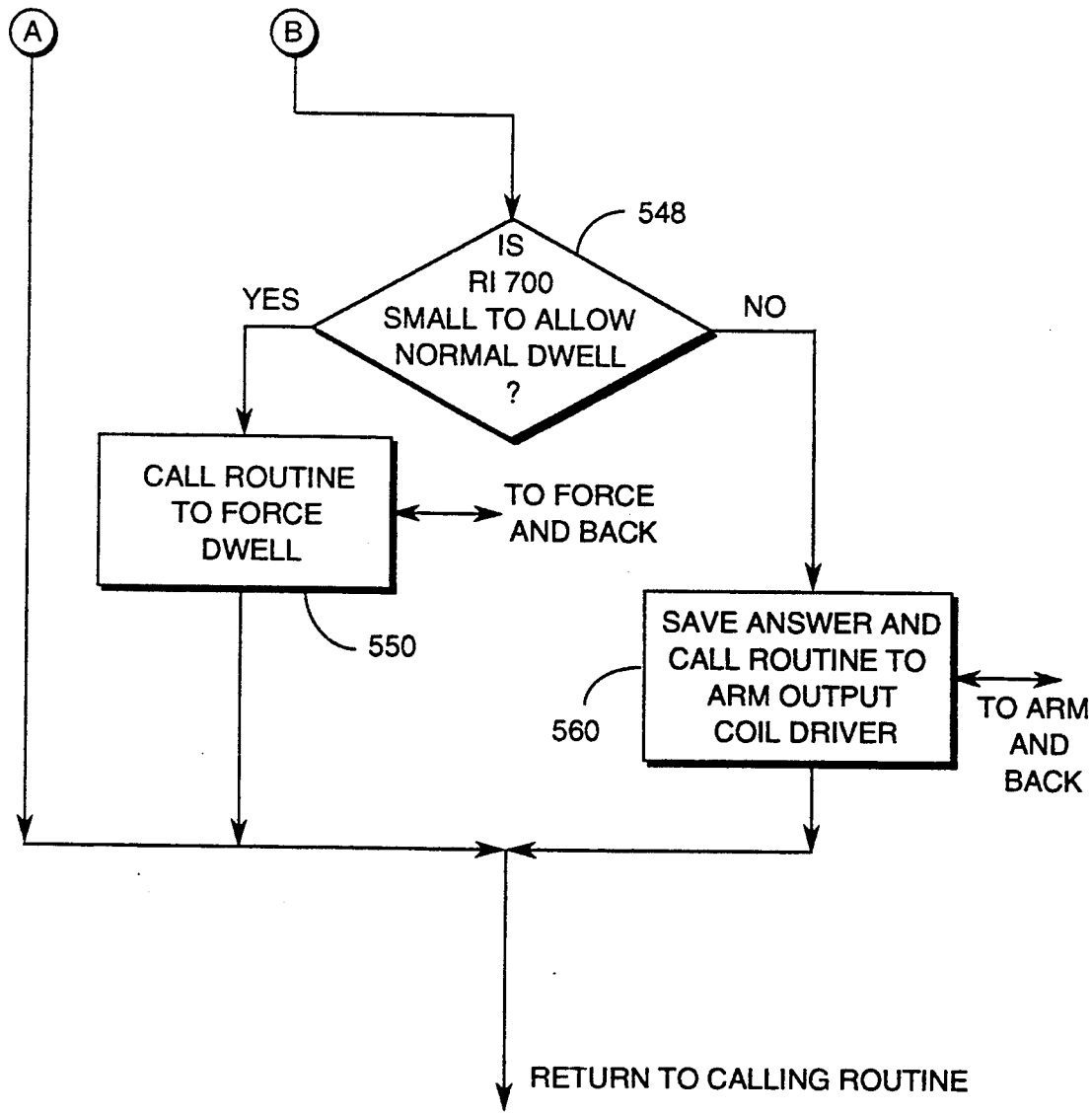

The microprocessor thereafter proceeds to block 592 to arm the next cylinder pair naturally by calling SMALL RI shown in FIG. 23.

Returning to FIG. 17G at block 380, if the reference interval calculated at block 360 requires triple precision calculations, the microprocessor 36 proceeds to block 530 to compute the product of advance times the reference interval. Thereafter, at block 532 the microprocessor determines whether the current cylinder already has values and if so proceeds to block 520 shown in FIG. 17J. If the current cylinder does not already have values calculated for its firing, the microprocessor at block 534 sets the database flag to indicate that new values are being calculated for this cylinder pair. At block 536 the delay to spark time is calculated and at block 538 the delay to dwell time is calculated. The microprocessor continues to block 540 in which it is determined whether the overflow count is equal to zero. If the overflow count is not equal to zero the overflow timer is allowed to arm the cylinder for dwell such that when the real timer rolls over, the vector table causes the microprocessor to execute the TIMER OVERFLOW routine shown in FIG. 14. In this routine, the microprocessor at block 542 calls the TIMER routine discussed above. Thereafter, at block 544 the microprocessor re-enables this interrupt. If however, the overflow count is determined to be equal to zero at block 540 in FIG. 17H, the microprocessor at block 546 calls the ARM subroutine shown in FIG. 18 to arm the cylinder for a normal dwell entrance. Thereafter, the microprocessor continues to block 580 as discussed above with reference to overlapping dwell.

The adjustments that are made to the timing of the firing of the cylinders to protect the engine from knock will now be discussed with reference to FIGS. 27A–27B and FIGS. 9A–9D, 10 and 11. When the microprocessor 36 receives a knock interrupt signal from the knock sensor 68, the vector table at block 108 causes the microprocessor to enter the KNOCK subroutine depicted in FIGS. 27A–27B. Upon entering the KNOCK subroutine at block 600 the microprocessor 36 determines whether the knock correction is active. If the knock correction is not active, indicating that this is the first potential knock detected or that the lock value has been reset as discussed below, the microprocessor 36 proceeds to block 626 to determine whether the speed of the engine is less than the maximum speed at which knock can reliably be detected, this speed being approximately 4,000 RPM. If the current speed of the engine is greater than the maximum speed at which knock may reliably be detected, the microprocessor proceeds to block 624 to re-enable the knock interrupts, the affect of this being that at very high speeds knock adjustments are not accumulated but stay at a fixed value.

If, however, the speed of the engine is not greater than the maximum speed above which knock cannot be reliably detected, the microprocessor proceeds to block 628 to save the current speed as a lock value, the lock value representing the speed of the engine when knock is first detected. At block 630 the microprocessor 36 indicates that a knock correction is active and at block 634 the microprocessor 36 fetches an incremental unit of retard, KNOCK STEP, from the EEPROM 80. The microprocessor at block 634 designates this value as the "total". Thereafter, the microprocessor proceeds to block 612 to determine whether the desired adjustment is over the EEPROM limit and if so, the microprocessor limits the "total" to the maximum knock adjustment value specified in the EEPROM. At block 616 the microprocessor determines whether the desired adjustment is larger than the maximum advance. This is not allowable since adjustments are made to account for knock by subtracting the "total" knock adjustment calculated from the calculated advance value as discussed below. If the microprocessor determines at block 616 that the desired knock adjustment is larger than the maximum advance, at block 618 the microprocessor limits the "total" to match the maximum advance as specified in the EEPROM 80. Thereafter, the microprocessor at block 620 saves the "total" as the new knock adjustment and at block 622 loads the feedback delay counter with the number of cylinders so that only one knock adjustment may be made per firing cycle of the cylinders. Thereafter, the microprocessor re-enables the knock interrupt at block 624.

If at block 600 the microprocessor determines that the knock correction is active, the knock correction being set active at block 630 during the first pass through the KNOCK subroutine, the microprocessor 36 at block 602 determines whether all cylinders have fired since the last knock correction. If all cylinders have not fired, the microprocessor proceeds to block 624 to re-enable the knock interrupts with out making a further knock adjustment since, as discussed above, only one knock adjustment is made per firing cycle of the cylinders. If all of the cylinders have fired since the last knock correction, the microprocessor at block 604 determines whether the speed of the engine is below the maximum speed at which knock may reliably be detected and if so, the microprocessor proceeds to block 606 to add one unit of incremental retard, KNOCK STEP to the "total" current adjustment, this new "total" being saved temporarily. At block 608, the microprocessor determines whether an addition overflow occurred and if so, the microprocessor at block 610 limits the "total" to the mathematical maximum and thereafter proceeds to block 612 as discussed above.

Figure 9A:
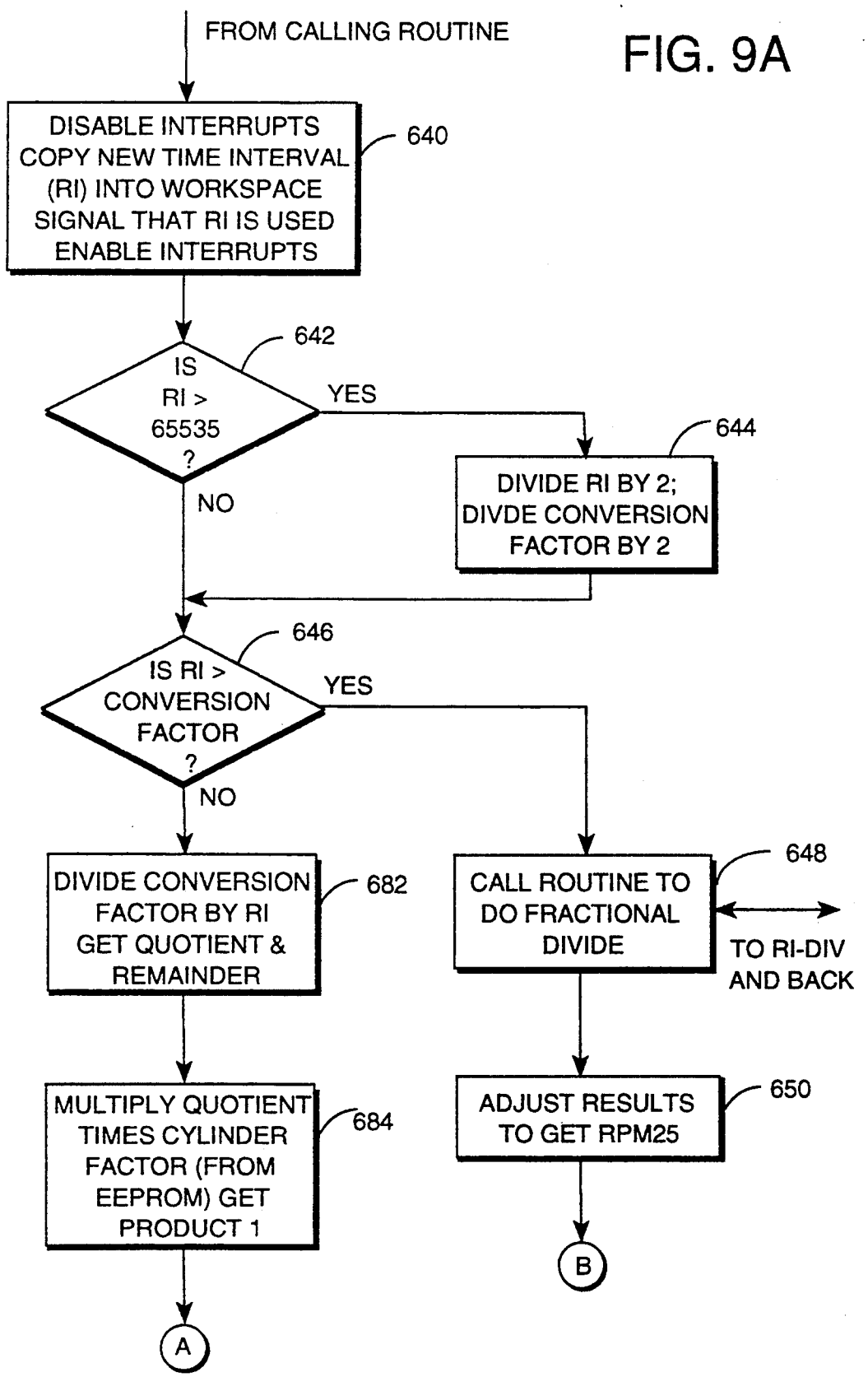
FIGS. 9A-9D form a flow chart illustrating the RI-2-RPM software routine utilized by the timing controller shown in FIG. 1.
Figure 9B:
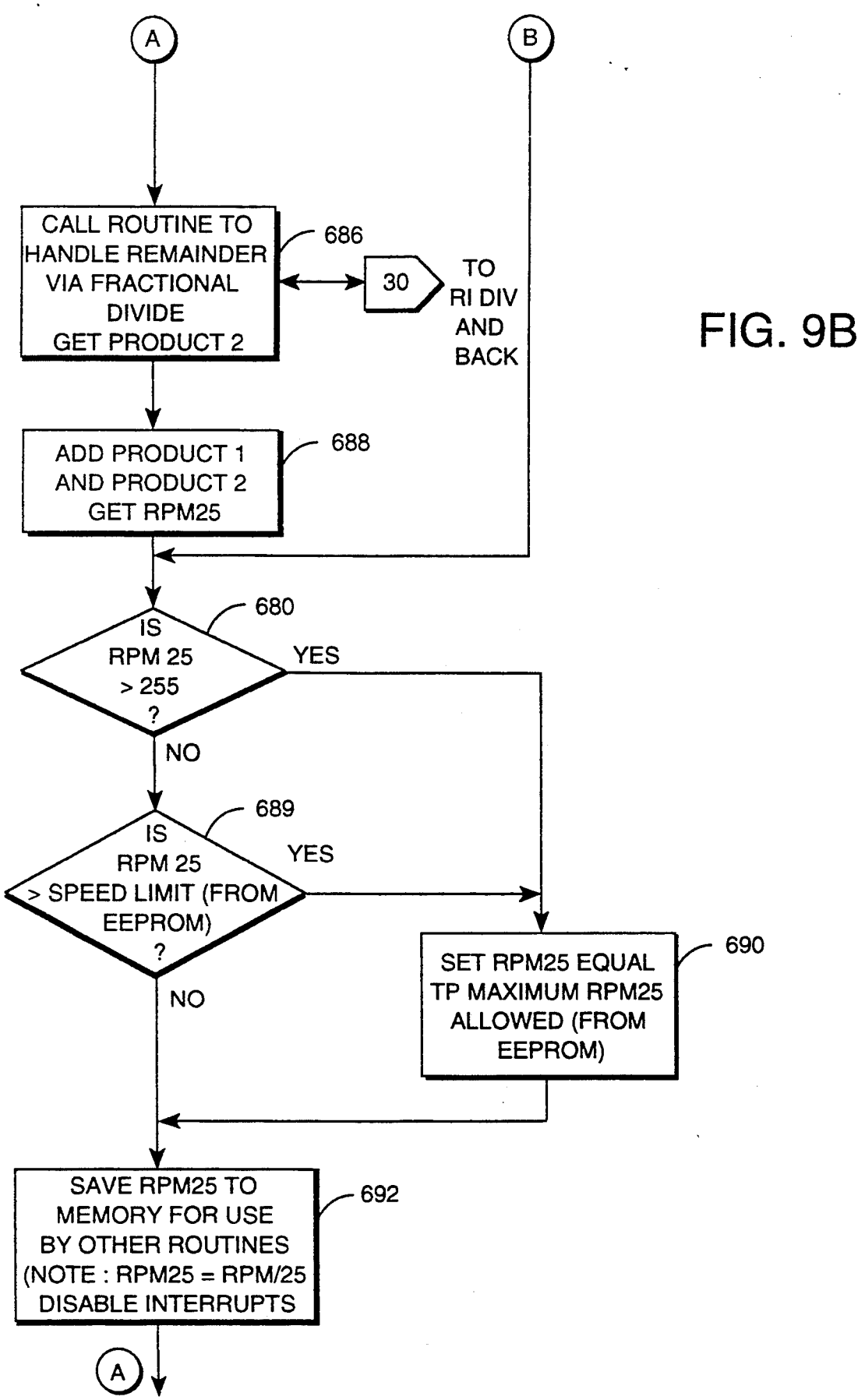
Figure 9C:
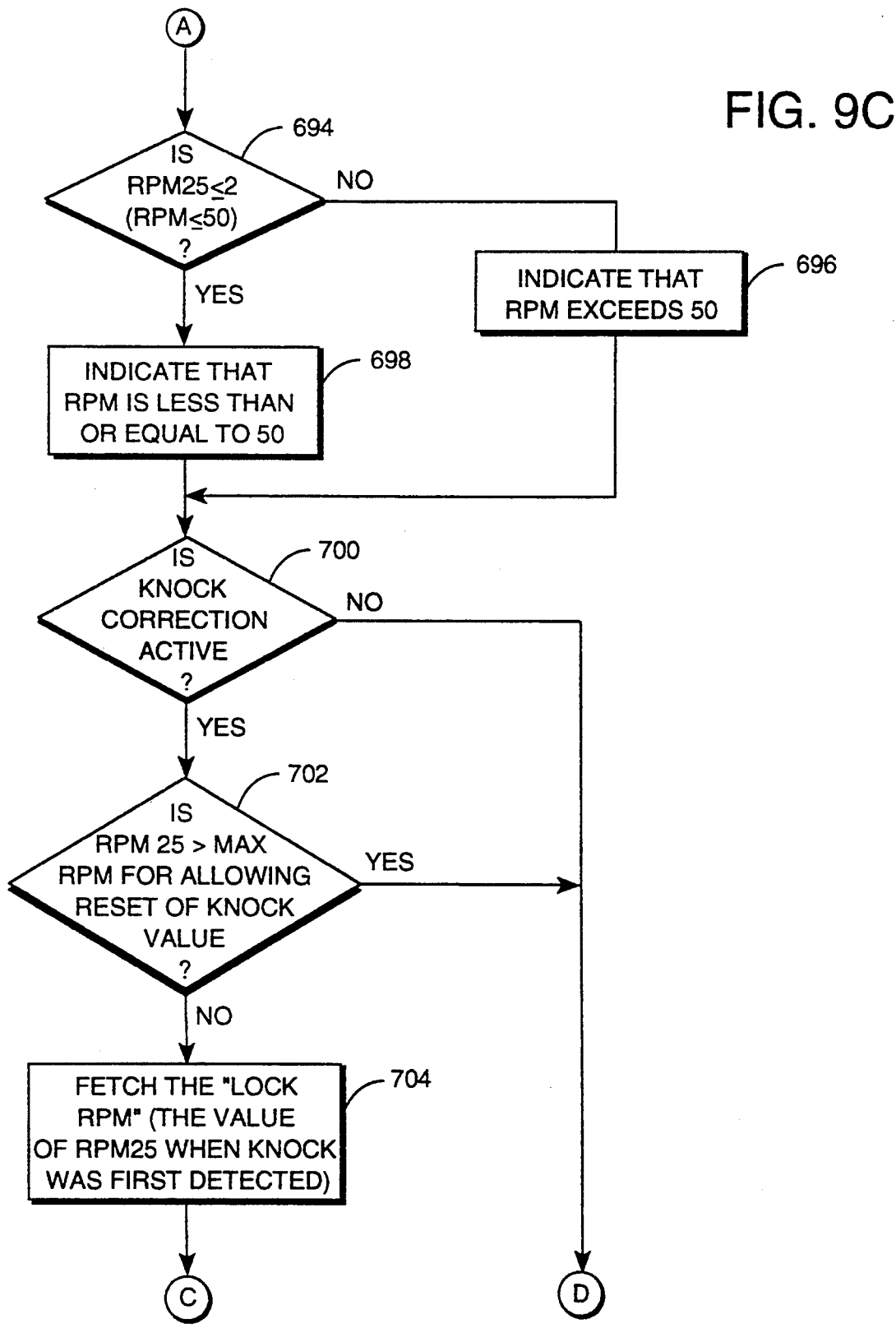
Figure 9D:
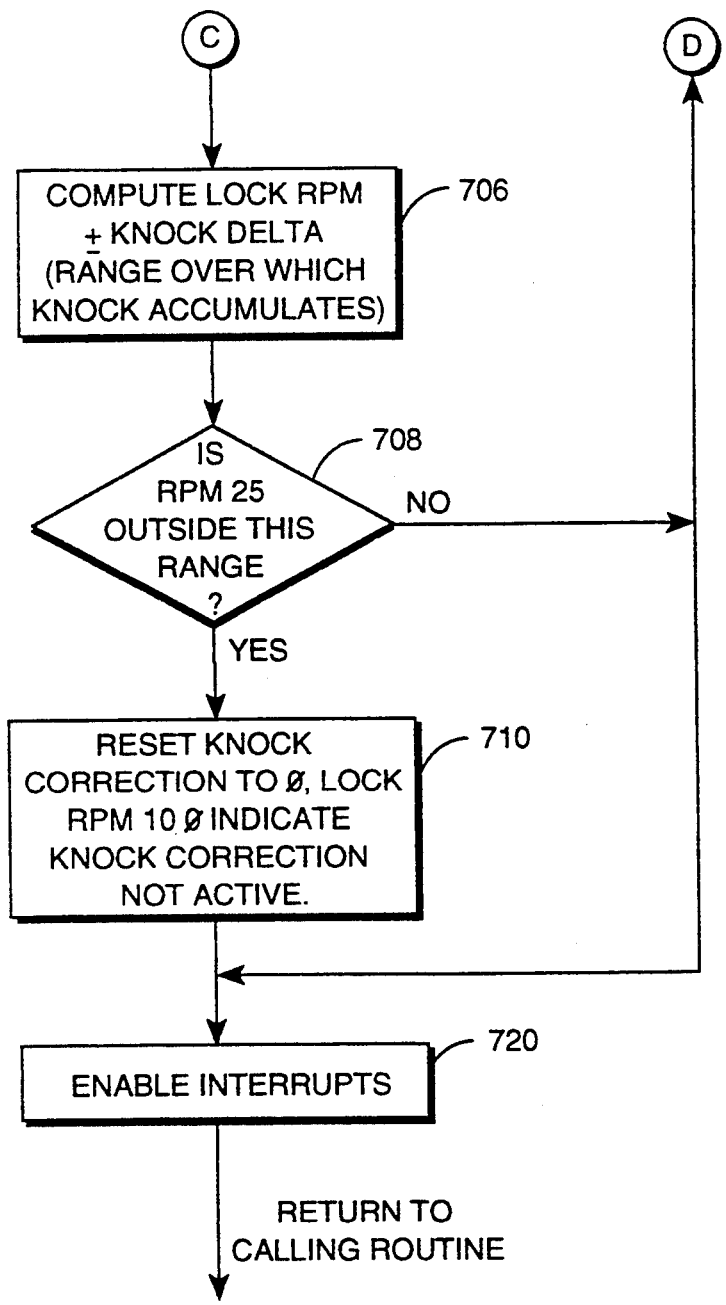

A portion of the knock algorithm is implemented in the RI-2-RPM subroutine shown in FIGS. 9A–C. With reference to FIG. 9A, upon entering the RI-2-RPM subroutine from the MAIN subroutine at block 640, the microprocessor copies the new reference time interval calculated in Hall 1 into a work space. At block 642 the microprocessor determines whether RI is greater than 65535 and if so at block 644 divides the reference interval by 2. Thereafter at block 646, the microprocessor 36 determines whether the reference interval is greater than the conversion factor and if so, proceeds to block 648 to execute the RIDIV subroutine to perform fractional divides.

Figure 10:
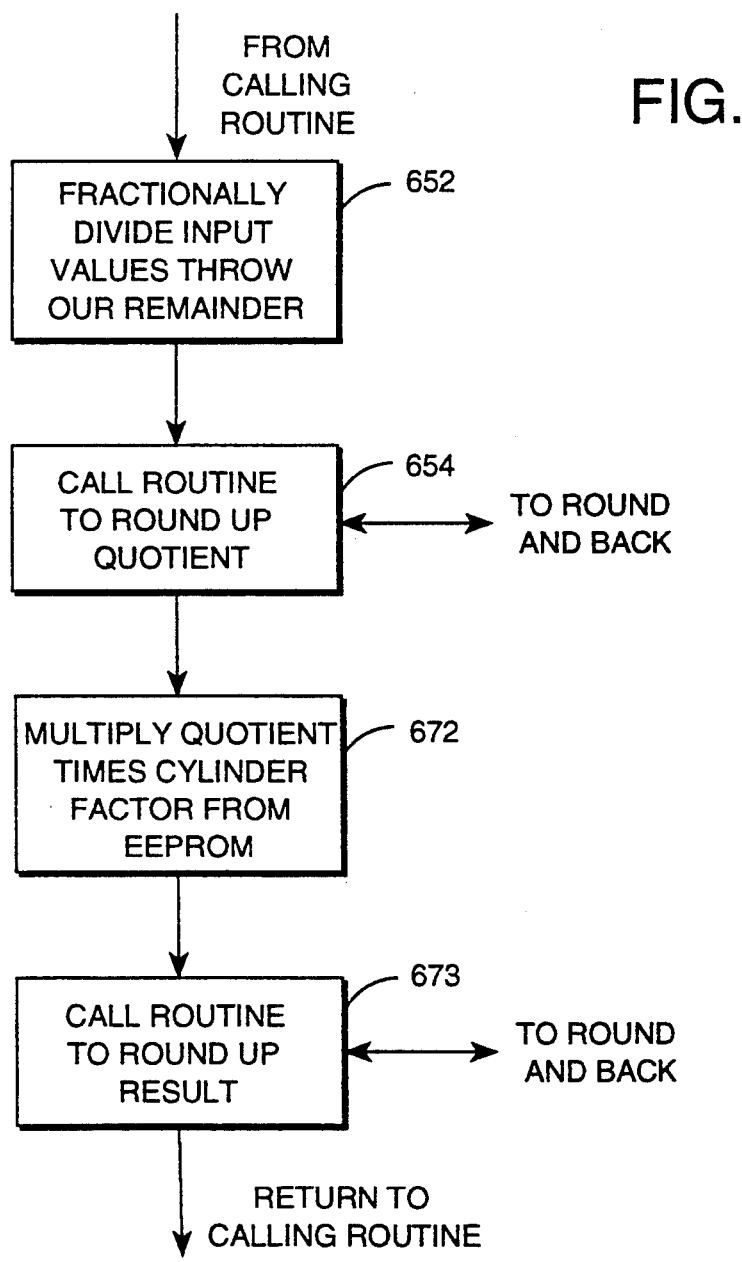
FIG. 10 is a flow chart illustrating an RIDIV subroutine utilized by the timing controller shown in FIG. 1.
Figure 11:
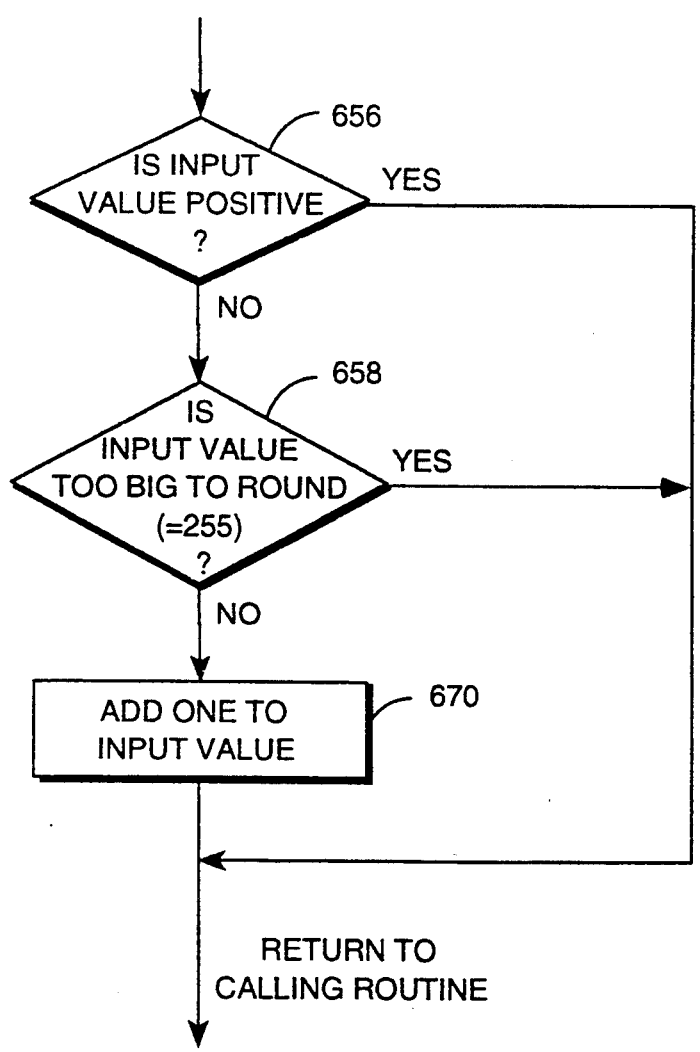
FIG. 11 is ROUND subroutine utilized by the timing controller shown in FIG. 1.

Upon entering the fractional divide subroutine as shown in FIG. 10, the microprocessor at block 652 fractionally divides the input values, throwing out the remainder. At block 654 the microprocessor 36 calls the ROUND routine shown in FIG. 11. At block 656 of the ROUND subroutine, the microprocessor determines whether the input value is positive and if not at block 658 determines whether the input value is too big to round. If the input value is not positive and if it is not too large to round, at block 670 the microprocessor adds one to the input value and returns to block 654. From block 654, the microprocessor proceeds to block 672 to multiply the quotient times the cylinder factor that is stored in the EEPROM 80. Thereafter, at block 673 the microprocessor calls the ROUND subroutine to again round up the result. From block 673, the microprocessor 36 returns to the CALLING routine which is shown in block 648. From block 648, the microprocessor proceeds to block 650 and adjusts the results to obtain a value RPM25 which represents the speed of the engine divided by 25. Thereafter, the microprocessor proceeds to block 680.

Returning to block 646, if the microprocessor determines that the reference interval is not greater than the conversion factor, the microprocessor at block 682 divides the conversion factor by the reference interval to obtain a quotient and a remainder. At block 684 the microprocessor multiplies the quotient times the cylinder factor from the EEPROM to obtain a first product. The microprocessor thereafter at block 686 calls the RIDIV subroutine as discussed above and upon returning therefrom at block 688 adds the products obtained from blocks 684 and 686 together at a block 688 to obtain RPM 25. At block 680 the microprocessor determines whether RPM25 is greater than the mathematical maximum, 255 and if so, at block 690 the microprocessor sets RPM25 equal to the maximum RPM25 allowed, this value being stored in the EEPROM 80. If RPM25 is not greater than 255, the microprocessor proceeds to block 689 to determine whether RPM25 is greater than the speed limit stored in the EEPROM 80 and if so proceeds to block 690. Thereafter, the microprocessor 36 at block 692 saves the RPM25 value for use by other routines and proceeds to block 694 to determine whether the speed of the engine is less than or equal to 50. If not, at block 696 the microprocessor indicates that the RPM exceeds 50. Otherwise, at block 698 the microprocessor indicates that the RPM is less than or equal to 50.

The microprocessor 36 at block 700 thereafter determines whether the knock correction is active and if not proceeds to block 720 to enable the interrupts and return to the CALLING routine. If however, the knock correction is active as discussed above with reference to FIG. 27, the microprocessor proceeds to block 702 to determine whether RPM25 is greater than the maximum RPM value for allowing the reset of the knock value. More particularly, at block 702 the microprocessor 36 determines whether the speed of the engine is above 3,500 RPM. If so, the microprocessor proceeds to block 720 so that each time a knock signal is received that may be adjusted for as determined at block 602 for an engine speed that is between 3,500 and 4,000 RPM as determined at block 604, the "total" knock adjustment is increased by the KNOCK STEP value. If however, the speed of the engine is below 3,500 RPM, the microprocessor proceeds from block 702 to block 704 to fetch the lock RPM set at block 628 in FIG. 27A and at block 706 determines the range over which knock adjustments may be accumulated in this lower speed range. At block 708 the microprocessor 36 determines whether the current engine speed is within KNOCK DELTA of the lock RPM value and if the speed is outside of this range the microprocessor at block 710 resets the knock correction to zero and lock RPM to zero. The microprocessor also indicates that the knock correction is not active so that upon the next interrupt a new lock value will be saved at block 628. If, the microprocessor 36 determines at block 708 that the current speed of the engine is with in KNOCK DELTA of lock RPM, the microprocessor proceeds to block 720 so that upon the next knock interrupt, the microprocessor will proceed from block 600 to 606 to increment the "total" knock adjustment by the unit of incremental retard at block 606.

Once the knock adjustments are calculated in the KNOCK subroutine, they are accounted for in the ADVANCE subroutine shown in FIG. 7C wherein at block 232 the microprocessor 36 checks for adjustments due to knock interrupts. If the knock correction is active as determined at block 234, and the total advance calculated in the ADVANCE subroutine is greater than the knock correction as determined at block 236, the microprocessor at block 240 subtracts the knock correction from the total advance. The knock adjustments made in accordance with the present invention reduce knock by reducing the advance so that the engine has less time to preignite the fuel. The knock adjustments are made, however, in very small steps initially so that the amount of power obtained from each cylinder is optimized while protecting the engine from permanent damage.

Many modifications and variations of the present invention are possible in light of the above teachings. Thus, it is to be understood that, with the scope of the appended claims, the invention may be practiced otherwise than as described hereinabove.

What is claimed and desired to be secured by Letters Patent is:

1. In a marine craft distributorless ignition system with an engine having a plurality of cylinders and a plurality of ignition coils, each cylinder being coupled to an ignition coil and drive means coupled to said ignition coils for initiating for each cylinder in a firing order a dwell period in response to a first control signal to pull current through said cylinder's coil creating a field, said drive means collapsing said field in response to a second control signal to generate a spark firing said cylinder, a controller for controlling the timing of firing of said cylinders comprising:

means for sensing when each of said cylinders reaches top dead center to provide a signal representative thereof;
means responsive to said sensing means for determining the speed of said engine;
means responsive to said determined engine speed for determining advance;
a battery for providing power to said systems;
means responsive to the voltage of said battery for determining a dwell time;
means responsive to said sensing means for determining the interval between a first cylinder reaching top dead center and a preceding cylinder reaching top dead center; and
firing time determining means being responsive to said interval and said advance for determining a delay time until said spark should be generated to fire said subsequent cylinder and being responsive to said delay time to spark and said dwell time for determining a delay time until said dwell period should be initiated.

2. A distributorless ignition system as recited in claim 1 further including means for generating said first control signal upon the expiration of said delay time to dwell and means for generating said second control signal upon the expiration of said delay time to spark.

3. A distributorless ignition system as recited in claim 1 said advance determining means includes a table of entries each entry having an associated engine speed value, advance value and slope value representing the slope of a line drawn between an engine speed value and the next highest engine speed value in said table, said advance determining means determining a desired advance value for a particular engine speed value based on the sum of the advance value associated with the next lowest engine speed value in said table and the product of the slope value associated with said next lowest speed value times the difference between said particular engine speed value and the next lowest engine speed value.

4. A distributorless ignition system as recited in claim 3 wherein said table is ordered from the highest to lowest engine speed.

5. A distributorless ignition system as recited in claim 1 wherein said dwell determining means includes at least one table of entries each entry having an associated battery voltage, slope and intercept wherein said slope and intercept describe a line drawn between the associated battery voltage and the next highest battery voltage, said dwell time determining means determining a desired dwell time based on the sum of the product of the table entry battery voltage equal to or next smaller than said the voltage from said battery times the slope associated with said table entry battery voltage and the intercept associated with the table entry battery voltage.

6. A distributorless ignition system as recited in claim 1 wherein said firing time determining means is responsive to an interval that is too small for said determined dwell time to force the initiation of said dwell prior to the expiration of said delay time to dwell.

7. A distributorless ignition system as recited in claim 1 further including means responsive to engine vibration for providing a signal representing potential engine knock; means responsive to said knock signal for reducing said advance by a predetermined amount.

8. A distributorless ignition system as recited in claim 7 including means for limiting the number of knock adjustments made to said advance to one adjustment per firing cycle of said cylinders.

9. A distributorless ignition system as recited in claim 7 including means responsive to an engine speed that is greater than a first predetermined value but less than a second predetermined value for providing a knock adjustment that is a multiple of said predetermined amount.

10. A distributorless ignition system as recited in claim 9 including means responsive to an engine speed that is greater than said second predetermined value to provide a fixed knock adjustment that is based on the value of said last knock adjustment made for an engine speed that is less then said second predetermined value.

11. A distributorless ignition system as recited in claim 9 including means for determining a lock engine speed at which said knock signal is first provided, means for determining whether an engine speed is within a fixed range of said lock speed, said advance reducing means being responsive to a series of knock signals occurring at speeds within a range of said lock speed to reduce said advance by successively greater multiples of said predetermined amount for each of said succeeding knock signals in said series for which a knock adjustment may be made.

12. A distributorless ignition system as recited in claim 11 wherein said advance reducing means is responsive to a knock signal occurring at a speed outside of said range for determining said knock adjustment based upon a new lock speed.

13. In a marine craft distributorless ignition system with an engine having a plurality of cylinders and a plurality of ignition coils, each cylinder being coupled to an ignition coil and drive means coupled to said ignition coils for initiating for each cylinder in a firing order a dwell period in response to a first control signal to pull current through said cylinder's coil creating a field, said drive means collapsing said field in response to a second control signal to generate a spark firing said cylinder, a controller for controlling the timing of firing of said cylinders comprising:

means for sensing when each of said cylinders reaches top dead center to provide a signal representative thereof;

means responsive to a first cylinder reaching top dead center for determining the time at which a cylinder subsequent in said firing order to said first cylinder should fire;

means for setting up said cylinder to fire at said determined time;

means for determining if a cylinder is in dwell;

means for forcing said subsequent cylinder to fire prior to said determined time if said subsequent cylinder is in dwell when said subsequent cylinder is sensed to have reached top dead center; and overlapping dwell determining means for determining whether a subsequent cylinder should already be in dwell when said firing time is determined, said firing time determining means being responsive to said overlapping dwell determining means for determining the firing time of a plurality of cylinders subsequent in said firing order to said first cylinder in response to said first cylinder reaching top dead center to provide overlapping dwell periods for said plurality of cylinders.

14. A distributorless ignition system as recited in claim 13 further including means for determining if a cylinder is approaching dwell, said fire forcing means firing said subsequent cylinder prior to said predetermined time if said subsequent cylinder is approaching dwell when said subsequent cylinder is sensed to have reached top dead center.

15. A distributorless ignition system as recited in claim 13 wherein said firing time determining means includes means for determining the speed of said engine to provide a value representative thereof, said firing time determining means being responsive to a value representing a slow engine speed for utilizing triple precision calculations to determine the firing time of a cylinder immediately subsequent to said first cylinder in said firing order and said firing time determining means being responsive to a value representing a midrange speed for utilizing double precision calculations to determine the firing time of a cylinder immediately subsequent to said first cylinder in said firing order.

16. A distributorless ignition system as recited in claim 13 further including means responsive to said sensing means for determining the speed of said engine, said firing time determining means including means responsive to said engine speed for determining advance.

17. A distributorless ignition system as recited in claim 16 further including means responsive to engine vibration for providing a signal representing potential engine knock; means responsive to said knock signal for reducing said advance by a predetermined amount.

18. A distributorless ignition system as recited in claim 16 further including a battery for providing power to said system, means responsive to the voltage of said battery for determining a dwell time.

19. A distributorless ignition system as recited in claim 18 further including means responsive to said sensing means for determining the interval between said first cylinder reaching top dead center and a preceding cylinder reaching top dead center, said firing time determining means being responsive to said interval and said advance for determining a delay time until said spark should be generated to fire said subsequent cylinder and being responsive to said delay time to spark and said dwell time for determining a delay time until said dwell period should be initiated.

20. A distributorless ignition system as recited in claim 19 further including means for generating said first control signal upon the expiration of said delay time to dwell and means for generating said second control signal upon the expiration of said delay time to spark.

21. A distributorless ignition system as recited in claim 16 wherein said advance determining means includes a table of entries each entry having an associated engine speed value, advance value and slope value representing the slope of a line drawn between an engine speed value and the next highest engine speed value in said table, said advance determining means determining a desired advance value for a particular engine speed value based on the sum of the advance value associated with the next lowest engine speed value in said table and the product of the slope value associated with said next lowest speed value times the difference between said particular engine speed value and the next lowest engine speed value.

22. A distributorless ignition system as recited in claim 21 wherein said table is ordered from the highest to lowest engine speed.

23. A distributorless ignition system as recited in claim 18 wherein said dwell determining means includes at least one table of entries each entry having an associated battery voltage, slope and intercept wherein said slope and intercept describe a line drawn between the associated battery voltage and the next highest batter voltage, said dwell time determining means determining a desired dwell time based on the sum of the product of the table entry battery voltage equal to or next smaller than said the voltage from said battery times the slope associated with said table entry battery voltage and the intercept associated with the table entry battery voltage.

24. In a distributorless ignition system with an engine having a plurality of cylinders and a plurality of ignition coils, each cylinder being coupled to an ignition coil and drive means coupled to said ignition coils for initiating for each cylinder in a firing order a dwell period in response to a first control signal to pull current through said cylinder's coil creating a field, said drive means collapsing said field in response to a second control signal to generate a spark firing said cylinder, a controller for controlling the timing of firing of said cylinders comprising:

means for sensing when each of said cylinders reaches top dead center to provide a signal representative thereof;

means responsive to said sensing means for determining the speed of said engine;

means responsive to said first cylinder reaching top dead center for determining the time at which a cylinder subsequent in said firing order to said first cylinder should fire, said firing time determining means including means responsive to said engine speed for determining advance;

means responsive to engine vibration for providing a signal representing potential engine knock;

means for determining a lock engine speed at which said knock signal is first provided;

means for determining whether an engine speed is within a fixed range of said lock speed;

means responsive to said knock signal for reducing said advance by a predetermined amount, said advance reducing means being responsive to a series of knock signals occurring at speeds within a range of said lock speed to reduce said advance by successively greater multiples of said predetermined amount for each of said succeeding knock signals in said series for which a knock adjustment may be made; and means for setting up said cylinder to fire at said determined time.

25. A distributorless ignition system as recited in claim 24 including means for limiting the number of knock adjustments made to said advance to one adjustment per firing cycle of said cylinders.

26. A distributorless ignition system as recited in claim 24 including means responsive to an engine speed that is greater than a predetermined value to provide a fixed knock adjustment that is based on the value of said last knock adjustment made for an engine speed that is less then said second predetermined value.

27. A distributorless ignition system as recited in claim 24 wherein said advance reducing means is responsive to a knock signal occurring at a speed outside of said range for determining said knock adjustment based upon a new lock speed.

* * * * *